US007303475B2

(12) United States Patent
Britt et al.

(10) Patent No.: US 7,303,475 B2
(45) Date of Patent: Dec. 4, 2007

(54) ENTERTAINMENT MONITORING SYSTEM AND METHOD

(75) Inventors: Tim Britt, Henderson, NV (US); Wayne Miller, Henderson, NV (US); Mark Guibord, Henderson, NV (US); Jeff George, North Las Vegas, NV (US); Doug Huber, Louisville, KY (US); Robert Perry, Las Vegas, NV (US); John-Paul Pochin, Christ Church (NZ)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

(21) Appl. No.: 11/094,605

(22) Filed: Mar. 30, 2005

(65) Prior Publication Data

US 2005/0181864 A1 Aug. 18, 2005

Related U.S. Application Data

(63) Continuation of application No. 09/967,571, filed on Sep. 28, 2001, now abandoned.

(51) Int. Cl.
*A63F 13/00* (2006.01)

(52) U.S. Cl. .......................................... 463/42

(58) Field of Classification Search .................. 463/25, 463/29, 40, 42, 43, 41
See application file for complete search history.

(56) References Cited

U.S. PATENT DOCUMENTS

| | | | | | |
|---|---|---|---|---|---|
| 5,611,730 | A | | 3/1997 | Weiss | |
| 5,655,961 | A | * | 8/1997 | Acres et al. | 463/27 |
| 5,762,552 | A | * | 6/1998 | Vuong et al. | 463/25 |
| 5,770,533 | A | * | 6/1998 | Franchi | 463/42 |
| 5,820,459 | A | | 10/1998 | Acres et al. | |
| 6,183,362 | B1 | * | 2/2001 | Boushy | 463/25 |
| 6,607,441 | B1 | | 8/2003 | Acres | |
| 6,758,755 | B2 | * | 7/2004 | Kelly et al. | 463/42 |
| 6,776,715 | B2 | | 8/2004 | Price | |
| 2003/0036425 | A1 | | 2/2003 | Kaminkow et al. | |
| 2003/0069071 | A1 | | 4/2003 | Britt et al. | |
| 2003/0148808 | A1 | | 8/2003 | Price | |
| 2004/0132531 | A1 | | 7/2004 | George et al. | |
| 2004/0142750 | A1 | | 7/2004 | Glisson et al. | |
| 2004/0209674 | A1 | | 10/2004 | Canover et al. | |
| 2004/0254010 | A1 | | 12/2004 | Fine | |

FOREIGN PATENT DOCUMENTS

| | | | |
|---|---|---|---|
| EP | 1096438 | A2 | 5/2001 |
| WO | WO 03/026381 | A2 | 4/2003 |

OTHER PUBLICATIONS

Z. Wang; H. Aquino, "Casino Technology: Player Tracking and Slot Accounting Systems", UNLV Gaming Research & Review Journal, vol. 6, Issue 1, pp. 43-56.

* cited by examiner

*Primary Examiner*—Kim Nguyen
(74) *Attorney, Agent, or Firm*—Howard & Howard Attorneys, P.C.

(57) ABSTRACT

An entertainment management system for the gaming industry provides real-time multi-site, slot accounting, player tracking, cage credit and vault, sports book data collection, and table game accounting.

15 Claims, 38 Drawing Sheets

| CURID | CNT_CODE | CURRENCY_NAME |
|---|---|---|
| 1 | USA | us Dollars |
| 2 | USA | us Coins |
| 3 | USA | Casino Chips |
| 4 | USA | Casino Reserve Chips |
| 6 | USA | Tournament Chips |
| 15 | USA | Tote Point |
| 19 | USA | Promo Voucher |
| 20 | USA | FOD Currency |
| 22 | USA | Slot Ticket |
| 21 | USA | Marker Currency |
| 23 | DEU | Deutsch Marks |

ENTERTAINMENT MONITORING SYSTEM AND METHOD

RELATED APPLICATIONS

This patent application is a continuation of U.S. patent application Ser. No. 09/967,571 filed on Sep. 28, 2001 now abandoned, the advantages and disclosure of which are hereby incorporated by reference.

1. FIELD OF THE INVENTION

The present invention relates generally to gaming environments, and more particularly, to a monitoring system and method for gaming environments, such as casinos.

2. BACKGROUND OF THE INVENTION

The present invention relates generally to an entertainment management system for use in gaming environments such as casinos. The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

Given the value of such information to operators and regulators alike, there is an ever-increasing need for an expandable, flexible system which can efficiently, accurately, and in a real-time manner capture, access, accumulate, and process this potentially vast volume of audit, player, and other operations/management data being generated throughout the gaming environment. In turn, there is a corresponding need for a system which can efficiently, accurately and in a real-time manner share, communicate and distribute such information amongst other devices, networks, and systems within the gaming environment. Similarly, there is also the need for a system which can efficiently, accurately, and in a real-time manner analyze, manage, communicate, display, and otherwise report and allow ready access to such data for use by management and regulators.

Existing gaming management systems are, however, cumbersome in their implementations. They are often inefficient in, or incapable of, accumulating and/or processing the vast amount of data generated in a modern gaming environment. They are similarly often inefficient in, or incapable of, sharing, distributing, and communicating the data collected amongst other devices, networks, and systems within the gaming environment in a timely fashion, and, in particular, in a real-time manner. In addition, they are often inefficient, confusing, and burdensome insofar as providing for the display, presentation, or reporting of data to management or regulators, and, in particular, doing so in a real-time manner. Moreover, current systems often utilize hardware or software implementations which are limited in terms of expandability and capability as the needs and demands of the system grow. It is thus desirable to have a system which addresses the shortcomings of the current systems, and which provides additional features not available in existing systems.

SUMMARY OF THE INVENTION AND ADVANTAGES

The present invention provides an entertainment monitoring system for the gaming industry which provides real-time multi-site, slot accounting, player tracking, cage credit and vault, sports book data collection, Point of Sale (POS) accounting, keno accounting, bingo accounting, table game accounting, a wide area progressive jackpot, and electronic funds transfer (EFT).

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

I. Table of Contents

II. EMS Overview

A. Tier 1: The Back End Database

B. Tier 2: The EMS Middleware

Figure 1:
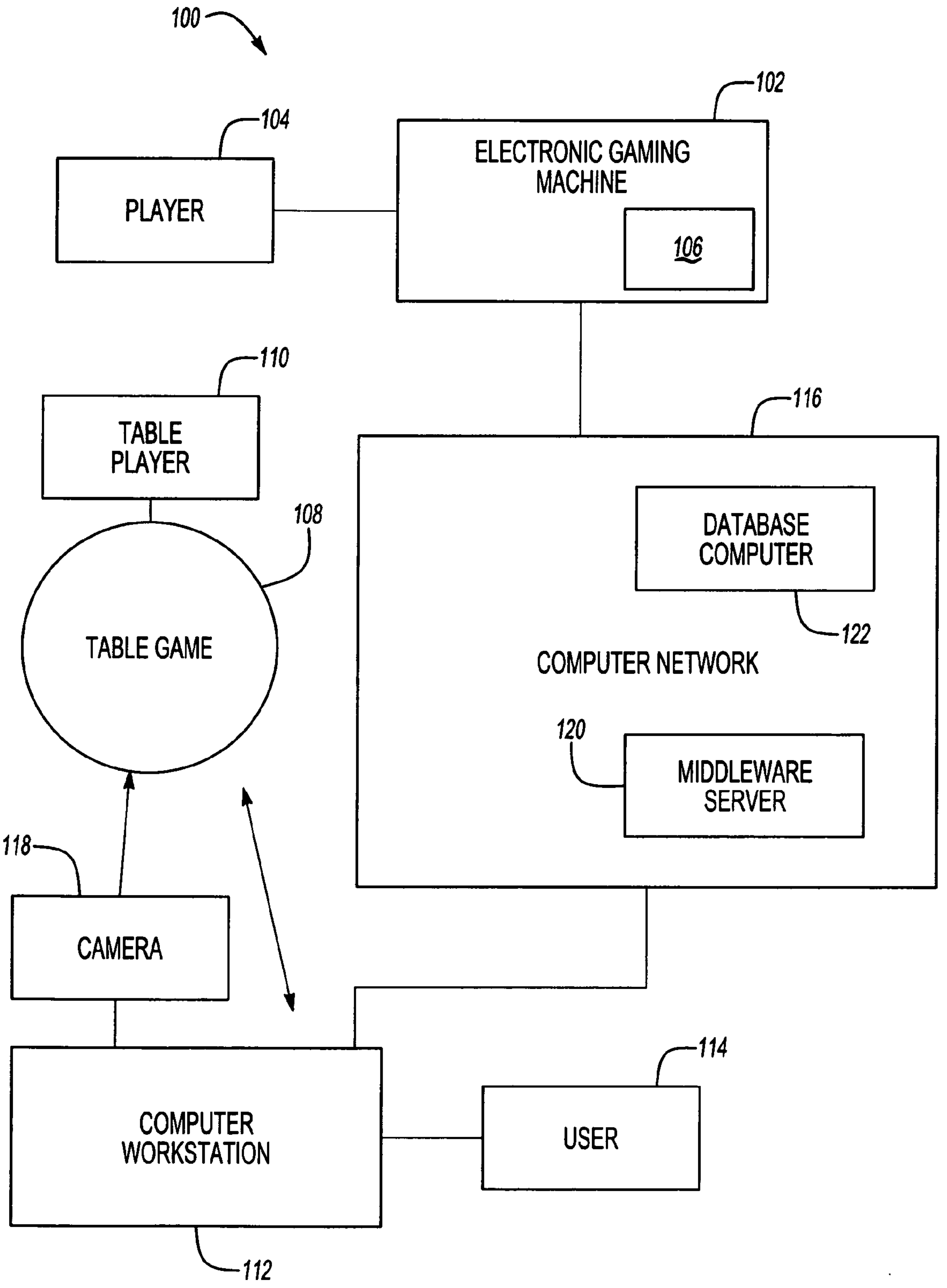
FIG. 1 is a block diagram of an entertainment monitoring system (EMS), according to an embodiment of the present invention.

C. Tier 3: The Client Front End Application and The Network Active Motherboard (NAM) Application D. Site Configurations
1. Single Site Configuration
2. Multi-Site Configuration
3. Application Service Provider (ASP) Configuration
4. Configuration with External Devices
5. Configuration with Counting Devices
6. Progressive Configuration
7. Unlimited Wide Area Progressive Configuration
III. EMS Forms, Reports and Processes
A. Logon
B. Frequently Used Tabs and Components
1. The Search Function
2. The Address Window
3. The Telephone Window
4. The Email Window
5. The Note Window
C. The Asset Management Module
1. Bingo Maintenance
2. Point Redemption Terminal
3. Slot Maintenance
4. Table Maintenance
5. Terminal Maintenance
6. Game
7. Manufacturer
8. Quick Setup
D. Bingo Accounting
E. The Cage and Vault Module
F. The Financial Integration Module
1. The Currency Setup Form
2. Financial Institution Form
3. Exchange Form
4. Lessor Form
5. Participant Form
6. Report Form
G. Human Resources
H. Marketing
1. Attendance Form
2. Bulk E-Mail Form
3. Comp Maintenance Form
4. Comp Point Maintenance Form
5. Events Form
6. Group Point Management Form
7. Group Setup Form
8. Creating Group Form
9. Incentives Form
10. Invitations Form
11. Mailing Lists Form
12. Point Caps Form
13. Point Management Form
14. Random Draw Form
15. Tour Operator Form
16. Tours Form
17. Voucher Status Form
I. The Patron Tracking Module
J. Security
K. Slot Accounting Module
L. Sports Book Accounting Module
M. System Administration
N. Table Game Accounting Module
O. Universal Regulatory Monitoring (URM) Module II. EMS Overview With reference to the drawings and in operation, the present invention provides an entertainment monitoring system 100 and method 200 for use in gaming environments, e.g., casinos. With specific reference to FIG. 1, the entertainment monitoring system (EMS) 100 includes a plurality of first games further defined as electronic gaming machines 102, e.g., an electronic video slot machine, for play by a player 104. The electronic gaming machine 102 includes a microprocessor based module or network active motherboard (NAM) 106. The NAM 106 is coupled to the electronic gaming machine 102 and is adapted to sense electronic gaming data related to the player 104 and the electronic gaming machine 102 during the player's play of the electronic gaming machine 102.

The entertainment monitoring system 100 also includes a table game module for monitoring play at a second game further defined as a table game 108, e.g., roulette or blackjack. The table game 108 comprises a gaming table for play by a plurality of table players 110. A computer workstation 112 is adapted to be operated by a user 114 and to receive table data input by the user 114. The table data is related to the play at the table game 108. A computer network 116 is coupled to the computer based module 106 and the computer workstation 112 and is adapted to receive the electronic gaming data and the table data and to store the data in a database. As described below, the computer workstation 112 is adapted to run computer software modules (see below) related to operation of the entertainment monitoring system 100.

As more frilly described below, the electronic gaming data may include game play, transactions, and player identification and the table data may include game play, transactions, player identification and seat occupation, i.e., which seats around the table are occupied. Players at the electronic gaming machine 102 may be identified by a player's identification card (not shown), by a personal identification number input on a keypad, and/or any other suitable sensed biometric or other means. Players at the table game 108 may be identified by a player identification card, a personal identification number, by suitably identifying themselves to the user 114 or other employee of the casino, and/or any other suitable sensed biometric or other means.

Although the example described above and shown in FIG. 1 includes a single electronic gaming machine and a single table game, in practice the gaming environment would include a plurality of electronic gaming machines and a plurality of table games. It should be noted that the present invention is therefore not limited to a single electronic gaming machine or a single table game.

In one embodiment, the computer workstation 112 is situated near the table game 108. In this embodiment, the computer workstation 112 is positioned such that the user 114 is able to visually monitor play at the table game 108.

In another embodiment, the EMS 100 includes a video camera 118 coupled to the computer workstation 112 and situated near the table game 108. With the video camera 118, play at the table game 108 is observable by the user 114 via the computer workstation 112.

In one embodiment of the present invention, the computer network 116 includes a middleware server 120 and a database computer 122. The middleware server 120 controls and directs the transfer of data between the database computer 122 and the computer workstation 112. The database computer 122 manages and provides access to the database of information stored therein.

Figure 2:
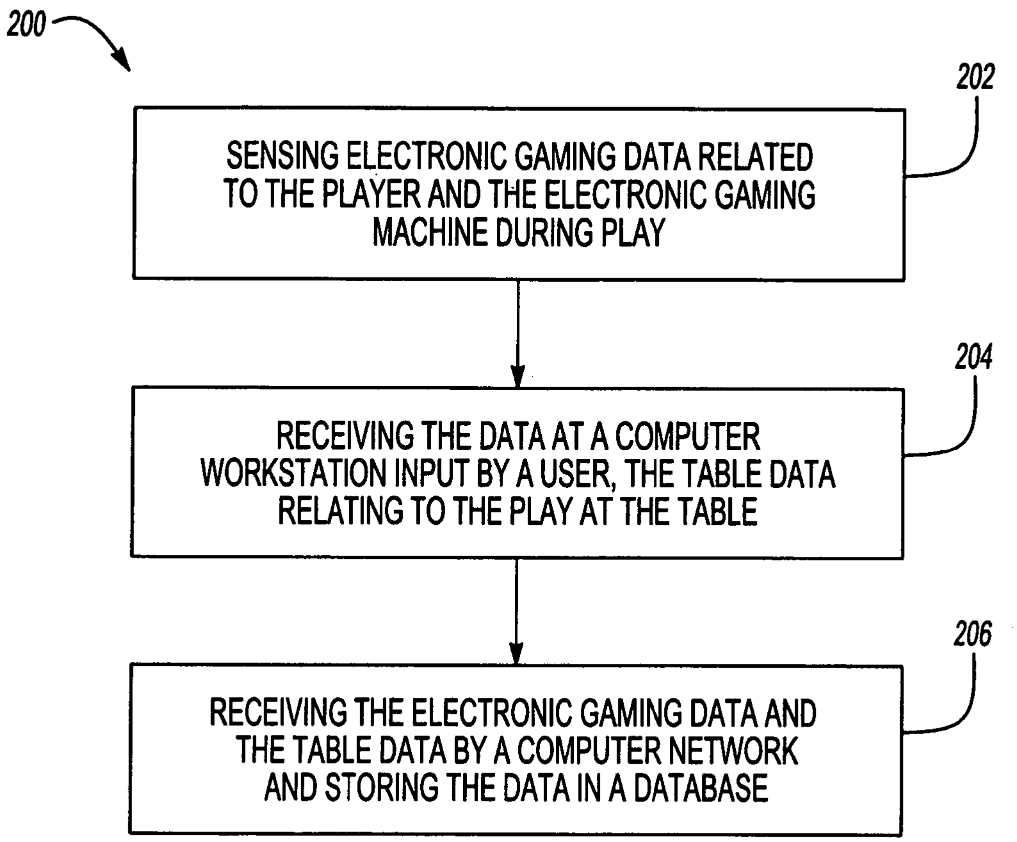
FIG. 2 is a flow diagram illustrating operation of the EMS of FIG. 1.

With respect to FIG. 2, a method 200 for monitoring the gaming environment 100 will now be discussed. As described above, the gaming environment includes the electronic gaming machine 102 and the table game 108.

In a first control block 202, the electronic gaming data related to the player 104 and the electronic gaming machine 102 is sensed during the player's play of the electronic gaming machine 102. In a second control block 204, the table data is input by the user 114 and received by the computer workstation 112. The table data relates to the play at the table game 108. In a third control block 206, the electronic gaming data and the table data are received by the computer network 116 and stored in the database.

In one embodiment of the present invention, the method 200 further includes the steps of determining an amount of at least one of currency and cash and generating an amount signal and receiving the amount signal at the computer network and storing the amount signal in the database.

Figure 3:
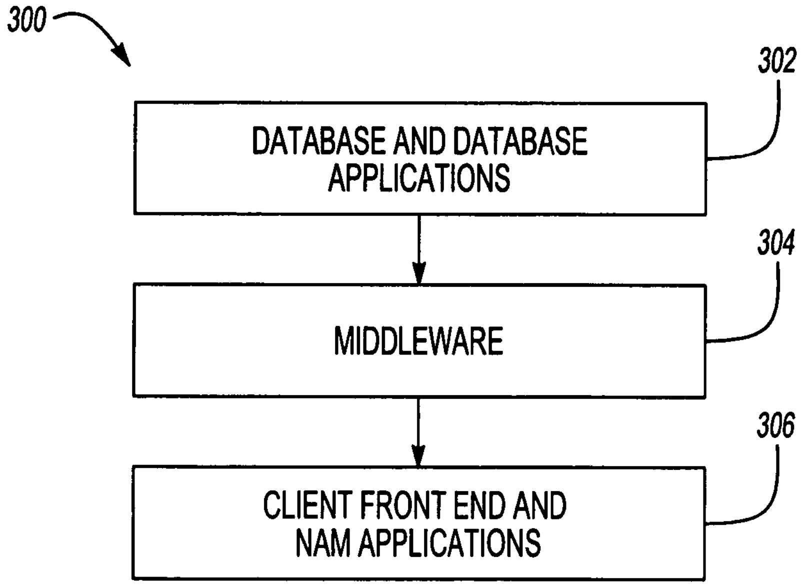
FIG. 3 is a block diagram of the computer software applications for the EMS of FIG. 1.

With reference to FIG. 3, the NAM 106, the computer workstation 112, the middleware server 120 and the database computer 122 are controlled via computer software 300. In one embodiment, the EMS application is a three-tier application designed and written to perform over a wide range of platforms. Each of the three tiers of the application is designed to be scalable from very small environments to extremely large multi-site operations. The software components of the system are the back end database (Tier 1) 302, the EMS Middleware (Tier 2) 304, and The Client Front End Application (Tier 3 at the Application level) and the Network Active Motherboard (NAM) Application (Tier 3 for the gaming devices and progressives) 306.

At the gaming device and progressive level is the NAM 106, which is a flexible, modular, powerful data collection device.

In one embodiment, the NAM 106 is based on a 16 bit microprocessor on a motherboard (not shown). Communication with the electronic gaming machine 102 is accomplished via an asynchronous serial port, e.g., RS232, RS485, fiber optic or current loop, provided on a daughter board (not shown).

In one embodiment, the database is an Oracle database and the software components are implemented in Java. By utilizing Oracle and Java, a superior level of portability and flexibility across a wide variety of hardware platforms and operating systems is achieved.

Figure 1A:
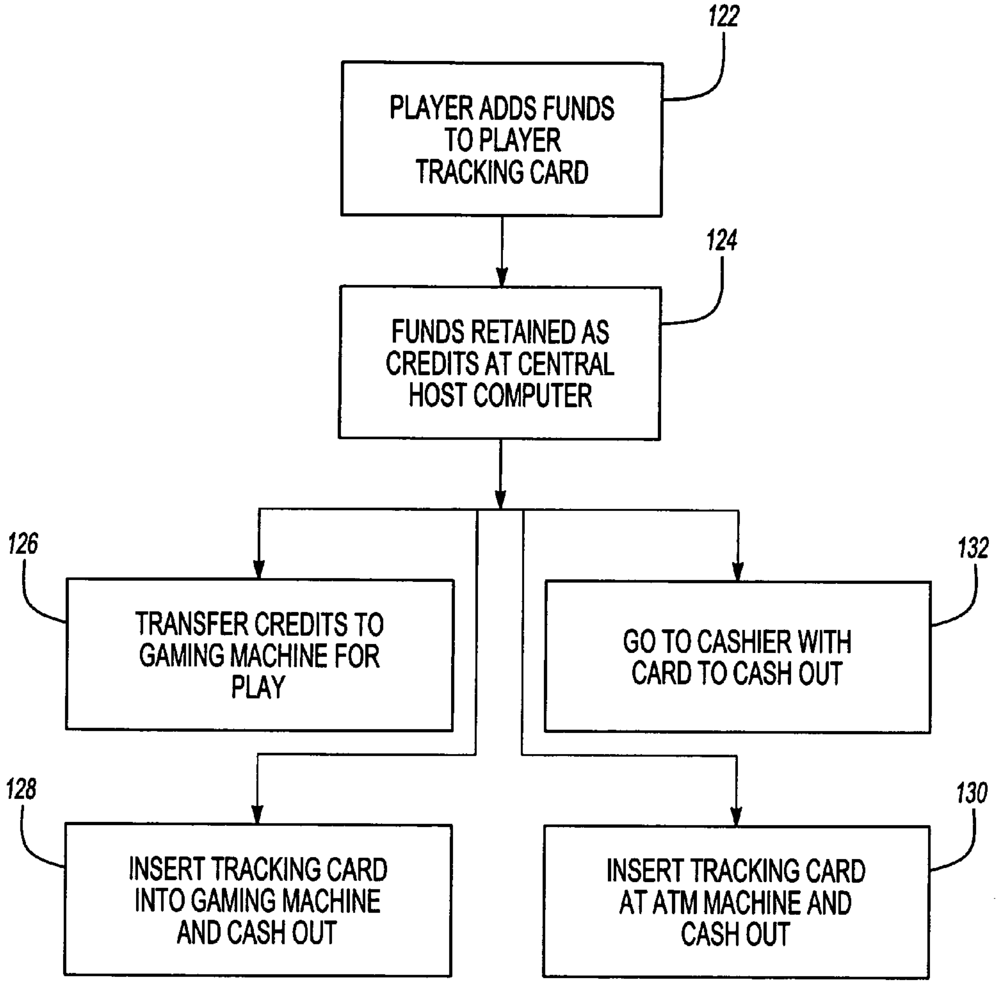
FIG. 1A is a flow diagram illustrating cashless wagering in an entertainment monitoring system (EMS)

With reference to FIG. 1A, the EMS 100 features cashless wagering. The player initially inserts money/script/debt card into a machine in the form of their player tracking card. Funds can be added to a player's account, and thus accessible via their player tracking card, through the insertion of coin, cash (bills) into the machine or a transfer from a credit or debit card inserted into the machine (block 122). The money is retained as credits at a central, host computer (124). If a player has money left and decides to leave the machine, they simply instruct the amount to be saved (as opposed to cashing out) whereupon the remaining funds displayed at the machine are retained as credits in the central account. Once in the account the player can do the following:

a. go to another machine and electronically transfer funds (EFT) from the account for gaming (block 126). The desired amount is transferred to the machine as credits for playing; OR
b. go to a machine, instruct the system to transfer all funds and then cash out, whereupon the machine would dispense money or script to the player (block 128); OR
c. go to a system ATM and using their card, cash out their account (block 130); OR
d. to a cashier and provide their card to the cashier to cash out a desired amount. (block 132).

Figure 1B:
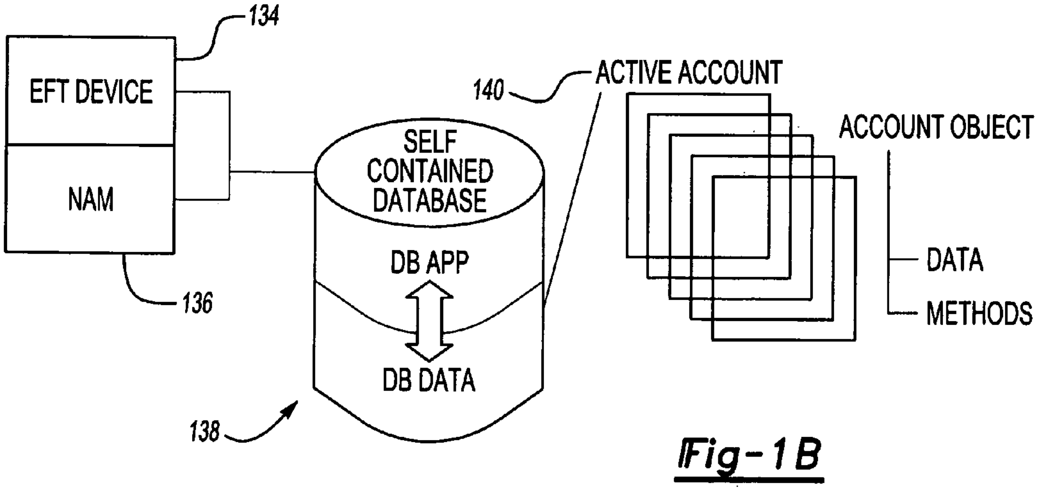
FIG. 1B is a block diagram of a portion of the EMS of FIG. 1 directed towards cashless wagering.

At the ATM, the player may be able to transfer funds from a bank to their gaming account using a credit or debit card. In a further aspect, when a player cashes out, the machine/ATM will issue script or a ticker coupon which the player can use in another machine or take to the cashier's cage for payment. With reference to FIG. 1B, the EMS 100 includes a plurality of EFT or gaming devices 134 (only one of which is shown) with an associated module or NAM board 136. The EFT device 134 and the module 136 are linked to a database 138. The data base 138 includes a plurality of active accounts. Each account includes a plurality of data or account objects 140. The devices 134 are configured to communicate player credit and debit data from said devices to the data object. The data objects are configured to both store the data and act on the data to facilitate funds accounting and transfer.

The EMS 100 may also use a hyper text transfer protocol (http) server as a jackpot display controller and fashion the display of an electronic gaming machine as an Internet browser which refreshes the display for the progressive jackpot(s). In other words, the jackpot display acts as a browser page which is refreshed by the controller to display the current level of the jackpot. In a related aspect, a device is provided which is installed inline with the display for the gaming device. The device intercepts the game display signal and adds to it a transparent overlay of the progressive information as well as, if desired, bonusing information, event information, offers or other information to be conveyed to the patron. The information may be displayed as a watermark banner or the like.

The EMS 100 includes accounting and player tracking systems which track transactions at machines (for example, coin in/out, jackpots, door open, service, etc.) as well as track play for players. For player tracking, players are issued a machine-readable card which they insert in the machine. The machines read that card and access a player's account to track play for the purposes of awarding "comps".

A. Tier 1: The Back End Database

In one embodiment, the database tier 302 is an Oracle **8*i* database. The Oracle database 302 is completely normalized, in 5th normal form. The database 302 consists of 324 tables; 214 views; 62 sequences; 1152 indexes; 672 functions, procedures, and packages. The system utilizes Oracle's Advanced Replication in a multi-master configuration with customized replication code, procedures, functions, packages, and conflict resolution algorithms. The preponderance of the business logic of the system is contained in and controlled by database tier 302**.

B. Tier 2: The EMS Middleware

The middleware tier 304 is a 100% Java application running under the Linux operating system. The middleware 304 collects the data from the online gaming devices, formulates it, accumulates it, applies some business logic where necessary, and interacts with the database 302. The middleware 304 is also responsible for accumulating all data from the external interfaces such as Point Of Sale and Property management systems (see below). All communications are accomplished through TCP/IP encrypted packets with external devices, e.g., the NAM 106 and the computer workstation 112. All communication with the database 302 is accomplished via Thin JDBC drivers over TCP/IP.

C. Tier 3: The Client Front End Application and The Network Active Motherboard (NAM) Application The client front end application is written in Java. The Java code is stored on the database. The Java code is downloaded to the workstation 112 as needed.

The software in the NAM 106 is written in C++ and operates on the US Software MultiTask operating system with the US Software TCP/IP stack. All communication to the gaming device is accomplished via an RS-232 serial, current loop serial, RS-485, Fiber, or Ethernet interface depending on the gaming device. All communications to the Middleware application 304 is accomplished via TCP/IP packets.

D. Site Configurations

The present invention is adaptable to gaming sites of different sizes and architectures. Several are discussed below. It should be noted that the sites described below are not intended to be all-encompassing and the present invention is not to be limited to such sites.

1. Single Site Configuration

Figure 4:
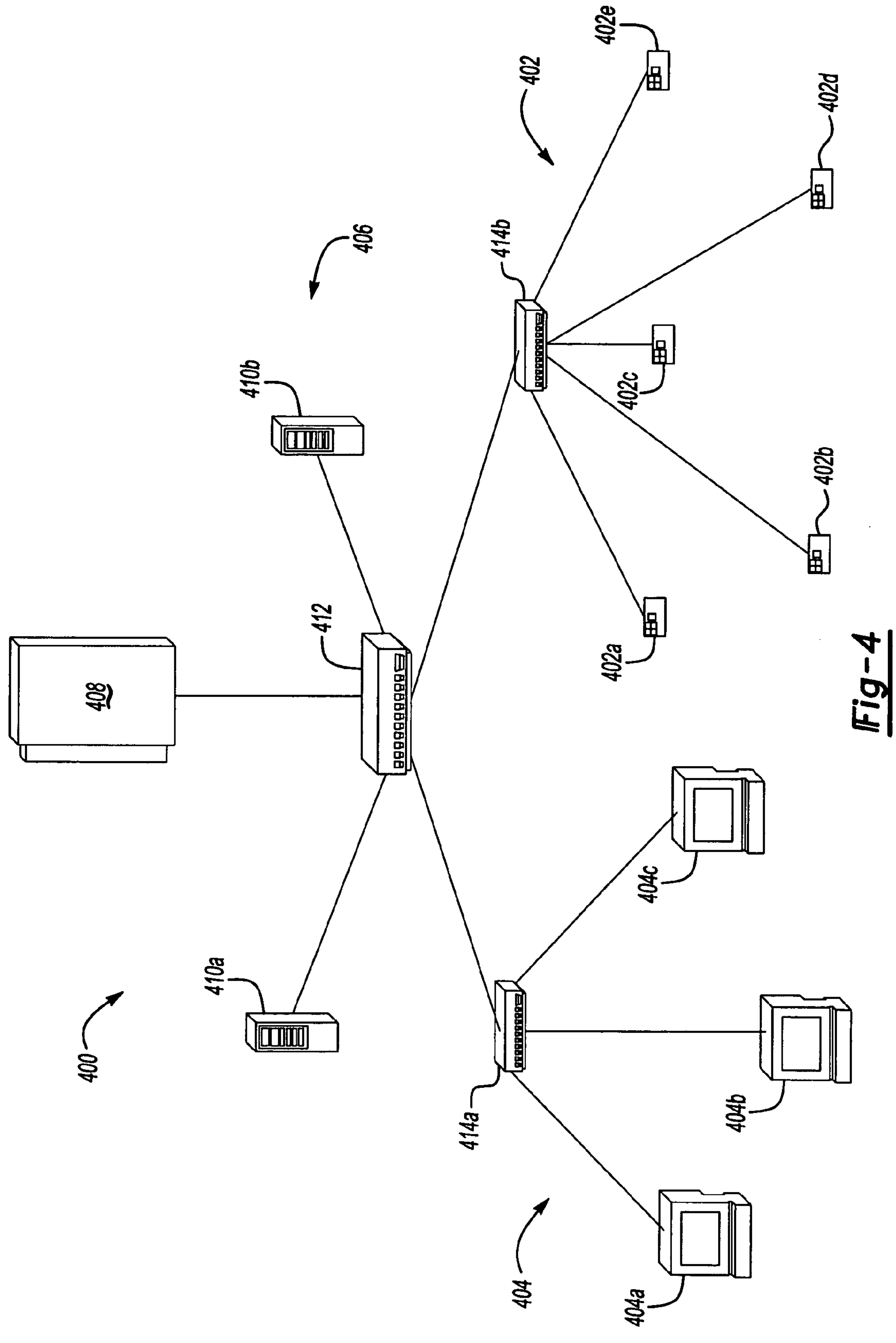
FIG. 4 is a diagrammatic illustration of an EMS single site configuration, according to an embodiment of the present invention.

With specific reference to FIG. 4, a single site configuration 400, according to an embodiment of the present invention is shown. The single site configuration 400 includes a plurality of microprocessor based modules (NAMs) 402. In this embodiment, first, second, third, fourth and fifth microprocessor based modules 402A, 402B,402C, 402D,402E are shown. Each microprocessor based module 402A, 402B,402C,402D,402E is coupled to a corresponding electronic gaming machine (not shown).

The single site configuration 400 also includes a plurality of computer workstations 404. In this embodiment, first, second, and third computer workstations 404A,404B,404C are shown. Each computer workstation 404A,404B,404C is operated by a corresponding user (not shown). As described below, the computer software modules available to a particular user are dependent upon the user and determined by the database. For example, the user described above regarding the tables games, is generally referred to as a "pit boss" responsible for one or more table games. The pit boss user only has access to those modules related to inputting data regarding the table game. One or more of the computer workstations 404A,404B,404C may correspond to one or more table games, as described above (not shown). Alternatively, the computer workstations 404A,404B,404C may be accessed by a different type of user, whereas different software modules are available for use. For example, to establish a new user account, including a player tracking card, a new user workstation may be provided including the functionality necessary only to perform the task of building a new user account and issuing a player tracking card.

The microprocessor based modules 402 and the computer workstations 404 are coupled to a computer network 406 and gather/receive data related to the corresponding electronic gaming machine or table game.

In this embodiment, the computer network 406 includes a supercomputer 408 available from Silicon Graphics Inc (SGI) of Mountain View, Calif. and two middleware servers 410A,410B. The supercomputer 408 and the two middleware servers 410A,410B are coupled by a 100 MB Ethernet switch 412. Other supercomputers are contemplated, such as servers available from Sun Microelectronics or IBM, and thus the present invention is not limited to any such one supercomputer.

The computer workstation 404 are coupled to the Ethernet switch 412 by a first Ethernet hub 414A. The microprocessor based modules 402 are coupled to the Ethernet switch 412 by a second Ethernet hub 414B.

Data related to players and games played on the electronic gaming machines and the tables games are relayed to the supercomputer 408 and stored in the database. For example, the data includes coin in, coin out, cash in, cash out, etc. . . . The database is an Oracle 8*i* database running under the IRIX operating system. The Middleware server is running the Linux operation system.

2. Multi-Site Configuration

Figure 5:
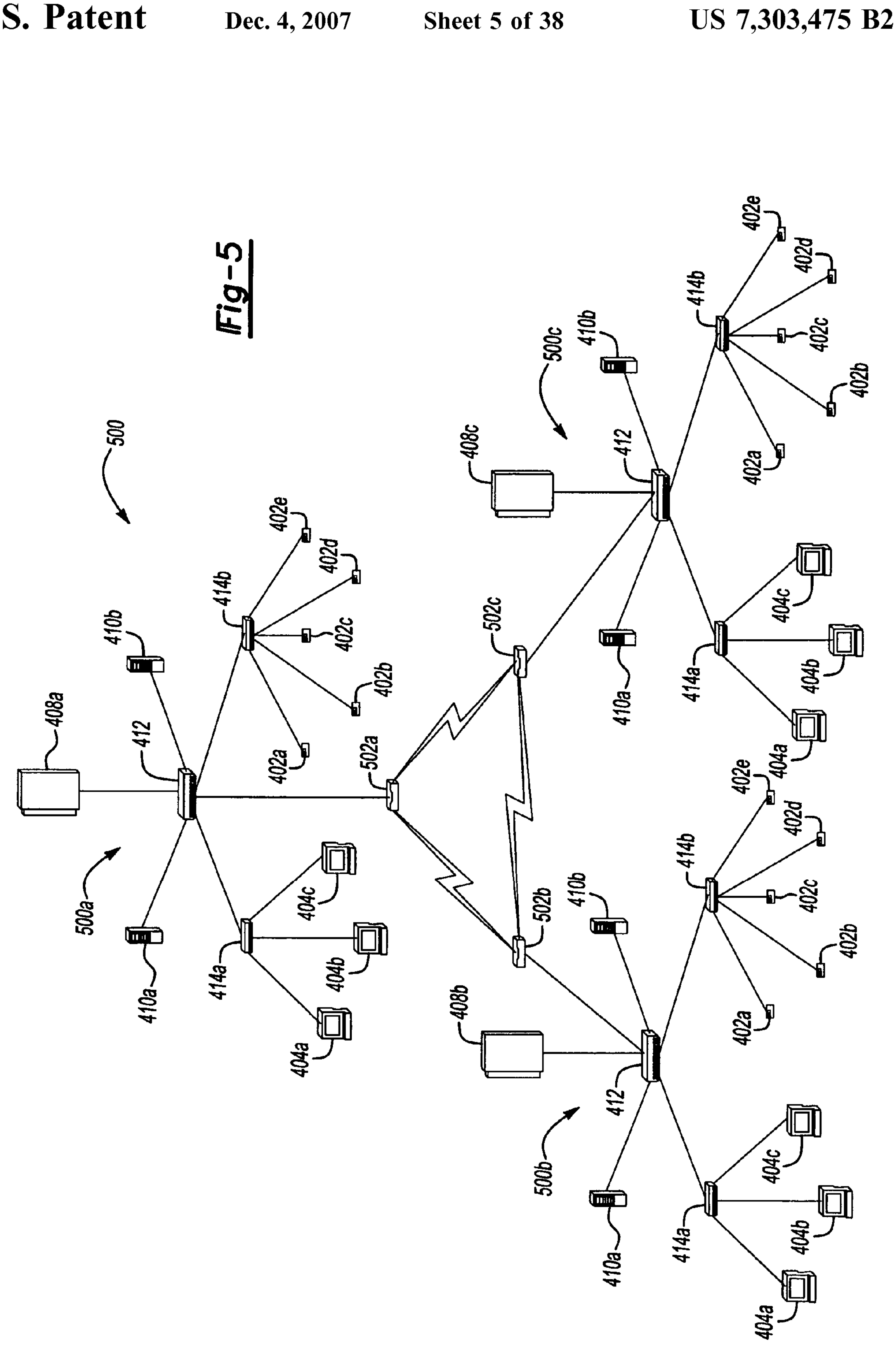
FIG. 5 is a diagrammatic illustration of an EMS multi-site configuration, according to an embodiment of the present invention.

With specific reference to FIG. 5, where like parts are denoted with similar reference numbers, a multi-site configuration 500 is shown. The multi-site configuration 500 is located at three sites 500A,500B,500C (which may or may not be in the same physical location or casino) each having its own database computer 408A,408B,408C (on site or off-site). Alternatively, the sites 500A,500B,500C may each share a database computer located at one of the sites 500A,500B,500C, or elsewhere. In this embodiment, each site 500A,500B,500C is identical to the single site configuration 400 of FIG. 4 and is thus not further discussed.

The sites 500A,500B,500C are linked via first 502A, second 502B, and third 502C routers using the TCP/IP protocol.

3. Application Service Provider (ASP) Configuration

Figure 6:
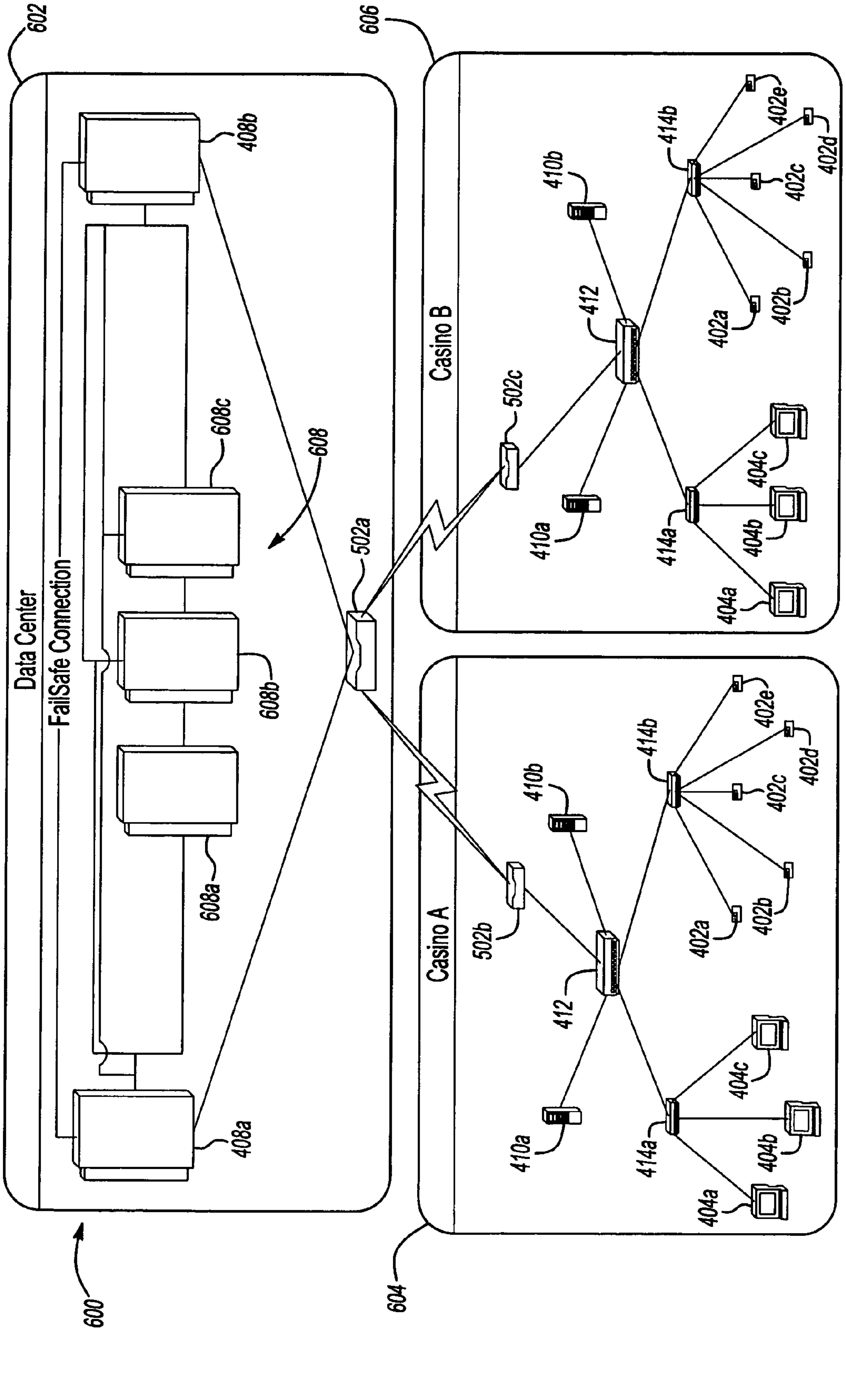
FIG. 6 is a diagrammatic illustration of an EMS application service provider (ASP) configuration, according to an embodiment of the present invention.

With specific reference to FIG. 6, where like parts are denoted with similar reference numbers, an application service provider (ASP) configuration 600 is shown. The ASP configuration 600 has three locations, a data center 602, a first gaming environment or casino 604 and a second gaming environment or casino 606. In the embodiment shown, each casino 604,606 is shown as a single site configuration similar to FIG. 4 and is therefore not further discussed.

The data center 602 includes first and second supercomputers 408A,408B. The first and second supercomputers 408A,408B (which can be configured as a redundant array) are coupled, via first, second, and third routers 502A,502B, 502C, to the Ethernet switch 412 at the first and second casino 604,606, respectively. The first and second supercomputers 408A,408B control access to and perform operations on the database. In one embodiment, the database is stored on a plurality of redundant arrays of independent disk drives (RAID) 608. In the illustrated embodiment, three racks of RAID drives 608A,608B,608C are shown.

4. Configuration with External Devices

Figure 7:
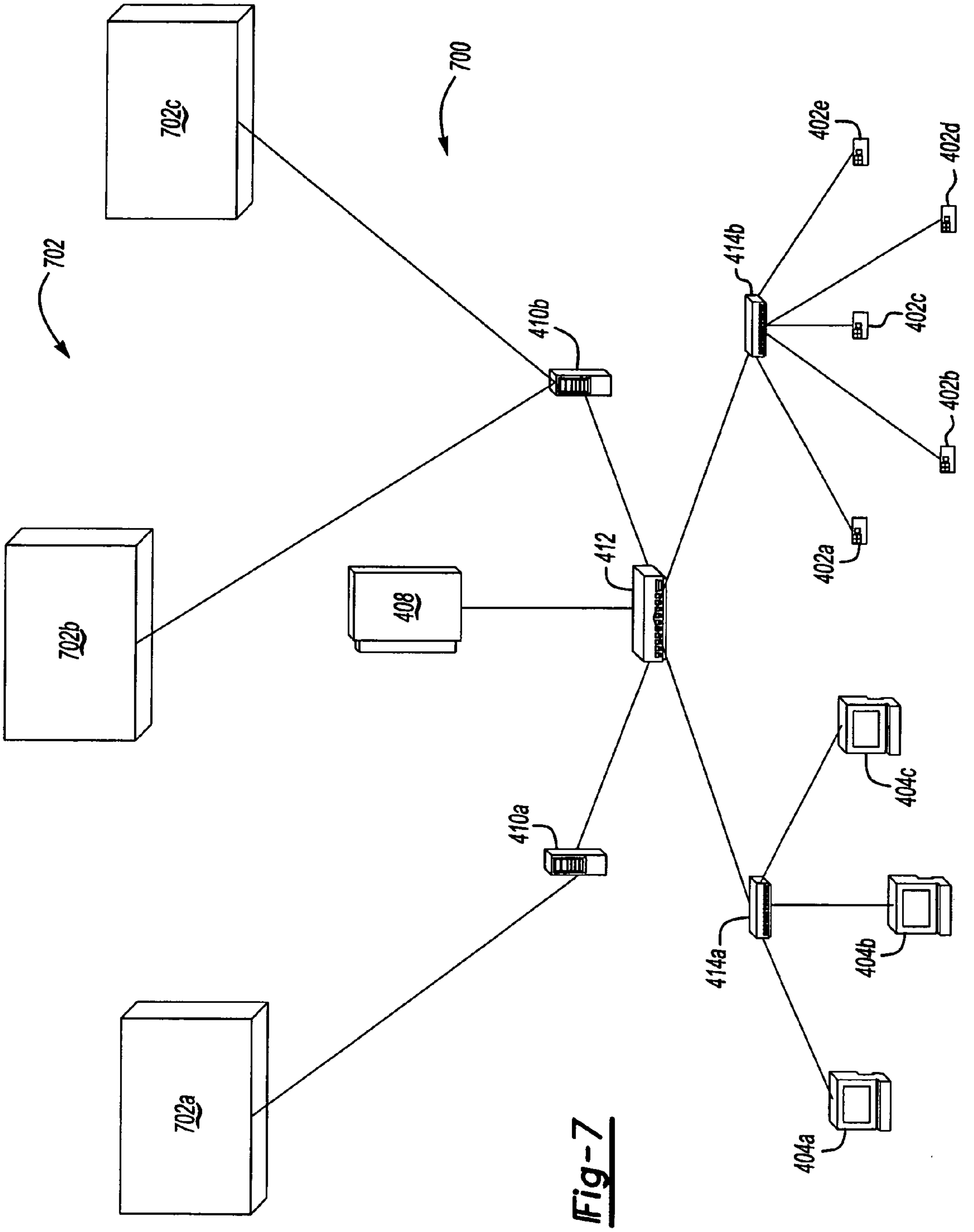
FIG. 7 is a diagrammatic illustration of an EMS configuration with connection to external devices through external interfaces, according to an embodiment of the present invention.

With specific reference to FIG. 7, where like parts are denoted with similar reference numbers, an external interface configuration 700 is shown. The external interface configuration 700 shown in FIG. 7 is shown as having a single site, however, it should be understood that the configuration 700 could include multiple sites. In the embodiment shown, a single site configuration similar to FIG. 4 is shown and is therefore not further discussed.

Additionally, the middleware servers 410A,410B are coupled to a plurality of external systems 702, such as point of sale (POS) systems, hotel property management systems (PGS) and the like. The external systems 702 allow for the redemption, i.e., of comp points (see below), use of coupons, or other promotions. In this manner, player tracking may continue at venues off the casino floor, such as the buffet (POS), hotel (PGS) or convenience stores (closed systems) associated with the casino. Thus, players can utilize points and collect points while conducting other business in the casino properties.

5. Configuration with Counting Devices

Figure 8:
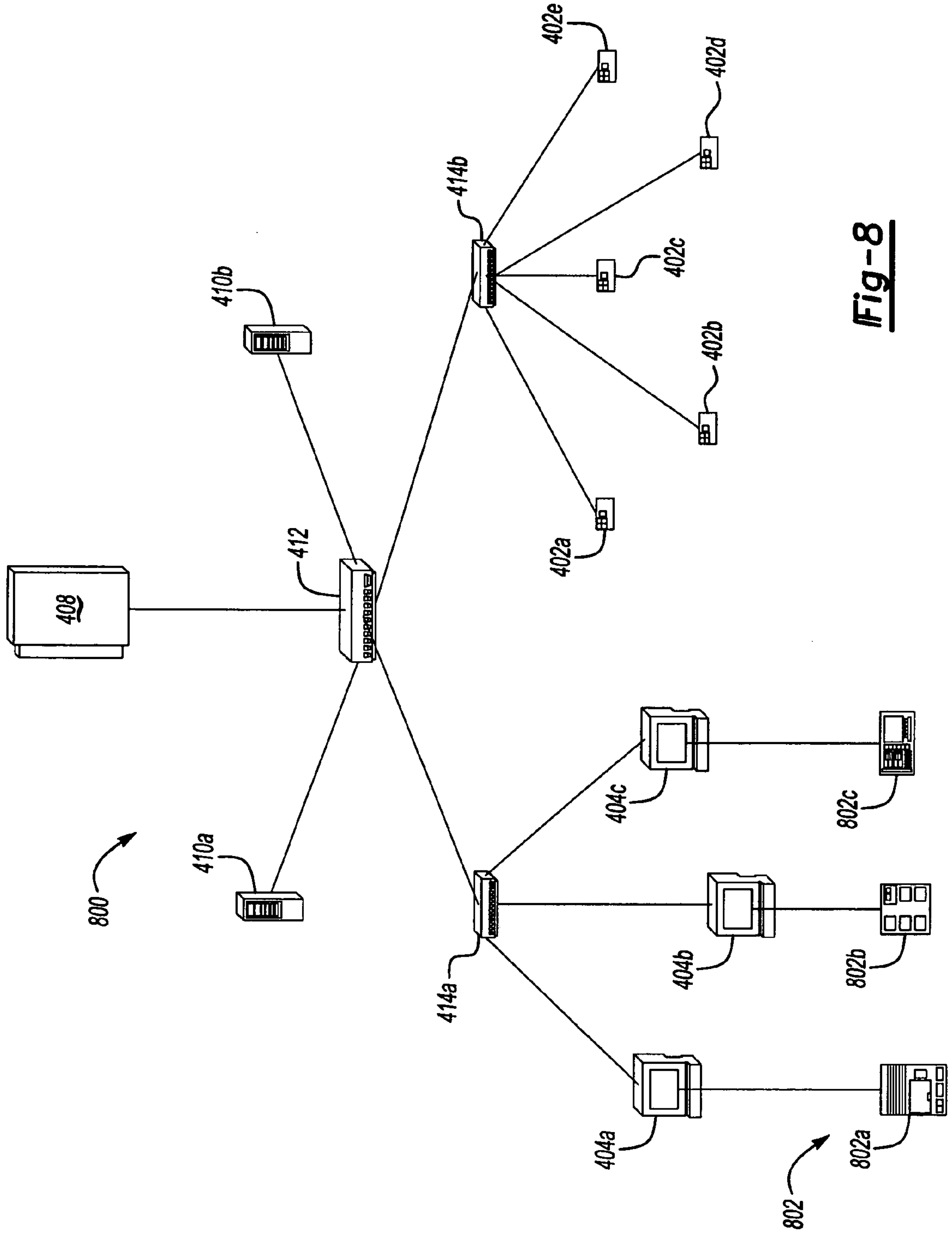
FIG. 8 is a diagrammatic illustration of an EMS configuration with connection to hard and soft counting devices, according to an embodiment of the present invention.

With specific reference to FIG. 8, where like parts are denoted with similar reference numbers, a configuration 800 with hard and soft count interfaces is shown. The count interface configuration 800 shown in FIG. 8 is shown as having a single site, however, it should be understood that the configuration 800 could include multiple sites. In the embodiment shown, a single site configuration similar to FIG. 4 is shown and is therefore not further discussed.

In this embodiment, the first, second, and third workstations 404A,404B,404C are coupled to a plurality of counting devices 802. In the illustrated embodiment, the first workstation 404A is coupled to at least one coin scale 802A, the second workstation 404B is coupled to at least one coin counter 802B, and the third workstation 404C is coupled to at least one currency counter 802C. After a pickup, i.e., where coins, tickets, tokens and/or currency are removed from the electronic gaming machines and tables by the casino staff, the coins, tickets, tokens, and/or currency are counted and respective accounting signals are generated. The accounting signals are relayed and stored in the database on the supercomputer 408. As discussed below, the amounts counting by the counter devices 802 are correlated back to the corresponding gaming machine. These amounts are then compared with the data received directly from the gaming machine (see below).

6. Progressive Configuration

Figure 9:
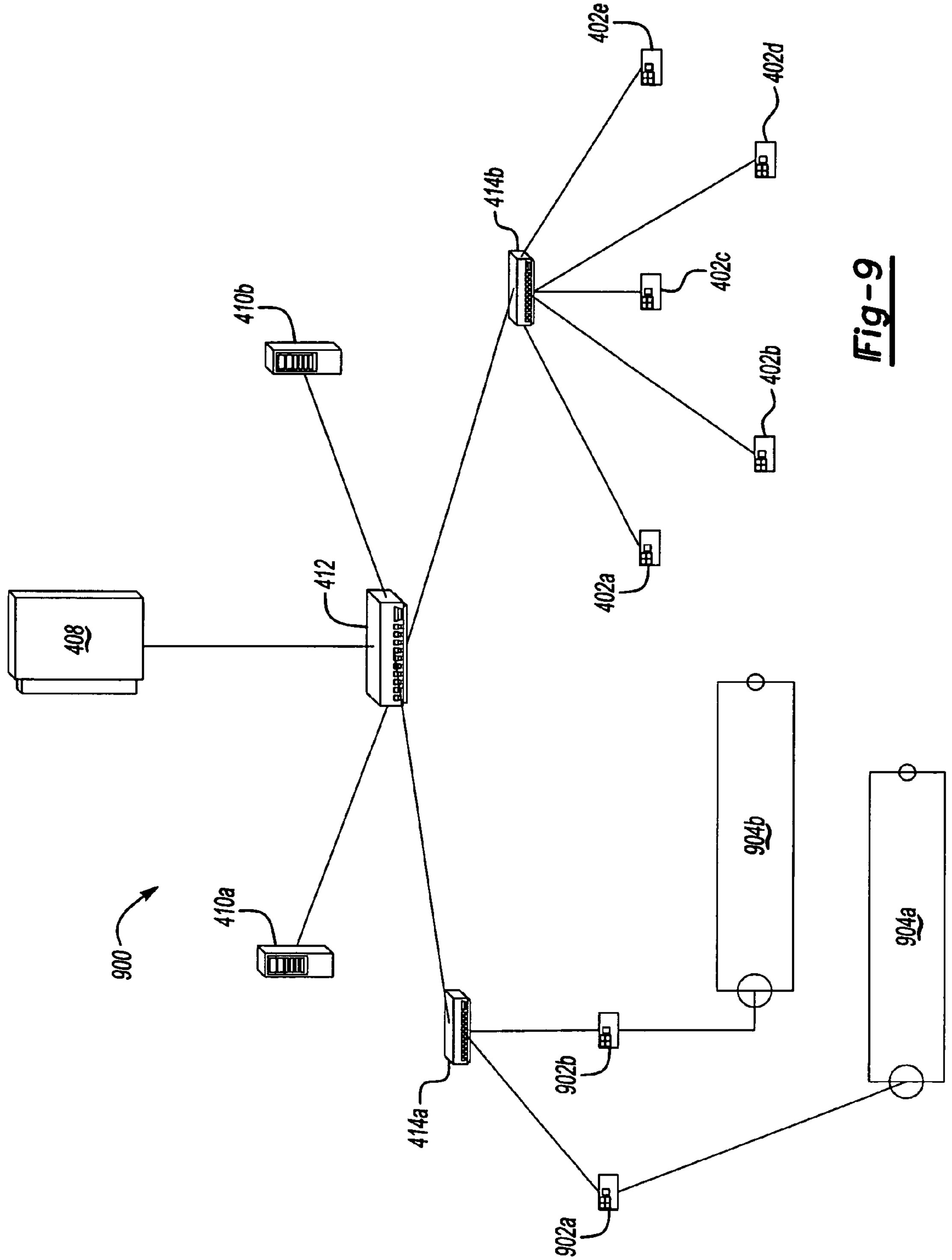
FIG. 9 is a diagrammatic illustration of an EMS progressive configuration, according to an embodiment of the present invention.

With specific reference to FIG. 9, where like parts are denoted with similar reference numbers, a progressive configuration 900 is shown. The local area progressive configuration 900 shown in FIG. 9 is shown as having a single site, however, it should be understood that the configuration 900 could include multiple sites. The right side of the illustrated local area progressive configuration 900 is similar to FIG. 4 and is therefore not further discussed.

The first Ethernet hub 414 is connected to sixth and seventh microprocessor based modules 902A,902B. In the progressive configuration 900, a progressive jackpot 904 is maintained for a plurality electronic gaming machines (not shown in FIG. 9). As shown, the electronic gaming machines corresponding to the sixth and seventh microprocessor based modules 902A,902B share a progressive jackpot which is displayed on progressive displays 904A,904B, respectively. This progressive system is database centric in that all fundamental progressive activity occurs at and from the database 408.

Figure 9A:
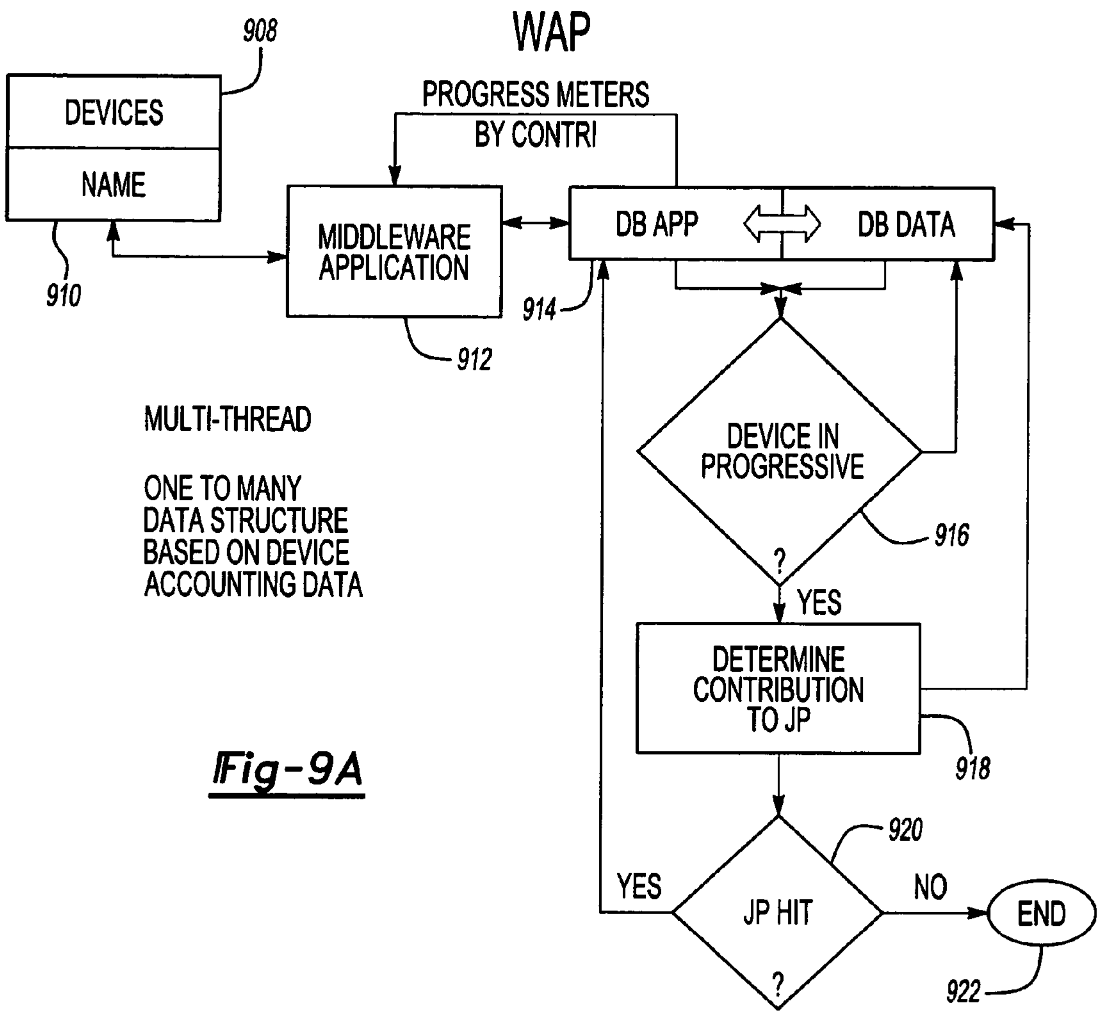
FIG. 9A is a flow diagram illustrating operation of a progressive configuration of the EMS.

With reference to FIG. 9A, the progressive jackpot is represented as a data object within the database. A plurality of gaming devices 908 and a plurality of corresponding modules 910 communicate player credit and debit data from the devices to the data object representing the jackpot via the middleware application 912 and the database application 914. For each gaming device 908, the database application determines if the gaming devive 908 is included in the progressive game (decision block 916). If yes, then in a block 918, the database application 914 determines the device's 908 contribution to the jackpot based on a number of factors, i.e., wager, etc. . . . In a decision block 920, the database application 914 determines if the progressive jackpot has been hit and takes the appropriate action, e.g., pay out.

7. Wide Area Progressive Configuration

Figure 10:
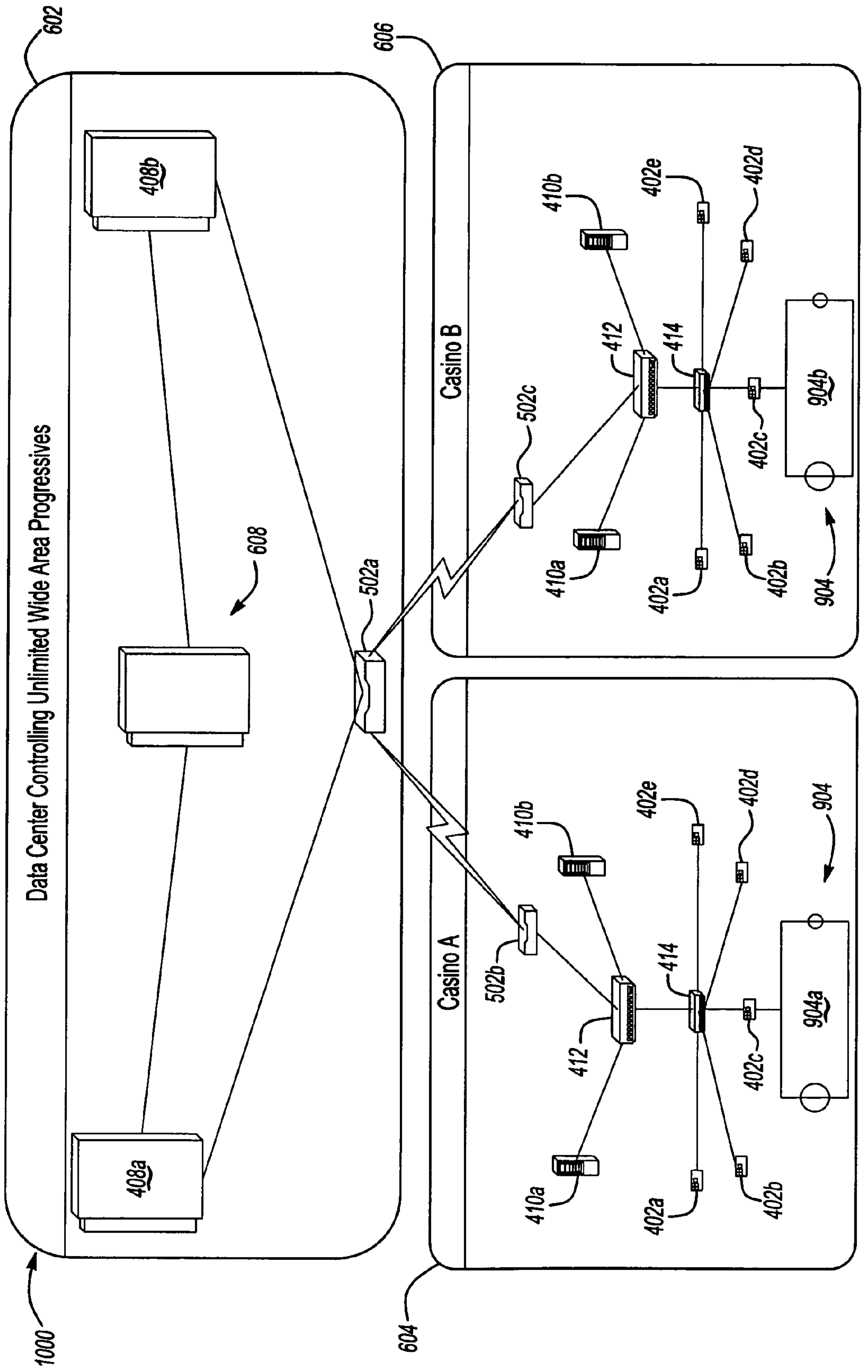
FIG. 10 is a diagrammatic illustration of an EMS wide area progressive configuration, according to an embodiment of the present invention; and, FIGS. 11-65 are screenshots of a computer program application for use with the EMS, according to an embodiment of the present invention.

With specific reference to FIG. 10, where like parts are denoted with similar reference numbers, a wide area progressive configuration 1000 is shown. The wide area progressive configuration 1000 shown in FIG. 10 is a multi-site configuration similar to FIG. 6.

However, in the wide are progressive configuration 1000, the progressive jackpot 904 is used with at least one electronic gaming machine at more than one site 604, 606. In the illustrated embodiment, the electronic gaming machine coupled to the third microprocessor based module 402C is tied to the progressive jackpot 904, which is displayed in the progressive displays 904A,904B.

III. EMS Forms, Reports and Processes

A. Logon

As discussed above, the client front end (EMS) 100 is accessible by different types of users as determined by the database. The modules or applications available to a particular user are dependent upon who the user is and his/her job classification. The EMS applications 306 are accessible through the computer workstations 112, 404A,404B,404C.

Figure 11:
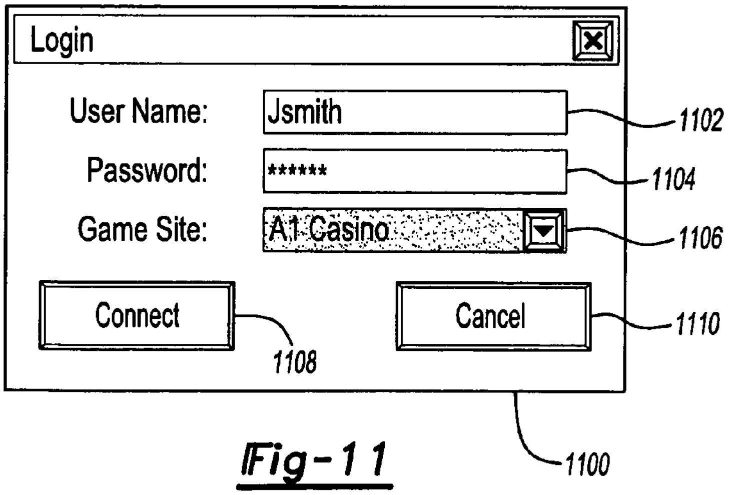

Connecting to the EMS requires a unique User Name/Password assigned by a System Administrator (or alternately, choosable by the user). An application icon (not shown) is located on the workstation's desktop. With reference to FIG. 11, when the icon is selected, the system 100 is launched and a logon dialog 1100 is displayed. In one embodiment, the logon dialog 1102 includes a user name entry box 1102, a password entry box 1104, and a game site drop down list 1106 (the user can also be identified by a magnetic strip card or via an appropriate biometric identification means). The logon dialog 1100 also includes a connect button 1108 and a cancel button 1110. To logon onto the system 100, the user's User Name and password must be entered in the respective entry box 1102,1104, the appropriate site chosen from the drop down list 1106 and the connect button 1108 selected. For security purposes, the user's password will be hidden by a series of "*", as shown.

Figure 12:
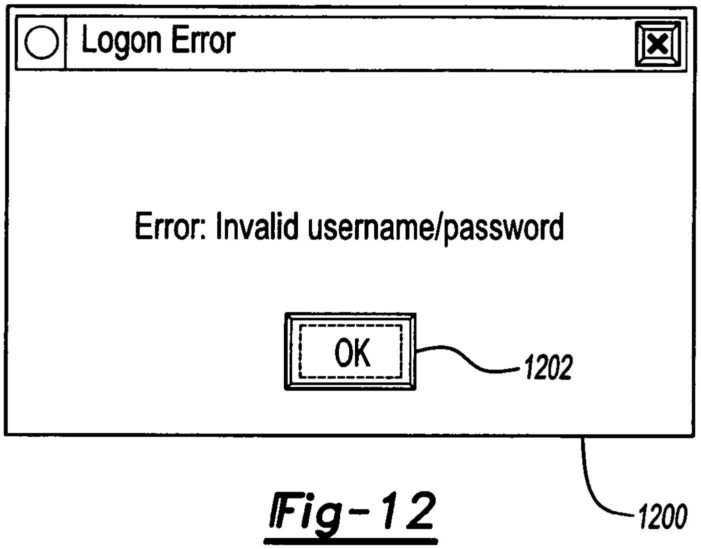
Figure 13:
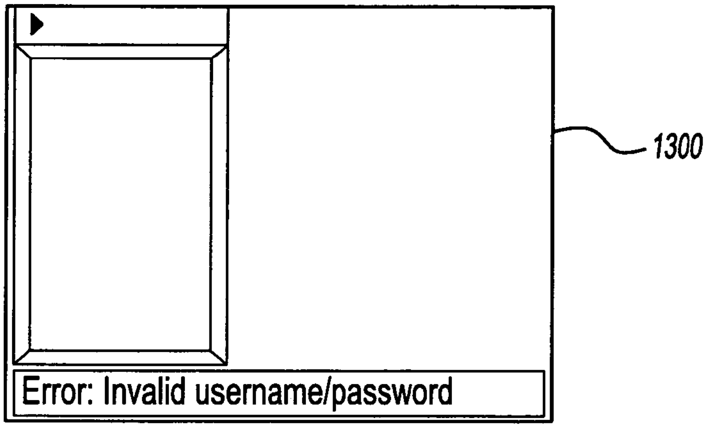

With reference to FIGS. 12 and 13, if an invalid user name and/or password is entered, the warning dialog box 1200 is displayed. The warning dialog box 1200 includes an ok button 1202. When the ok button 1202 is selected, the EMS error message window 1300 is displayed.

Figure 14:
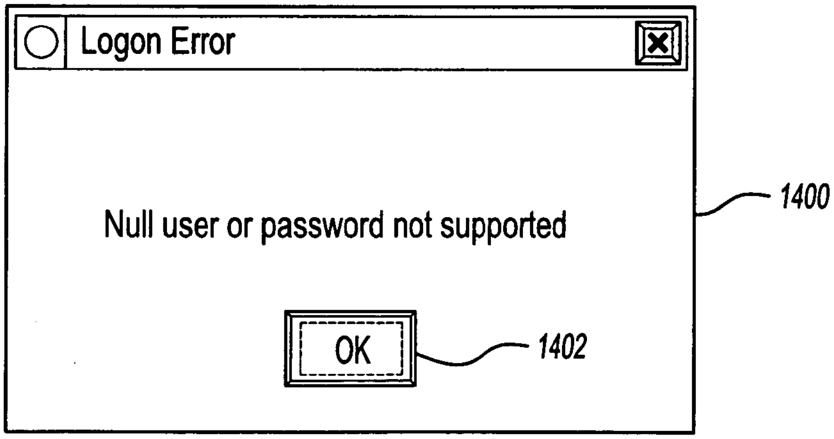

With reference to FIG. 14, when a null password is entered, the warning dialog box 1400 is displayed. The warning dialog box 1400 includes an ok button 1402. When the ok button is selected, the EMS error message window 1300 is displayed.

Based on the configuration for a particular location, the user has a limited number of login attempts. If that number is exceeded, the user account is locked as a security feature.

Figure 15:
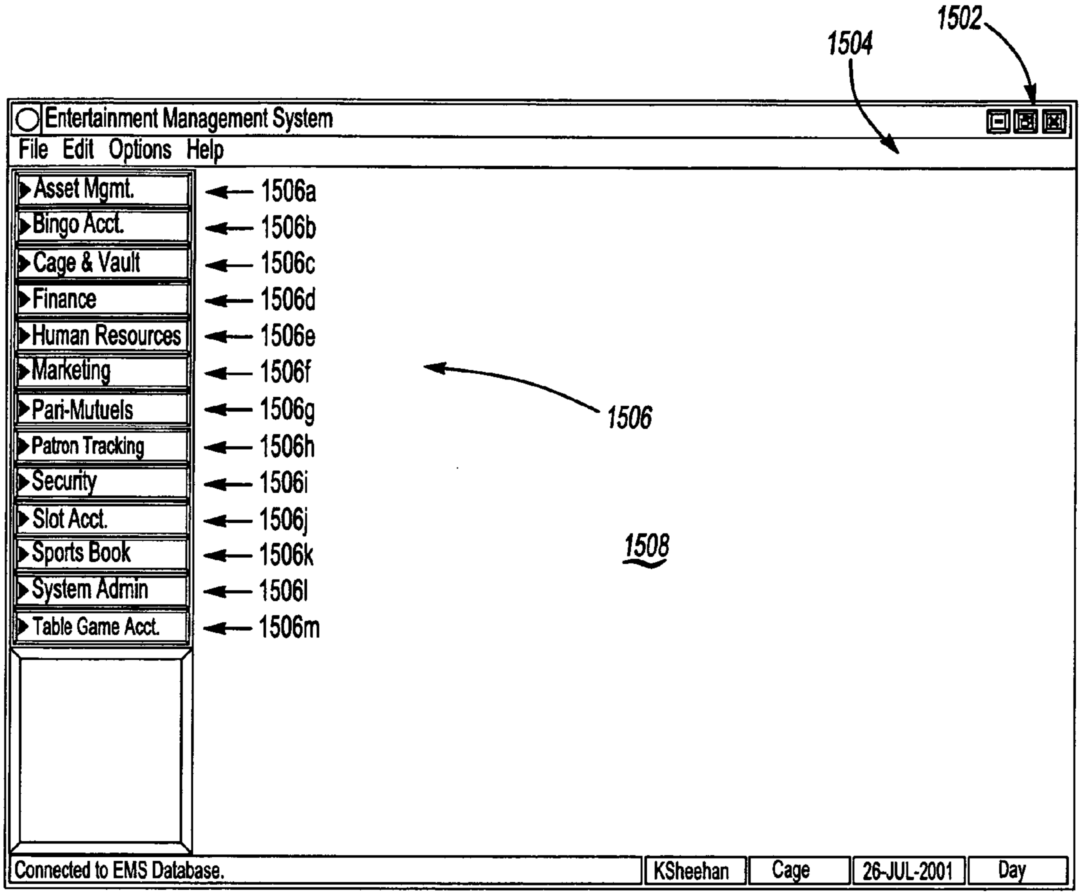

With reference to FIG. 15, after logon has been accomplished, an EMS main window 1500 is displayed. The EMS window 1500 includes a title bar 1502, a menu bar 1504, a switchboard 1506, a work area 1508, and a status bar 1510.

The menu bar 1504 includes the following items: File 1512, Edit 1514, Options 1516, and Help 1518. If logon has not been accomplished, the user must select a connect option under the File item 1512.

Passwords expire periodically and the user will be required to change their password. The EMS 100 will begin notifying the user of the expiration date seven-ten days before the password actually expires. Changing a password is done through the Human Resources module (see below).

Failure to change a password will result in the user's account being locked. Only a System Administrator has the authority to override your password using a Password Maintenance form located in the System Administration module (see below)

Throughout the EMS 100, keystroke combinations can be used as shortcuts for menu items. The following is a list of exemplary keyboard shortcuts.

F3 Edit/Find Again Allows a user to return to a prior search list as opposed to initiating a new search.

F9 File/Connect

F12 File/Disconnect

CTRL+F Edit/Find—Used to perform a search for a specific name or record on the current form.

CTRL+R Edit/Clear—Clears the current form of all data.

CTRL+S Edit/Update—Saves the changes on the current form.

CTRL+E Edit/Delete—Deletes the parent record and all sub-records provided data integrity is not violated.

CTRL+X Edit/Cut—Removes the highlighted text and places it in the clipboard.

CTRL+C Edit/Copy—Copies the highlighted text and places it in the clipboard.

CTRL+V Edit/Paste—Pastes the previously cut/copied text and places it in the current cursor position.

CTRL+P File/Print—Prints the current record or report.

CTRL+Q File/Exit—Exits the EMS

TAB Moves to the next field or control on a form.

SHIFT+TAB Moves to the previous field or control on a form.

SHIFT+DELETE Flags a record for deletion, highlighting it in yellow.

The menu bar 1504 is used to accomplish a task, such as saving a record or activating a name search using the 'Find' command, etc. The switchboard 1506 provides access to the EMS modules and the forms/icons within each module (see below). The work area 1508 displays the selected form or process. The status bar 1510 acts as the communicator, displaying system messages commonly referred to as 'broadcast messages'.

The menu bar 1504 is context sensitive, i.e., the items under each menu are available/unavailable based on the module, form, or process currently being used. Listed below are the general items under each menu item and their purpose.

The options under the File menu item include connecting or disconnecting from

EMS, printing, and exiting EMS. A brief description of each menu item follows:

Connect—This option is used to log in to the EMS.

Disconnect—Disconnect will log the current user out of the EMS. The session window will remain open waiting for another user to connect.

Print—This prints the contents of the EMS Window and prints reports from within each EMS module.

Exit—This terminates the current session and exits the EMS application.

The options under the Edit menu are available (enabled) depending upon what form or process is open in the work area. Availability is also based upon the permissions assigned to each user. A brief description of each option follows:

Find—Find is used to find a particular record or set of records. This option opens a window that provides search capability on any field within the open form.

Clear—This option will clear the form of all of its data. Any unsaved data will be lost.

Update—This option saves new records or changes to existing records. THIS OPTION MUST BE USED BEFORE SELECTING A DIFFERENT SWITCHBOARD GROUP OR ICON. CHANGES TO A RECORD ARE NOT AUTOMATICALLY SAVED; IF THE SYSTEM DETECTS DATA HAS BEEN CHANGED, THEY MUST BE INTENTIONALLY UPDATED (SAVED). When moving to a different tab on the same form, an UPDATE is not required.

Delete—When a record is no longer useful, it can be deleted from the system by selecting this option. A record can only be deleted if data integrity will not be compromised. Therefore, a delete may not always be possible.

Cut—This option will remove the highlighted data and place it in the application clipboard. The information can then be pasted to another location.

Copy—Makes a duplicate of any highlighted information in one field for pasting into another.

Paste—This option is used after the CUT or the COPY option. It places the information into the desired field/control.

The items under the OPTIONS menu are:

Enable Numeric Keypad—Enables/disables the on-screen numeric keypad. This is used if touch screens, rather than keyboards, are utilized.

Enable Alphabetic Keypad—Enables/disables the on-screen alphabetic keypad. This is used if touch screens, rather than keyboards, are utilized.

The HELP menu item opens a help window which provides answers to questions about the application. The EMS version number is recorded here.

The work area 1508 displays (see below) any information, form, report, or process being used. Once a form or table is displayed, the user may begin entering data into the system.

The status bar 1510 is located at the bottom of the EMS main window 1500 and communicates instructions or problems. Messages are displayed on the left side of the status bar. The current user name, location, date, and gaming shift are displayed on the right side.

The EMS switchboard 1506 includes a plurality of different icons for the forms, reports and processes. It is called a switchboard because a user is able to switch between the different EMS modules. Operating in the switchboard is as simple as clicking on a group icon 1506A, 1506B,1506C, 1506D, 1506E, 1506F, 1506G, 1506H, 1506I,1506J, 1506K, 1506L, 1506M, to have the icons under it displayed.

Each group icon 1506A, 1506B,1506C, 1506D, 1506E, 1506F, 1506G, 1506H, 1506I,1506J, 1506K, 1506L, 1506M, represents an EMS module and includes a plurality of function icons (see below). The function icons within each module represent functions unique to that module.

The group and icons available in each module are based upon the role(s) of the current user and the user rights associated with that role name. Selecting a module, i.e. a group icon 1506A, 1506B,1506C, 1506D, 1506E, 1506F, 1506G, 1506H, 1506I,1506J, 1506K, 1506L, 1506M, from the switchboard 1506 displays the functions icons associated with the corresponding module. A function icon is selected by dragging the cursor to the desired function icon and selecting it.

B. Frequently Used Tabs and Components

Several components, tabs, or functions are used throughout the forms. These are described below.

1. The Search Function

The EMS 100 is transaction based. Therefore, in order to edit or view an existing record, the user must first find the record. The Find command is located under the Edit top menu and is available for most forms. The shortcut key for the Find command is CTRL+F. When moving from form to form, the last patron account accessed will follow form to form. Example: If a user is working with a Patron's form, that patron's account information will be displayed. If the user proceeds to the Card Maintenance form (see below), the patron's information will automatically be accessed and displayed. A form may be cleared by selecting the clear selection under the edit menu item. Preferably, the search engine is context sensitive and automatically adapts to the form it is on.

Figure 16:
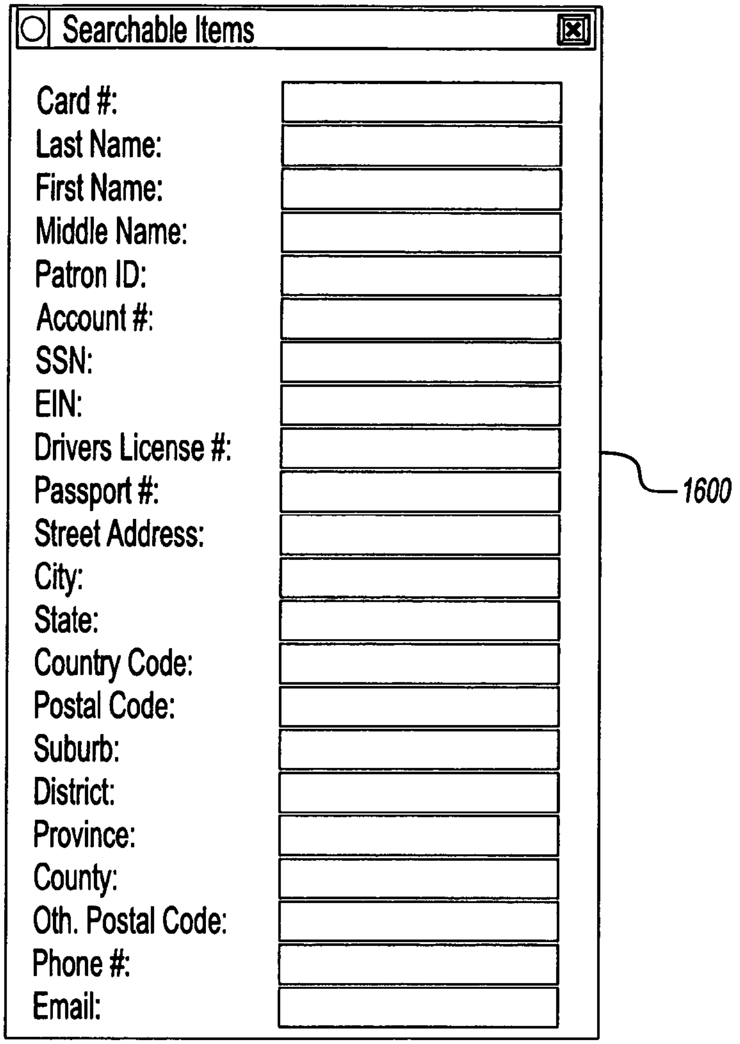

With reference to FIG. 16, an exemplary search window 1600 is shown. The search window 1600 may be accessed from within different forms (by selecting the find selection under the edit menu item or using the CTRL+F shortcut). However, the search criteria available changes from form to form. The search window 1600 also includes an ok button (not shown). To perform a search, the user selects the criteria on which to search, enters the information, and selects the ok button.

The more search criteria for which information is entered, the more accurate the results, i.e., less records will be returned. The search window 1600 supports wildcards ("%"=anything, "?"=any single character, "x . . . y"=any series of characters)). If a search returns more than 500 records, a broadcast message will request that the search criteria be limited.

Figure 17:
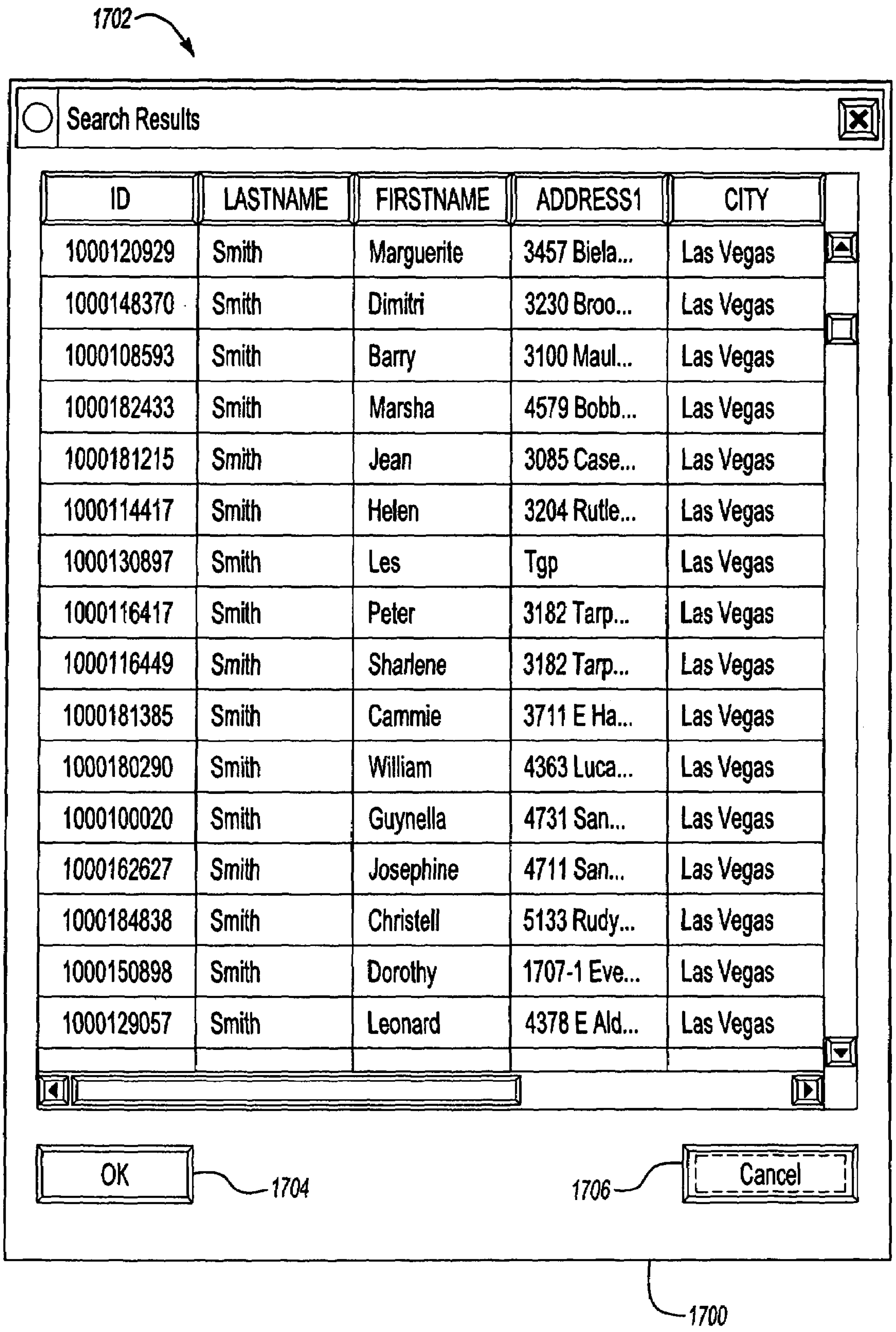

With reference to FIG. 17, the search results are displayed in a search results window 1700. The search results window 1700 includes a listing of the records 1702 which match the entered criteria, an ok button 1704, and a cancel button 1706. The search results are displayed in rows divided into columns. Each column represents a parameter of the returned record, e.g., ID, last name, first name, address, city, etc. . . . To choose and display a record, the user selects a record/account name and clicks the OK button 1704. The search results can be sorted by column. To sort by a particular column, the user must click on the title of that column. For example, clicking on the ID column puts the list in numeric order.

2. The Address Window

The EMS 100 allows for multiple addresses on the address tab of all forms. Each address must have a 'type'. The address types are established by the System Administrator. For example, various address may be required for each equipment manufacturer.

Figure 18:
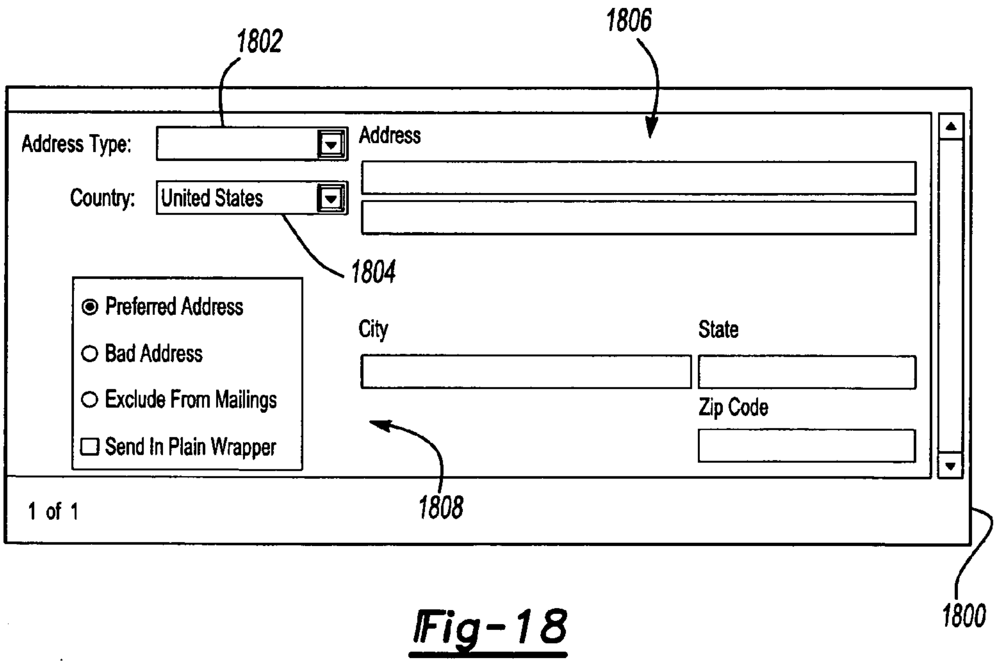

With reference to FIG. 18, an exemplary address window 1800 is illustrated. The address window 1800 includes an address type drop down list 1802, a country drop down list 1804, an address section 1806 and an additional information section 1808. The selections with the address type drop down list 1802 will vary based on the subject of the address window and are established by the System Administrator. For example for a Patron, drop down list 1802 may include "Home" and "Work".

Postal address requirements differ country to country. Based upon the country selected in the country drop down list 1804, the address section 1806 will dynamically change to include the appropriate text entry boxes for entry of information. The 'Address' tab window 1800 functions in the same manner on all EMS forms.

The additional information section 1808 may include several selection items which are defined by the system administrator. In the embodiment shown, the additional information section 1808 includes a preferred address selection, a bad address selection, an exclude from mailings selection, and a send in plain wrapper selection.

If the preferred address selection is checked, then mail will be sent to the current address. The bad address selection is checked if a mailing has been returned as undeliverable. If the address should not be used for mailings, then the exclude from mailings selection should be checked.

3. The Telephone Window

Figure 19:
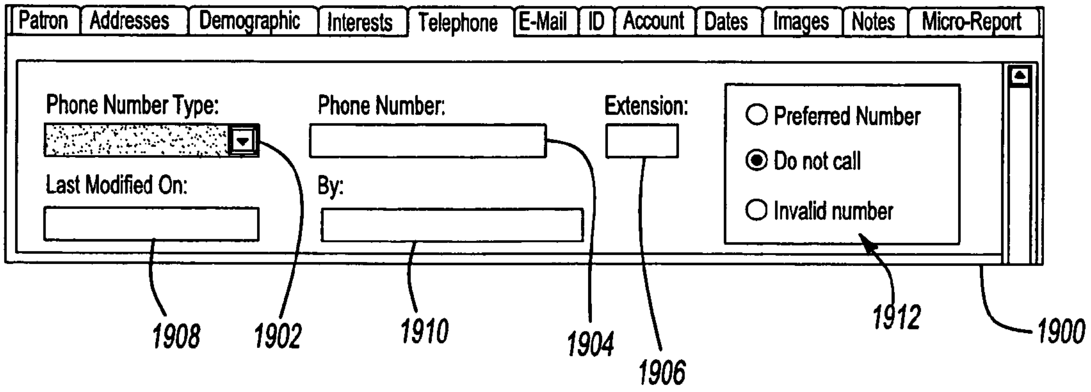

With reference to FIG. 19, an exemplary telephone window 1900 is shown. The telephone window 1900 is used to enter phone numbers on patron accounts, employees, Lessors, manufacturers, etc. . . . As with addresses, the EMS 100 allows for multiple telephone numbers. The telephone window 1900 includes a phone number type drop list 1902, a phone number entry box 1904, an extension entry box 1906, a last modified on entry box 1908, and by entry box 1910, and an additional information section 1912. The phone number type drop down list 1902 is used to categorize the different phone numbers. The selections in the drop down list 1902 are defined by the system. administrator and are dependent upon the current module or function icon. In the example, the additional information section 1912 includes a preferred item selection, a do not call selection, and an invalid number selection.

4. The Email Window

Figure 20:
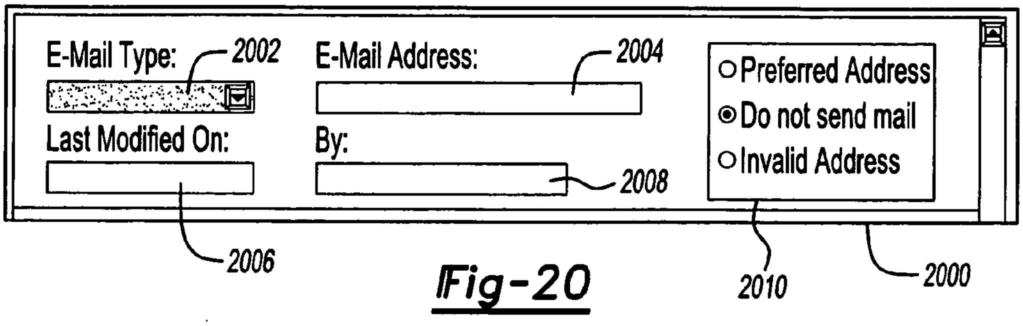

With reference to FIG. 20, an exemplary email window 2000 is illustrated. The email window 200Q includes an email drop down list 2002, an email address entry box 2004, a last modified by entry box 2006, a by entry box 2008, and an additional information section 2010. The email window 2000 allows multiple email addresses per account. The email type drop down list 2002 is used to categorize the different email addresses. The selections in the drop down list 2002 are defined by the system administrator and are dependent upon the current module or function icon. In the example, the additional information section 2010 includes a preferred address selection, a do not send mail selection, and an invalid address selection.

5. The Note Window

Figure 21:
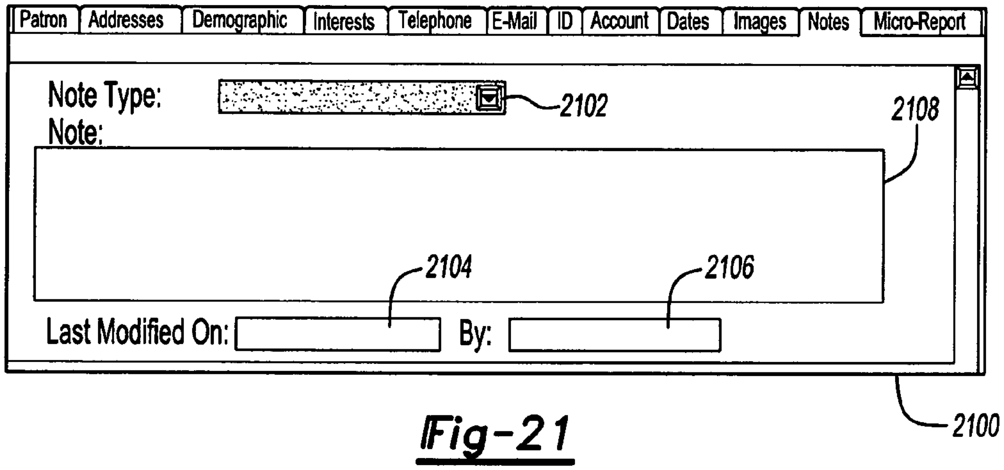

With reference to FIG. 21, an exemplary note window 2100 is illustrated. The note tab is used to maintain general information related to the subject matter of the form you are working in. The note window 2100 includes note type drop down list 2102, a last modified by entry box 2104, a by entry box 2106, and a text entry section 2108. The note type drop down list 2102 is used to categorize the different notes. The selections in the drop down list 2102 are defined by the system administrator and are dependent upon the current module or function icon. Note text is entered in the text entry section 2108. The text entry section 2108 is a free-form text field in which the user may enter any pertinent information regarding the subject. The Last Modified On and By entry boxes 2104, 2106 are read-only and cannot be edited. The EMS 100 tracks changes by recording the date and time of each change as well as the user name making the change.

C. The Asset Management Module

The Asset Management Module 1506A of the EMS 100 maintains information on the gaming devices in the current gaming environment. The data recorded on the forms contained therein are used throughout the EMS 100 for such critical functions as fills and credits on those devices.

Figure 22:
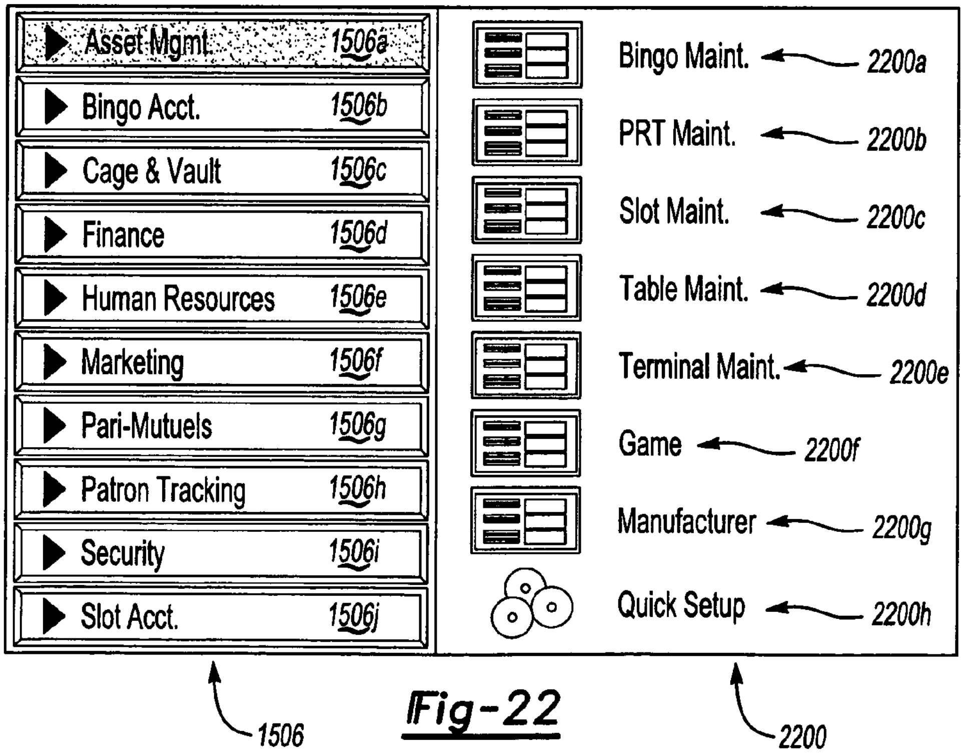

With reference to FIG. 22, selection of the Asset Management Group Icon 1506A on the switchboard 1506 displays a plurality of asset management function icons. 2200. In the disclosed embodiment, the asset management function icons 2200 include a bingo maintenance icon 2200A, a point redemption terminal (PRT) icon 2200B, a slot maintenance icon 2200C, a table maintenance icon 2200D, a terminal maintenance icon 2200E, a game icon 2200F, a manufacturer icon 2200G, and a quick setup icon 2200H.

1. Bingo Maintenance

Figure 23:
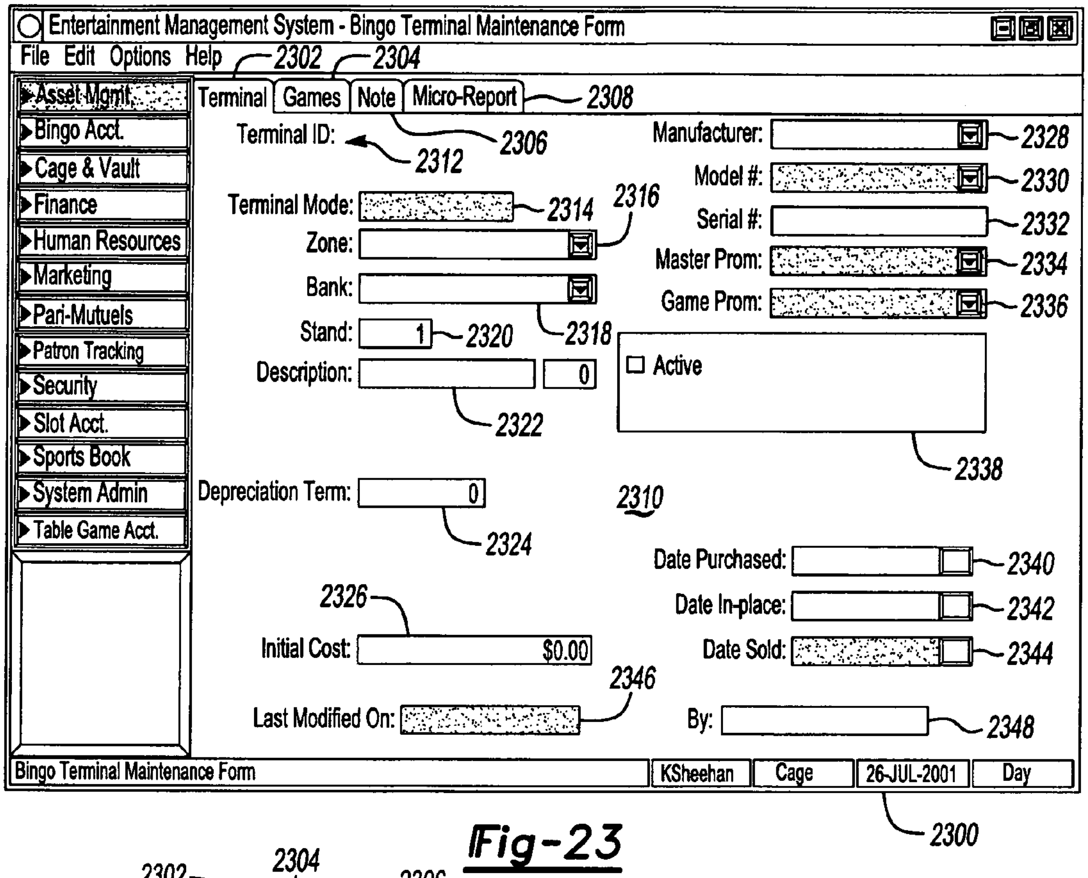

With reference to FIGS. 23, selection of the bingo maintenance icon 2200A displays a bingo maintenance form 2300. Every bingo device must be entered in the bingo form 2300 before the device can used. Information entered and displayed on the bingo maintenance form 2300 is the manufacturer name, model #, and serial #.

The bingo maintenance form 2300 utilizes a tab control with a terminal tab 2302, a games tab 2304, a note tab 2306 and a micro-report tab 2308. When the terminal tab 2302 is selected, a terminal window 2310 is displayed on the bingo maintenance form 2300. The terminal window 2310 defines the location, manufacturer, and asset information on the current bingo device.

In the displayed embodiment, the terminal window 2310 includes a terminal id field 2312, a terminal mode field 2314, a zone drop down list 2316, a bank drop down list 2318, a stand entry box 2320, a description entry box 2322, a depreciation term entry box 2324, an initial cost entry box 2326, a manufacturer drop down list 2328, a model# drop down list 2330, a serial# entry box 2332, a master prom drop down list 2334, a game prom drop down list 2336, an active check box 2338, a date purchased box 2340 a date in place box 2342, a date sold box 2344, a last modified entry box 2346, and a by entry box 2348.

The terminal ID is a system generated number tied to each Bingo device entered in the system 100. The terminal mode field 2314 identifies the current status of the Bingo device.

When defining a new device, the user must enter or select the appropriate choice in the remaining fields.

The zone and bank drop down lists 2316,2318 define the location of the subject bingo device. The description entry box 2322 is the asset # or device number. The depreciation term is defined as the number of months the asset cost is depreciated (for tax purposes only). Dates can be entered by directly typing in the date in dd-mm-yyyy format, or by using a provided calendar control (not shown).

Figure 24:
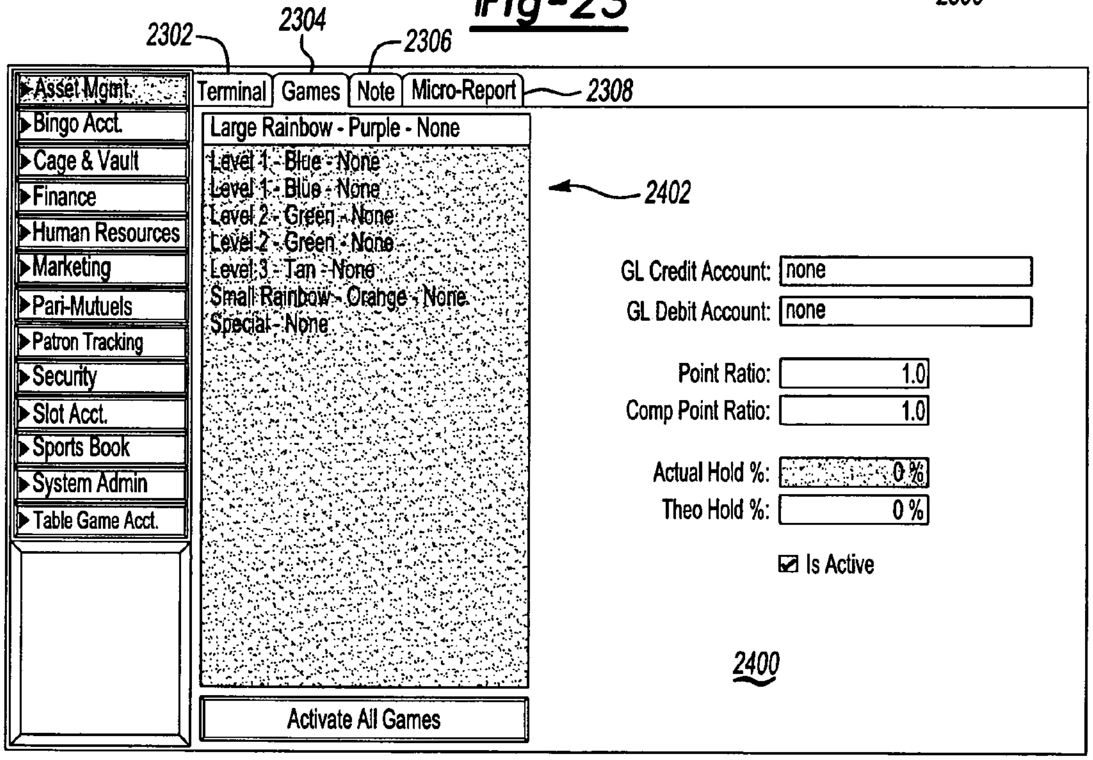

With reference to FIG. 24, when the game tab 2304 is selected a game window 2400 is displayed. The game window 2400 identifies the games played on the bingo device, the hold percentages, point and comp ratios, and General Ledger Account Numbers associated with the device. If a bingo device plays more than one game, each game will be listed on a game list 2402. For each new bingo device all information on each game must be completed.

Selection of the note tab 2306 displays a note window for entry/display of notes relative to the bingo device (see above). Notes are permanent in nature and cannot be deleted.

Selection of the micro-report tab 2308 displays a micro-report window (not shown). The micro-report window is used to provide quick information about the current bingo device.

2. Point Redemption Terminal

Figure 25:
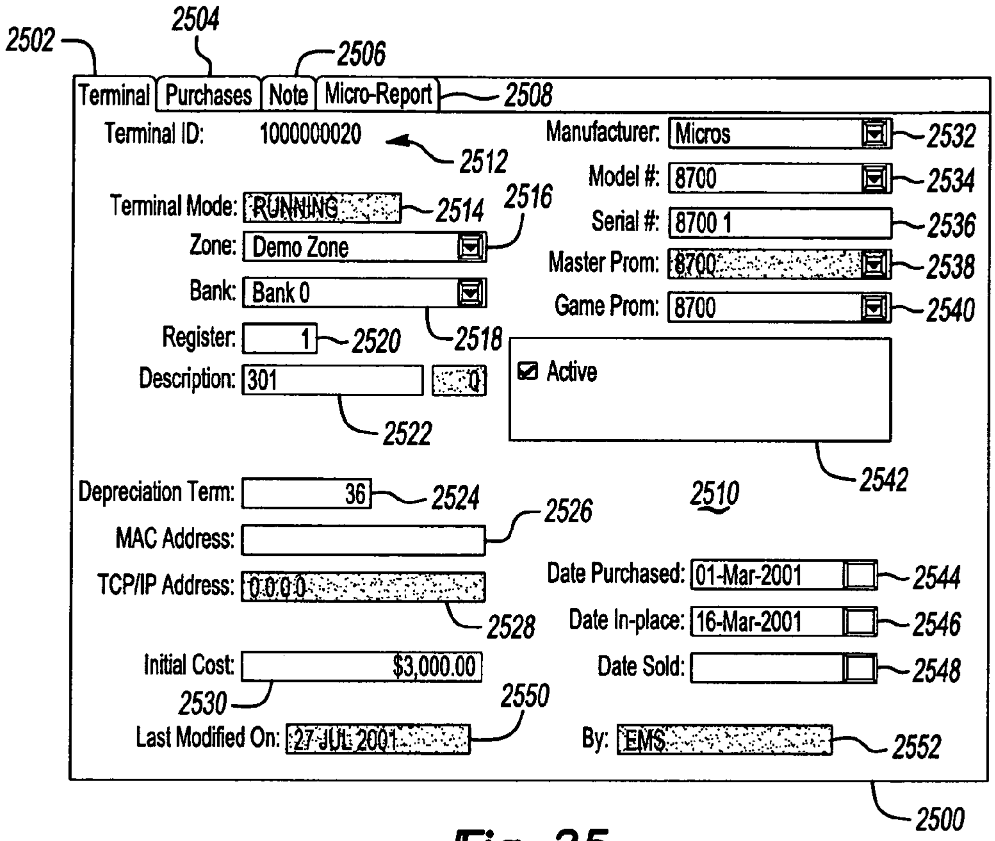

With reference to FIGS. 22 and 25, selection of the PRT Maintenance icon 2200B displays a PRT maintenance form 2500. Every PRT (Point Redemption Terminal, AKA, Point of Sale) device must be entered in the PRT Maintenance form 2500 before the device can be used. Some of the information on this form includes the manufacturer name, serial #, and whether the machine is active or inactive.

The PRT maintenance form 2500 utilizes a tab control with a terminal tab 2502, a purchases tab 2504, a note tab 2506 and a micro-report tab 2508.

When the terminal tab 2502 is selected, a terminal window 2510 is displayed on the PRT maintenance form 2500. The terminal window 2510 defines the location, manufacturer, and asset information on the current PRT device.

The terminal window 2510 includes a terminal ID field 2512, a terminal mode field 2514, a zone drop down list 2516, a bank down list 2518, a register entry box 2520, a description entry box 2522, a depreciation term entry box 2524, a MAC address entry box 2526, a TCP/IP address entry box 2528, an initial cost entry box 2530, a manufacturer drop down list 2532, a model # drop down list 2534, a serial # drop down list 2536, a master prom drop down list 2538, a game prom drop down list 2540, an active check box 2542, a date purchased entry box 2544, a date in place entry box 2546, a date sold entry box 2548, a last modified field 2550, and a by field 2552.

The terminal ID is a system generated number tied to each device entered in the system. The Terminal Mode displays the status of the device. The user must enter the other information when a new device is being added. The register refers to the cash register # to which the PRT is attached. The description refers to a store number. The MAC and TCP/IP Addresses will be populated if the system is online.

Figure 26:
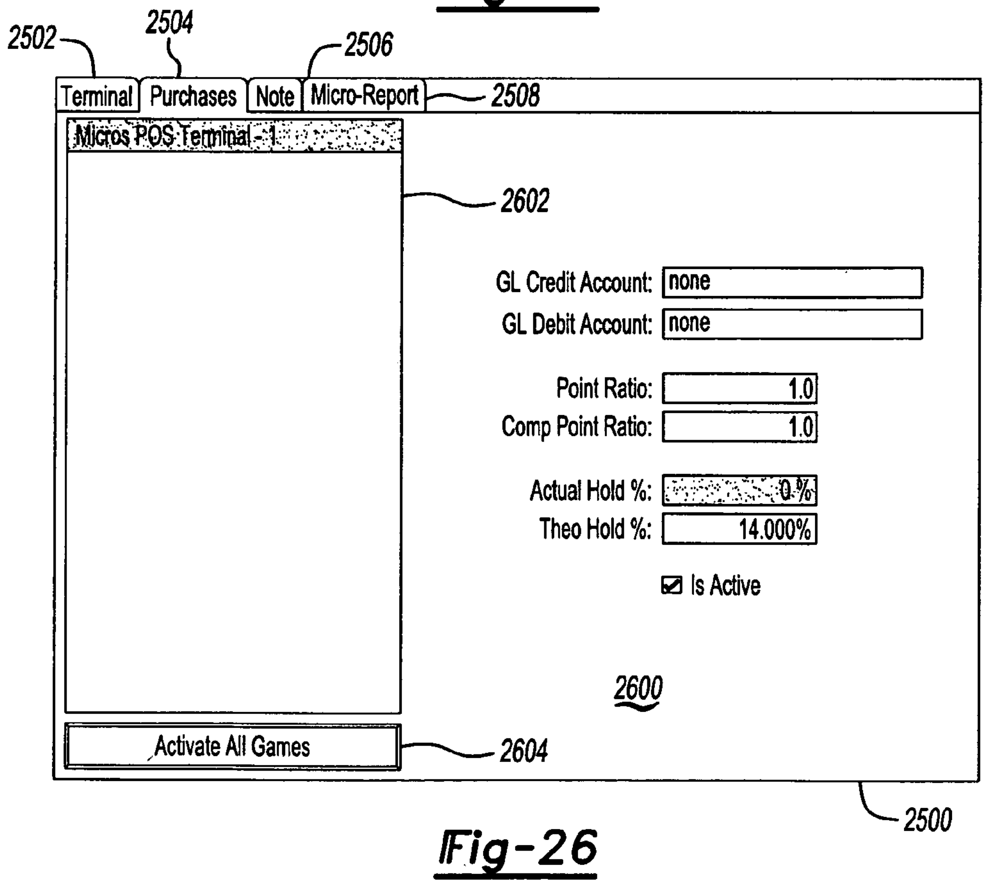

Referring to FIG. 26, when the purchases tab 2504 is selected, a purchases window 2600 is displayed on the PRT maintenance form 2500. The purchases window 2600 is used to set up the hold percent, point and comp point ratios, and General Ledger numbers associated with the PRT device. The purchases window 2600 includes a list 2602 of terminals associated with the current PRT device. The information on the right is required for each device in the list 2602. This information sets up the GL account numbers, point ratios, and the actual and theoretical hold percents. It also determines which devices are active in the PRT device. PRT information is pre-filled based on the Manufacturer, Model Number, Master and Game Prom information entered on the Terminal Tab. Only unique information must be added, e.g., the point ratio and the comp point ratio which are used to determine how points will be awarded for purchase transactions that occur at that terminal. The general ledger credit account and debit numbers are used to interface with the accounting system. The point ratio is used in combination with a formula picked in Point Setup under System Administration to determine how many points are generated based on patron purchases. The comp-to-point ratio is used with a formula picked in Point Setup under System Administration to determine how many points are generated based on patron purchases, i.e., it determines the relationship between ‘comp’ dollar value and point value. The actual hold % field is a calculated field and does not require data entry. The purchases window 2600 includes an activate all games button 2604, which if checked activates all games.

Selection of the note tab 2506 displays a note window for entry/display of notes relative to the PRT device (see above). Notes are permanent in nature and cannot be deleted.

Selection of the micro-report tab 2308 displays a micro-report window (not shown). The micro-report window is used to provide quick information about the current PRT device.

3. Slot Maintenance

Figure 27:
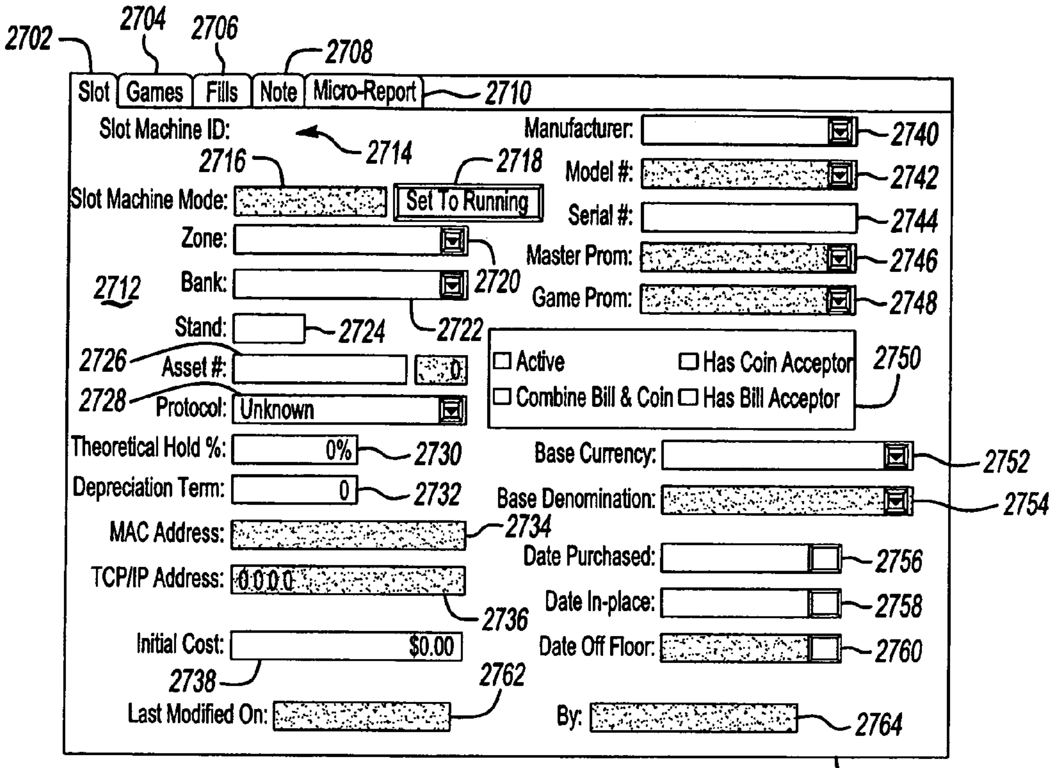

With reference to FIGS. 22 and 27, selection of the slot Maintenance icon 2200C displays a Slot maintenance form 2700. Every slot device must be entered in the Slot Maintenance form 2700 before the device can be used. Some of the information on this form includes the manufacturer name, serial #, and whether the machine is active or inactive.

The slot maintenance form 2700 utilizes a tab control with a slot tab 2702, a games tab 2704, a fills tab 2706, a note tab 2708 and a micro-report tab 2710. Every slot device must be recorded on the slot maintenance form 2700. The information needed here includes not only general asset data, but also data on the games the device plays and whether or not the game is currently active in the machine. Fill currencies and values are also established on this form.

When the slot tab 2702 is selected, a slot window 2712 is displayed on the slot maintenance form 2700. The slot window 2712 defines the location, manufacturer, and asset information. The slot window 2712 includes a slot machine ID field 2714, a slot machine mode field 2716, a set to running button 2718 (The set to running button changes to a set to stopped button if the machine is running. This allows remote control of the state of the machine.), a zone drop down list 2720, a bank drop down list 2722, a stand entry box 2724, an asset # entry box 2726, a protocol drop down list 2728, a theoretical hold % entry box 2730, a depreciation term entry box 2732, a MAC address entry box 2734, a TCP/IP entry box 2736, an initial cost entry box 2738, a manufacturer drop down list 2740, a model # drop down list 2742, a serial # entry box 2744, a master prom drop down list 2746, a game prom drop down list 2748, a series of check boxes 2750, base currency drop down list 2752, a base denomination drop down list 2754, a date purchased entry box 2756, a date in place entry box 2758, a date off floor entry box 2760, a last modified on field 2762, and a by field 2764.

The slot machine ID is a system generated number tied to each physical device (machine) entered in the system 100. The slot machine mode is the status of a machine (i.e. JP mode, Drop mode, Running mode). Other fields must be entered/selected by the user when a new slot device is added.

Figure 28:
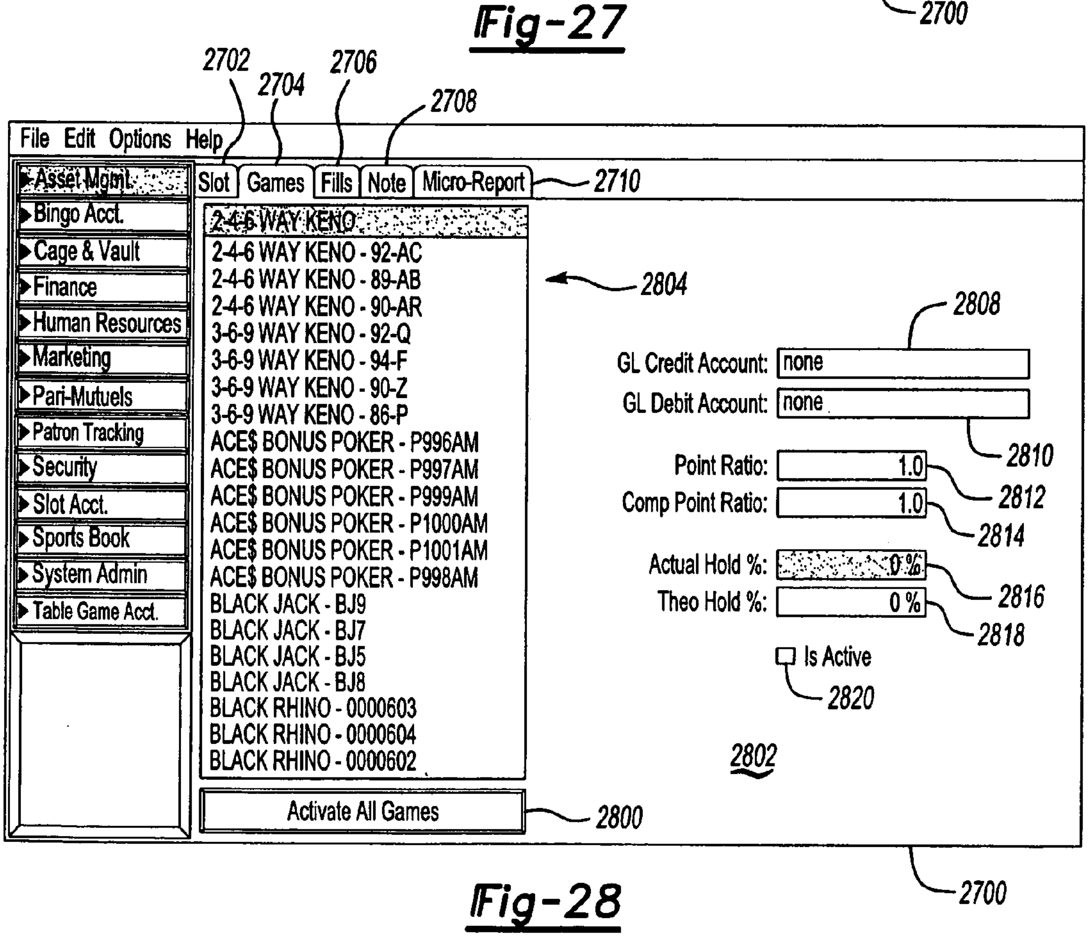

With reference to FIG. 28, when the games tab 2704 is selected, a games window 2802 is displayed in the slot maintenance form 2700. The games window 2802 is used to set up the hold percent, point and comp point ratios, and General Ledger account numbers associated with a slot device (machine). If a slot device plays more than one game, each game is listed on a list 2804. The games window 2802 also includes an activate all games button 2806, a GL Credit Account entry box 2808, a GL Debit entry box 2810, a point ratio entry box 2812, a comp point ratio entry box 2814, an actual hold % field 2816, a theoretical hold % entry box 2818, and an active check box 2820. The actual hold is a calculated field and does not require data entry. The entry boxes 2808,2810,2812,2814,2818 must be completed for each game in the list 2804 by the user. The active check box 2820 must also be set for each game to identify which games are currently active in the slot device. Some of the information on the games window 2802 is pre-filled based on the Manufacturer, Model Number, Master Prom, and Game Prom information from the slot window 2712. For example, if a slot device plays more than one game, there will be a record for each game in the list 2804. Further, games may be activated or deactivated remotely via this component.

Figure 29:
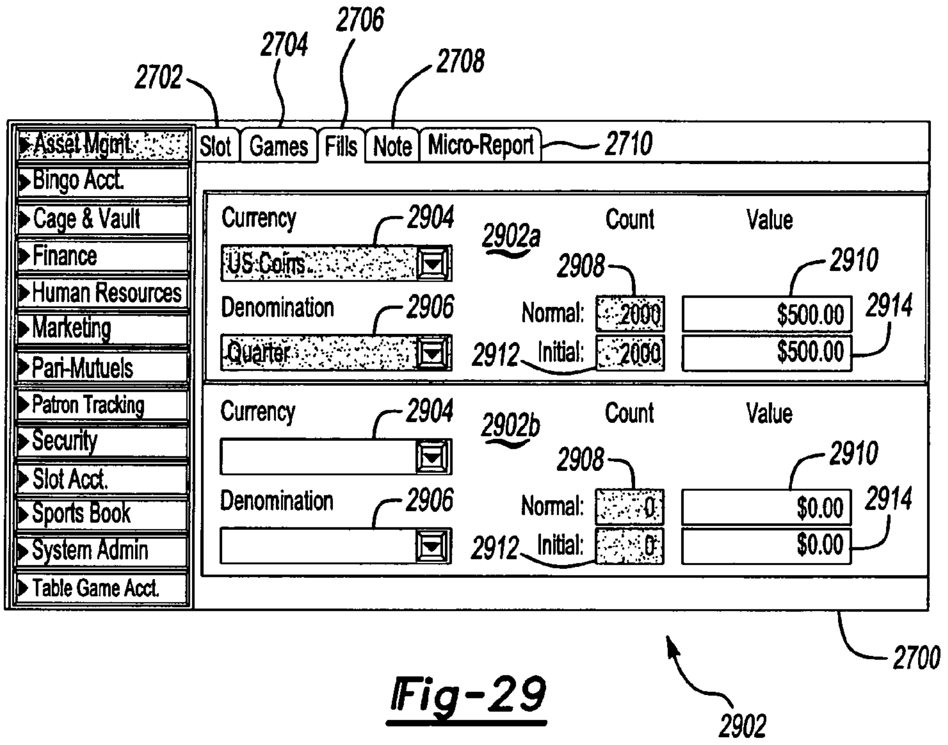

With reference to FIG. 29, when the fills tab 2706 is selected, a fills window 2902 is displayed. The fills window 2902 on the slot maintenance form 2700 is used to set the fill amounts for the currency type and denomination of each slot device.

In the displayed embodiment, the fills window 2902 includes first and second windows 2902A,2902B for two fills. The windows 2902A,2902B are identical, therefore only one the first window 2902A is discussed 2902A. The first fills window 2902A includes a currency drop down list 2904, a denomination drop down list 2906, a normal count entry box 2908, a normal value field 2910, an initial count entry box 2912, and an initial value field 2914. To record a file the user, selects the currency and denomination from the appropriate drop down list 2904, 2906 and enters an initial fill or normal fill count in the appropriate entry box 2908, 2912. The value fields 2910,2914 are automatically updated.

Selection of the note tab 2708 displays a note window for entry/display of notes relative to the slot device (see above). Notes are permanent in nature and cannot be deleted.

Selection of the micro-report tab 2710 displays a micro-report window (not shown). The micro-report window is used to provide quick information about the current slot device.

4. Table Maintenance

Figure 30:
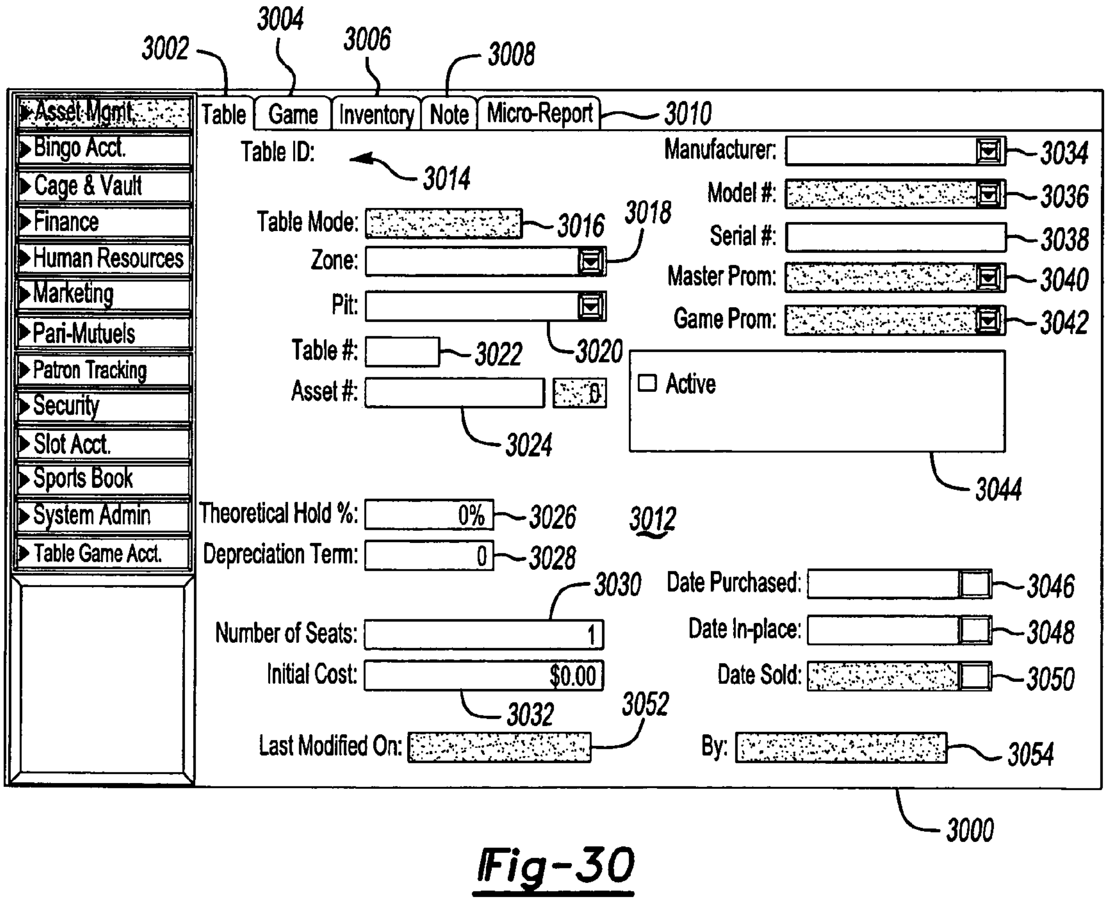

With reference to FIGS. 22 and 30, selection of the table maintenance icon 2200D displays a table maintenance form 3000. All table gaming devices must be defined to the EMS 100 on the table maintenance form 3000, including the games played on the table, the currency inventory amounts for fills and credits.

The table maintenance form 3000 utilizes a tab control with a table tab 3002, a game tab 3004, an inventory tab 3006, a note tab 3008 and a micro-report tab 3010. The table maintenance form 3000 is used to define all table gaming devices (tables) to the EMS 100. Table devices must be entered into this form before the table can be used.

With the table tab 3002 selected, a table window 3012 is displayed in the table maintenance form 3000. The table window 3012 defines the location, manufacturer, and asset information for the current table game.

The table window 3012 includes a table id field 3014, a table mode field 3016, a zone drop down list 3018, a pit drop down list 3020, a table # entry box 3022, an asset # entry box 3024, a theoretical hold % entry box 3026, a depreciation term entry box 3028, a number of seats entry box 3030, an initial cost entry box 3032, a manufacturer drop down list 3034, a model # drop down list 3036, a serial # entry box 3038, a master prom drop down list 3040, a game prom drop down list 3042, an active check box 3044, a date purchased entry box 3046, a date in place entry box 3048, a date sold entry box 3050, a last modified field 3052, and a by field 3054.

The table window 3012 is used to establish the location, manufacturer, and general asset information for each gaming table. Before entering the table information, the System Administrator must complete the initial set up for each game site.

The table ID is a system generated number tied to each table entered in the system. The table mode field has the status of a table. The user must select the appropriate choices from the drop down lists 3018, 3020, 3034, 3036, 3042 and enter the data for the entry boxes 3022, 3024, 3026, 3028, 3030, 3032. If it is a multi-game, each individual game's hold percentage is displayed when selecting individual games one at a time on the games window (see below).

Figure 31:
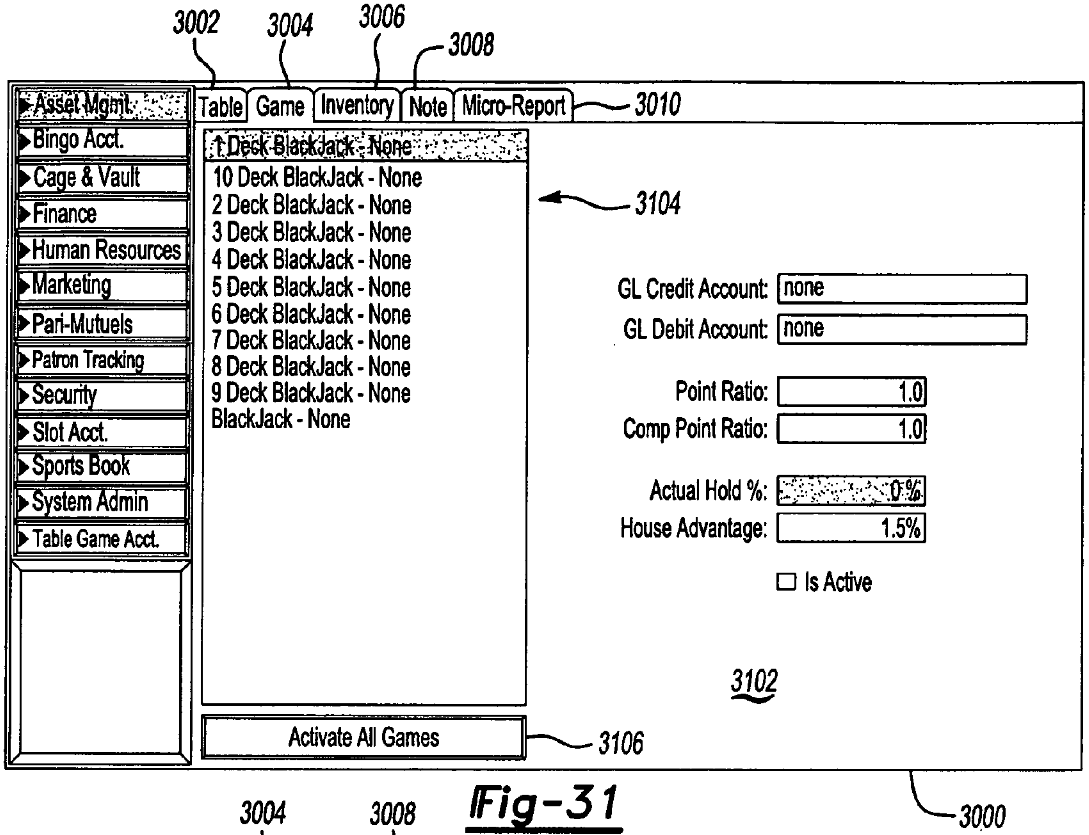

With reference to FIG. 31, when the game tab 3004 is selected, a game window 3102 is displayed in the table maintenance form 3000. The game window identifies the games played on the current table and the hold percentages, and GL account Numbers associated with the table. In order for a patron to earn points for table play, there must be a theoretical hold figure entered in this tab of the form, as well as a point ratio. The game window 3102 is used to set up the hold percent, point and comp point ratios, and General Ledger account numbers associated with a table. Where table games have been updated to include electronic control features, those games may be modified remotely.

The game window 3102 includes a list 3104 of the games available on the current table. If a table has more than one game, each game will be listed in the list 3104. The information in the entry boxes on the right must be filled for each game on the table. The list 3104 will be prefilled using information on the table window 3012 (Manufacturer, Model Number, Master Prom, and Game Prom) If the table plays more than one game, there will be a record for each possible game. The actual hold field is a calculated field and does not require data entry.

Figure 32:
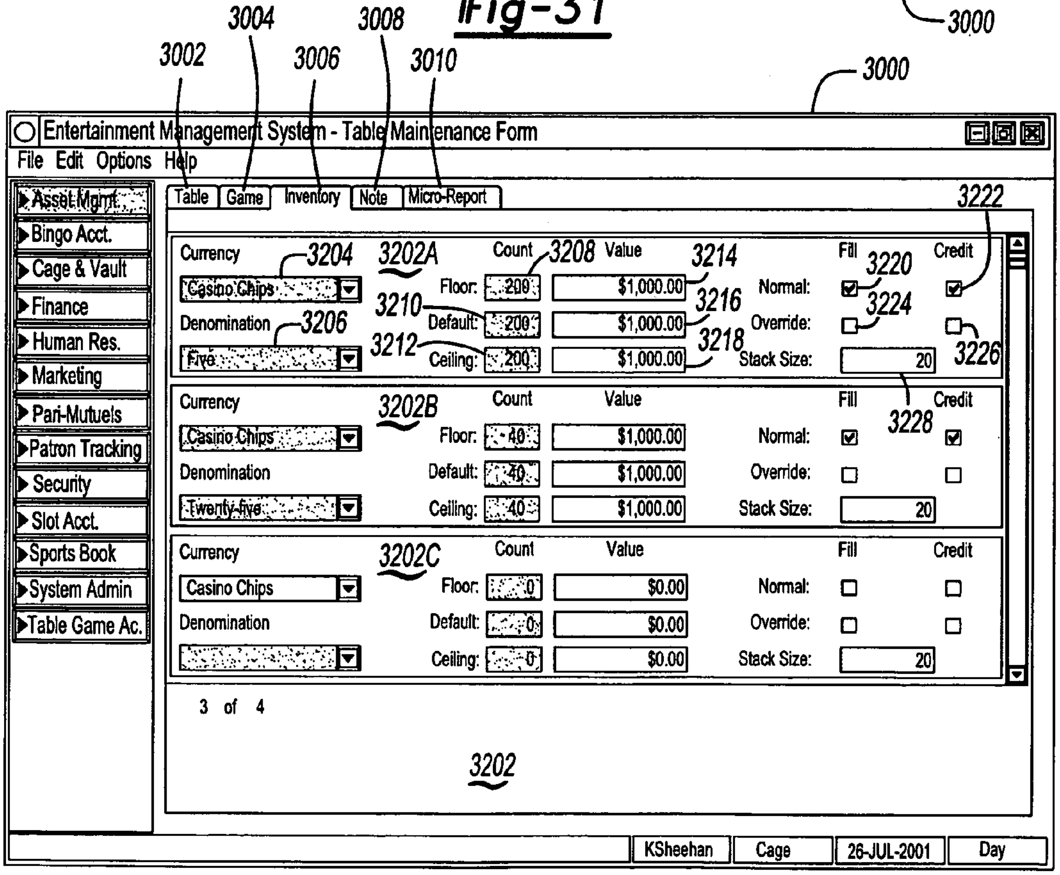

With reference to FIG. 32, when the inventory tab 3006 is selected, an inventory window 3202 is displayed in the table maintenance form 3000. The inventory window 3202 is used to set minimum and maximum fill amounts for the table.

The inventory window 3202, in the displayed embodiment, includes first, second and third sub-windows 3202A, 3202B, 3202C. The sub-windows 3202A, 3202B, 3202C are identical. Therefore, only the first sub-window 3202A is discussed. The first sub-window 3202A includes a currency drop down list 3204, a denomination drop down list 3206, a floor count entry box 3208, a default entry box 3210, a ceiling entry box 3212, a floor value field 3214, a default value field 3216, a ceiling value field 3218, a normal fill check box 3220, a normal credit check box 3222, an override fill check box 3224, an override credit check box 3226, and a stack size entry field 3228.

The user must select appropriate choices from the drop down lists 3204, 3206, enter appropriate values into the entry boxes 3208,3210,3212, and check the appropriate check boxes 3220,3222,3224,3226. The floor count is based on the site default and defines the floor (lowest) count or value for the selected currency and denomination. The default count or value is also dependent upon the site default for the selected currency and denomination. The ceiling (highest) count or value is defined by the selected currency and denomination and the site default. Normal and override checkboxes are mutually exclusive. The stack size is entered for the selected currency and denomination.

Selection of the note tab 3008 displays a note window for entry/display of notes relative to the table device (see above). Notes are permanent in nature and cannot be deleted.

Selection of the micro-report tab 3010 displays a micro-report window (not shown). The micro-report window is used to provide quick information about the current table game.

5. Terminal Maintenance

Figure 33:
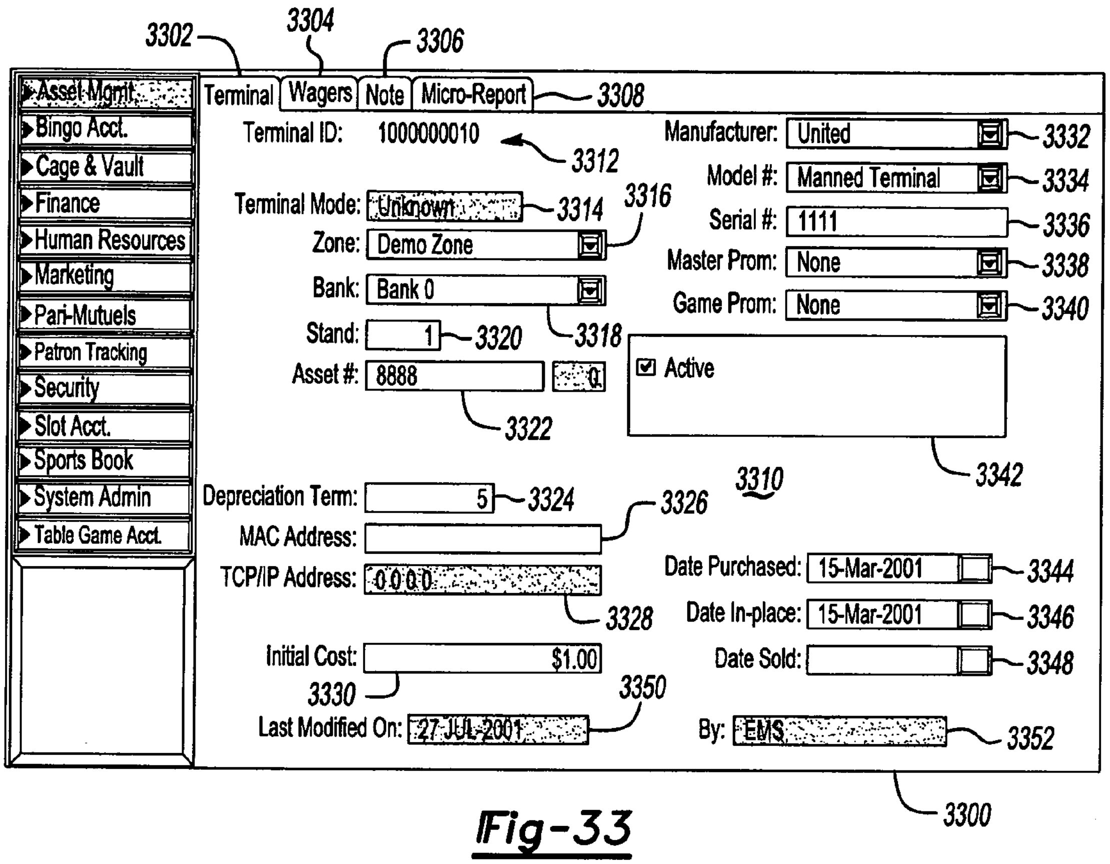
Figure 34:
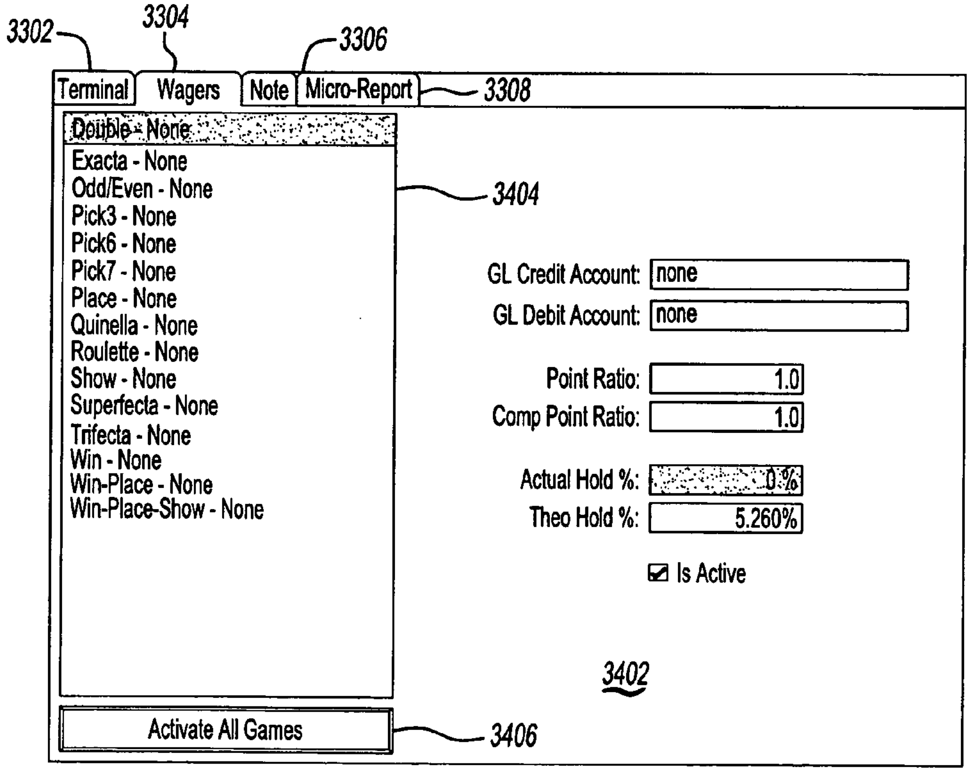

With reference to FIGS. 22 and 33, selection of the terminal maintenance icon 2200E displays a terminal maintenance form 3300. All tote terminal devices must be entered on the terminal maintenance form 3300. The terminal maintenance form 3300 contains information about the manufacturer, date purchased, date in-place, and the asset # of the device. The terminal maintenance form allows the user to record notes about each tote terminal device.

The terminal maintenance form 3300 utilizes a tab control with a terminal tab 3302, a wagers tab 3304, a note tab 3306 and a micro-report tab 3308. The terminal maintenance form 3300 is used to define all Tote Wagering Devices to the EMS 100. Tote devices (primarily used for horse racing) must be entered on the terminal maintenance form 3300 before the terminal can be used.

When the terminal tab 3302 is selected, a terminal window 3310 is displayed in the terminal maintenance form 3300. The terminal window defines the location, manufacturer, and general asset information for each tote terminal. Before tote information can be added, the System Administrator must complete the initial set up for each game site. The terminal window 3310 includes a terminal ID field 3312, a terminal mode field 3314, a zone drop down list 3316, a bank drop down list 3318, a stand entry box 3320, an asset # entry box 3322, a depreciation term entry box 3324, a MAC address entry box 3326, a TCP/IP address box 3328, an initial cost entry box 3330, a manufacturer drop down list 3332, a model # drop down list 3334, a serial # entry box 3336, a master prom drop down list 3338, a game prom drop down list 3340, an active check box 3342, a date purchased entry box 3344, a date in place entry box 3346, a date sold entry box 3348, a last modified on field 3350, and a by field 3352.

The terminal ID is a system generated number tied to each tote terminal entered in the system 100. The terminal mode has the status of the current tote terminal. The user must select appropriate choices from the drop down lists 3316, 3318, 3332,3334,3338,3340 and enter appropriate data in the entry boxes 3320,3322,3324,3326,3328,3330,3336,3344,3346,3348 for each tote terminal as it is added to the system 100. The Mac Address and TCP/IP fields 3326,3328 will be populated if an an-line system is installed.

When the wagers tab 3304 is selected, a wagers window 3402 is displayed in the terminal maintenance form 3300. The wagers window 3402 identifies the types of wagers accepted by the current tote terminal, hold percentages, and GL Account Numbers associated with the tote terminal.

The wagers window 3402 includes a list 3404 of the types of wagers available for the tote terminal (based on the information) input on the terminal window 3310). The wagers window 3402 is used to select the wager type that can be placed at a given tote terminal, point ratios used to calculate patron points, and to establish the General Ledger debit/credit account numbers associated with each wager type. For each type of wager in the list 3404, the user must enter the appropriate data on the right to set up the General Ledger account numbers, point ratios, and the actual and theoretical hold percents. If the tote terminal accepts more than one type of wager, there will be a record for each possible wager type in the list 3404.

The point ratio combined with a formula selected in Point Setup in System Administration (see below), determines the points awarded based on patron wagers.

The comp-to-point ratio combined with the formula selected in Point Setup under System Administration, determines the number of points awarded based on patron wagers. The comp-to-point ratio determines the relationship between 'comp' dollar value and point value. The Actual Hold % is a calculated field not requiring data entry.

Selection of the note tab 3306 displays a note window for entry/display of notes relative to the tote terminal (see above). Notes are permanent in nature and cannot be deleted.

Selection of the micro-report tab 3308 displays a micro-report window (not shown). The micro-report window is used to provide quick information about the current tote terminal.

6. Game

Figure 35A:
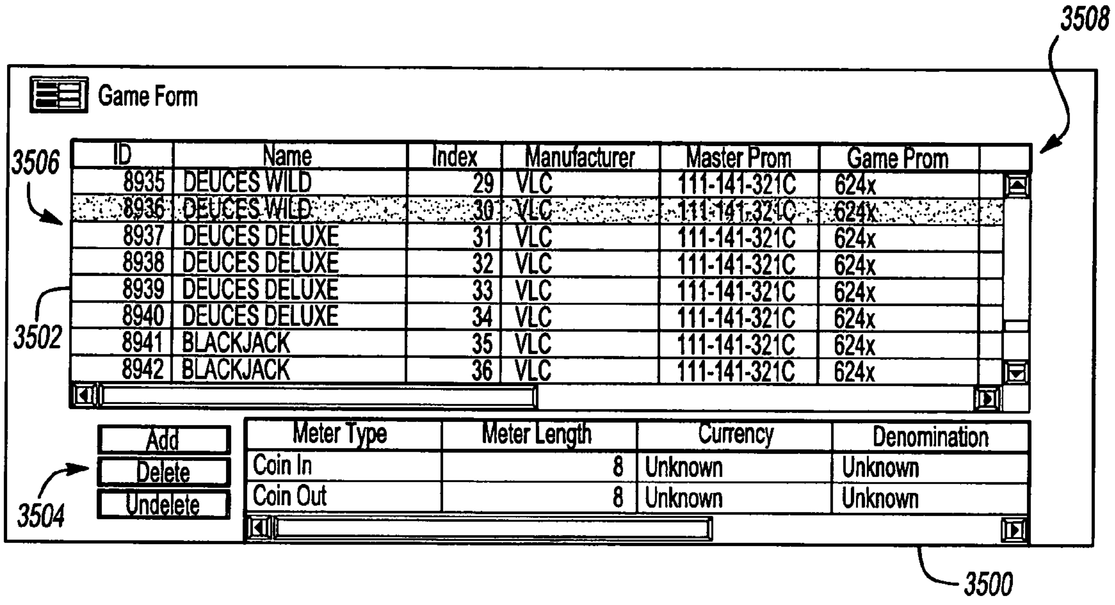
Figure 35B:
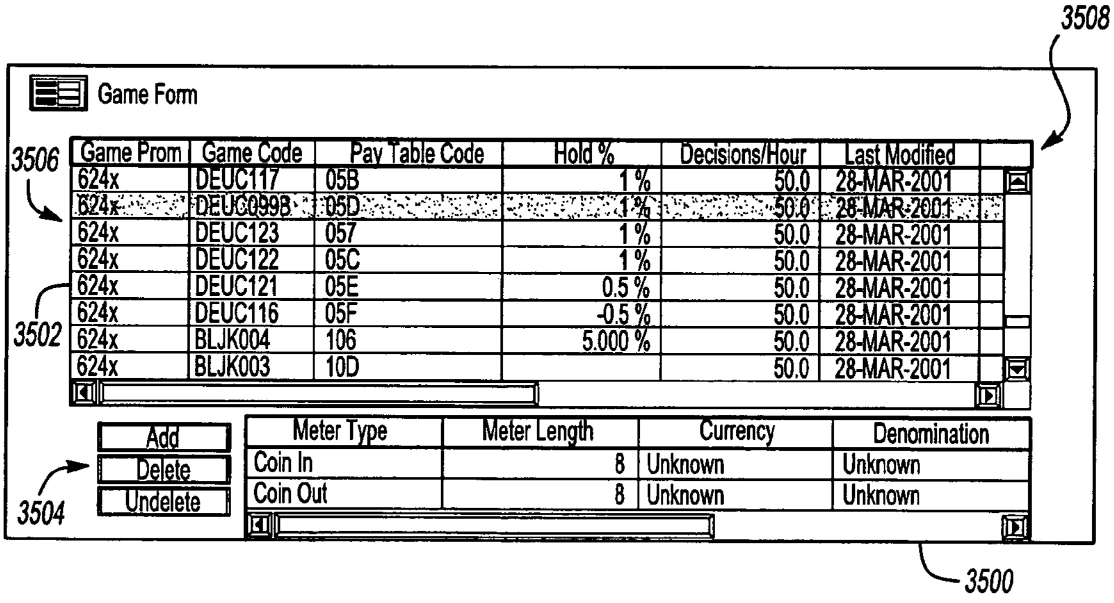

With reference to FIGS. 22, 35A and 35B, selection of the game icon 2200F displays a game form 3500. The game form 3500 is when a new device containing a new game is added to the gaming environment. The game setup form includes the name, manufacturer, master and game prom, and the hold %.

The game form 3500 includes a game list 3502 and a meter add box 3504. The game list 3502 has a plurality of rows 3506, each row 3506 represents a game. The rows 3506 are divided into columns 3508 representing parameters of the games. In the disclosed embodiment, the parameters of the games recorded on the game form 3500 include game ID, name, index, manufacturer, master prom, game prom, game code, pay table code, hold %, decisions/hour, and last modified. The game ID is unique ID for each game, typically selected sequentially. The user must enter all the information for each game to be added. The index, master prom, game prom, game code, pay table code, and hold % (theoretical) are generally found on a PAR sheet provided by the manufacturer of the game. Meters must be entered in the meter add box 3504 for each new game.

By clicking on the column headers, each column will auto-sort into descending order. The index is the position of the game within the game prom. The manufacturer of the device is selected from a drop-down list (not shown). A last modified field is read only and is updated by the EMS 100 whenever a record is added or changed. A modified On field is read only and is updated by the EMS 100 whenever a record is added or changed.

7. Manufacturer

Figure 36:
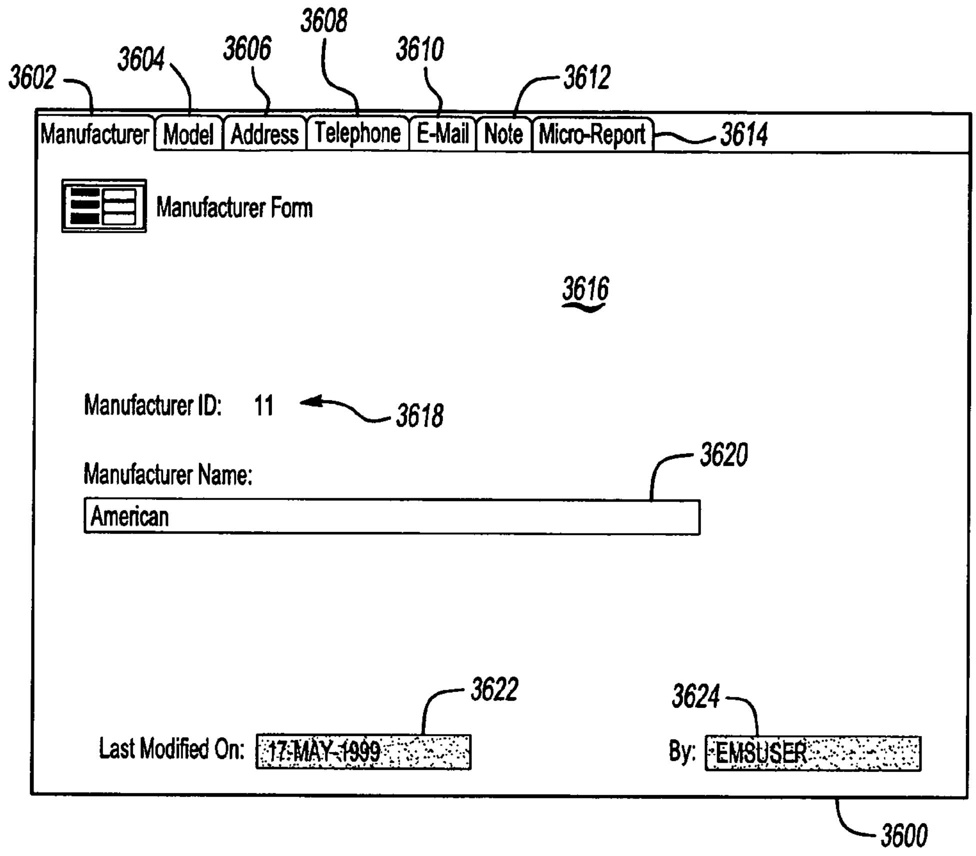

With reference FIGS. 22, and 36, selection of the manufacturer icon 2200G displays a manufacturer form 3600. The manufacturer form 3600 is used for maintaining contact information for the equipment manufacturers utilized at the gaming site. While the most common manufacturers are pre-loaded into the EMS 100, if equipment is purchased from a new manufacturer, its information will need to be entered along with the equipment models being used.

The manufacturer form 3600 utilizes a tab system having a manufacturer tab 3602, a model tab 3604, an address tab 3606, a telephone tab 3608 an E-mail tab 3610, a note tab 3612, and a micro-report tab 3614.

With the manufacturer tab 3602 selected, a manufacturer window 3616 is displayed in the manufacturer form 3600. The manufacturer window 3616 includes a manufacturer id field 3618, a manufacturer name entry box 3620, a last modified on field 3622, and a by field 3624.

The manufacturer window 3616 is used to enter/edit manufacturer information. The manufacturer ID is a system generated number tied to each machine entered in the system 100. The manufacturer name is entered or may be edited in the manufacturer name entry box. The last modified on date and by fields are system generated.

Figure 37:
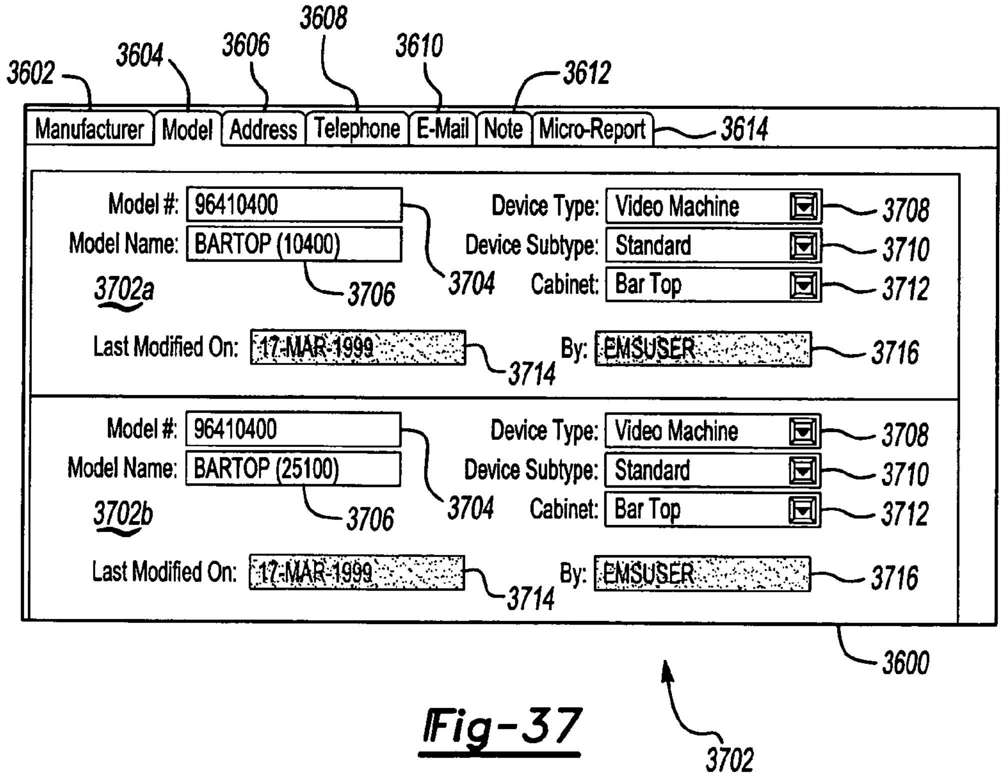

With reference to FIG. 37, when the model tab 3604 is selected a model window 3702 is displayed. As shown, the model window 3702 includes a plurality of sub-windows 3702A,3702B (only two of which are shown). Each sub-window 3702A,3702B stores information for one model for the current manufacturer. Each sub-window 3702A,3702B includes a model number entry box 3704, a model name entry box 3706, a device type drop down list 3708 (e.g., Reel Machine, Video Machine, Table, PRT Device), a device subtype drop down list 3710, a cabinet drop down list 3712 (Bar Top, Slant Top, Upright, Table Top), a last modified on field 3714, and a by field 3716.

The model window 3702 on the manufacturer form 3600 is used to enter each machine model made by a manufacturer. When a new type of machine from a manufacturer is received, it must be entered. The Last Modified By and On fields are read only and cannot be modified.

When the address tab 3606 is selected, an address window is displayed (see above). The EMS 100 permits multiple addresses for each manufacturer.

When the telephone tab 3608 is selected, a telephone window is displayed (see above). As with addresses, the EMS 100 permits multiple telephone numbers.

When the email tab 3610 is selected, an email address window is displayed (see above). Multiple e-mail addresses may be entered to accommodate for different contacts at the manufacturer site. The Last Modified On and By fields are read only and cannot be edited. The EMS 100 tracks all changes by recording the date and time of the last change as well as the user name making the change.

Selection of the note tab 3612 displays a note window for entry/display of notes relative to the current manufacturer (see above). Notes are permanent in nature and cannot be deleted.

Figure 38:
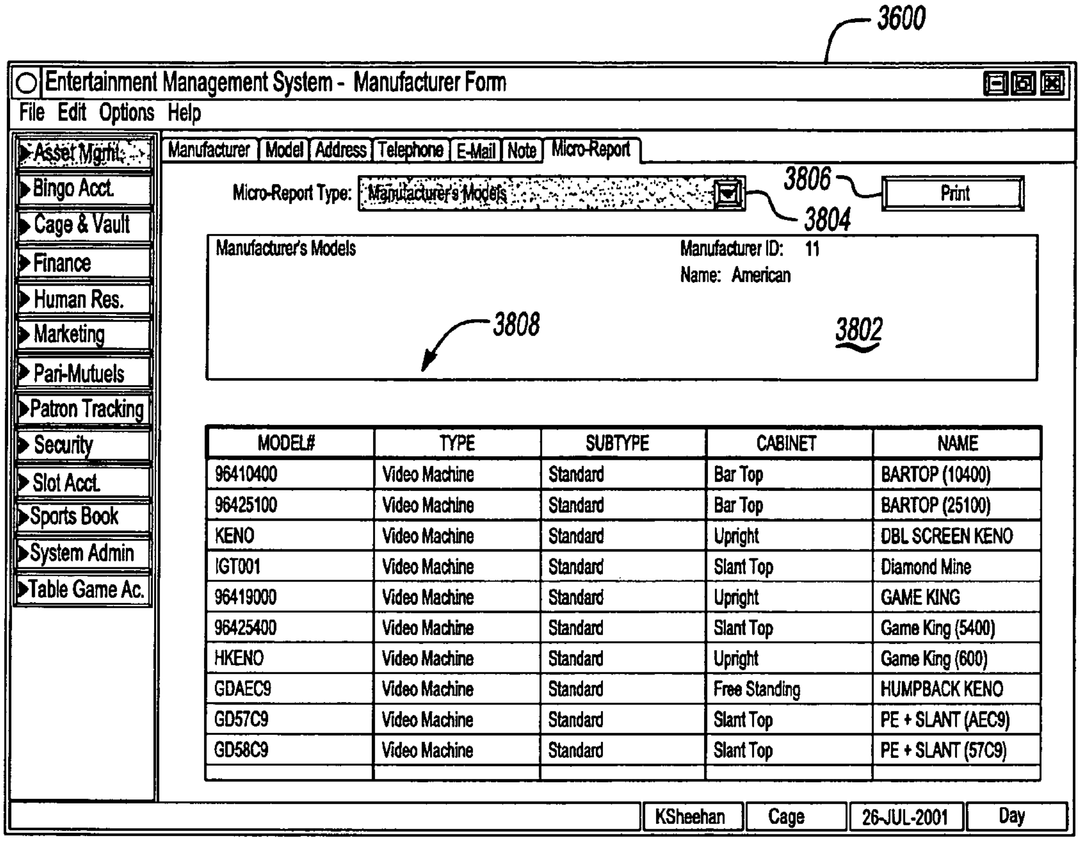

With reference to FIG. 38, selection of the micro-report tab 3614 displays a micro-report window 3802. The micro-report window 3802 includes a report type drop down list 3804, a print button 3806, and a report area 3808. Different reports may be chosen via the drop down list 3804. The report area 3808 may be printed on an attached printer (not shown) by actuation of the print button 3806.

8. Quick Setup

Figure 39:
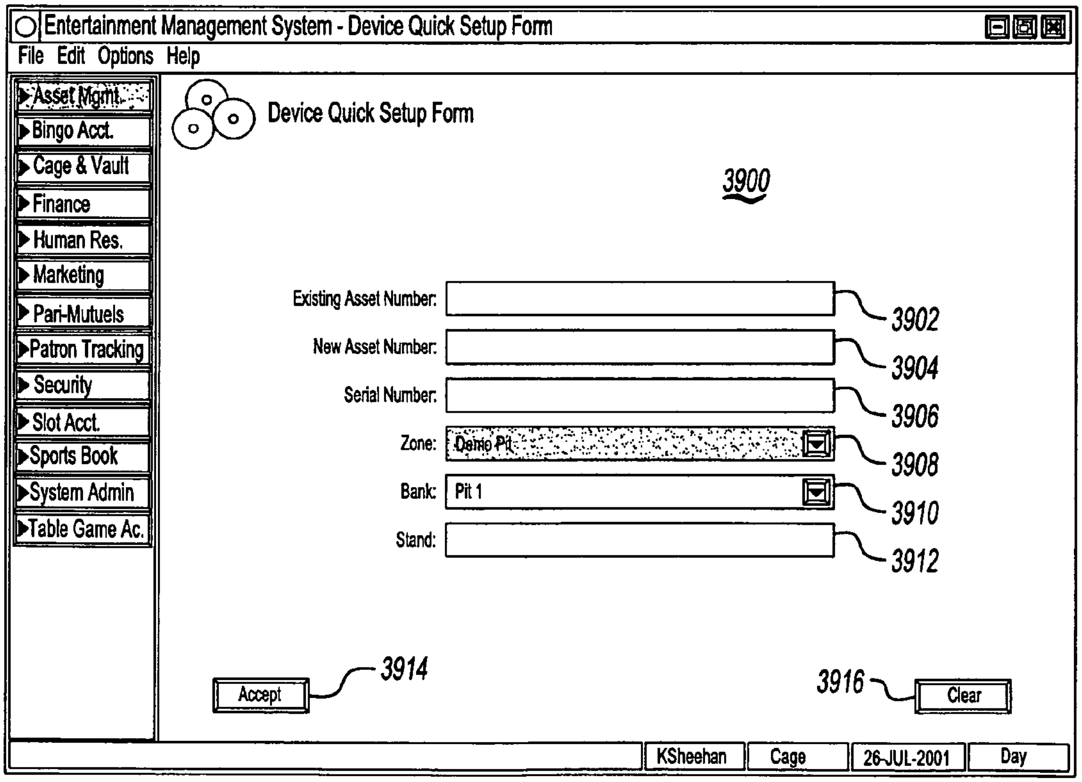

With reference FIGS. 22, and 39, selection of the quick setup icon 2200H displays a quick setup form 3900. The quick setup form 3900 is used to copy existing machine information from an existing machine for a new machine. The quick setup form 3900 includes an existing asset number entry box 3902, a new asset number entry box 3904, a serial number entry box 3906, a zone drop down list 3908, a bank drop down list 3910, and a stand entry box 3912. The quick setup form 3900 also includes an accept button 3914 and a clear button 3916. To use the quick setup form 3900, the user enters the existing asset number in the entry box 3902 and fills in the information relating to the new asset. The user then clicks the accept button 3914 to save the device information.

D. Bingo Accounting

The Bingo form (not shown) allows the user to swipe the patron card and enter the total buy-in by cash and/or coupon. This enables the casino to distinguish between actual cash earnings and coupon sales. Additionally, the buy-in is recorded by card type providing the casino with data relative to bingo cards that sell the most, least, etc. . . . Using the Bingo form, enables patrons to receive points for bingo activity based on the point multiplier set up on asset management under the bingo maintenance form. Points earned by the patron for bingo activity are easily located on the patron's form by locating their account and reviewing the patron point transaction history micro-report.

E. The Cage and Vault Module

The Cage module encompasses those functions and processes required to operate in a casino environment such as check cashing, check deposit, FOD transactions, etc. The following forms are available in the cage module:

CPV Redemption (Chip Purchase Voucher) form: This form is used to redeem CPV's at the cage.

CPV Lost form: This form is used to flag the system with a "Lost" status on a CPV and inactivate that CPV number. Operationally, casino management determines how the amount of a lost CPV is credited back to the customer. The issuing window will not come up short if a new CPVB is issued without receiving cash in return as the system recognizes the "Lost" status and credits the window back with the original amount of the voucher.

- Cash CPV form: Cash CPV enables customers to purchase a voucher(s) at the casino cage and redeem it in the pit for chips. CPV's may be purchased with cash, checks, etc. For the patron without a casino line of credit, that is carrying large amounts of cash, and does not want to post it as FOD or put it in Safekeeping, this is the ideal way to have those funds available in a safe secure manner. EMS will issue a CPV for a system or non-system account.
- Check Deposit form: Executes the deposit function and shows the status of checks not previously deposited.
- Checks form: Used to record check cashing by patrons.
- Chip Bank Fill/Credit form: Pit requests for fills, credits or markers, etc. are processed from this form. Upon request from the pit, this has the ability to auto print every ticket or to be manually prompted by the user. With the appropriate rights, a user may void incorrectly submitted pit requests from this form.
- Chips for Destruction form: Chips for Destruction are used for logging the chip type, location, and final destination of chips being destroyed by the casino.

Chips may be destroyed for a number of reasons such as no longer being in circulation or because they are mutilated.

Chips from Manufacturer form: It enables the casino cage to monitor all chips received from outside vendors.

Credit Card form: This form allows a patron to purchase a CPV using a credit card. This function is available only to those customers with credit card information on an existing patron account.

EFT/POS form: This form is quite similar to the Credit card form above; however, it allows the user to issue cash against a credit card as opposed to creating a voucher transaction.

Funds on Deposit form (AKA: Front Money): The Funds On Deposit form is used to accept customer deposits in the form of different currencies such as checks, cash, chips, etc. Acceptable currencies are based on casino policy and currency defaults may be added/deleted at any time. Deposits are entered and redeemed from the cage module. System flexibility allows them to be redeemed in the pit as well.

FOREX (Foreign Exchange) form: This form is used to process foreign currency exchanges. Currency types/rates are configurable defaults set up in the Exchange form of the Finance module. Currency exchange transactions can be processed for both system and non-system patrons.

Funds Transfer form: The Currency Transfer form is used to track the movement of currency to and from multiple locations. Defaults may be setup for any location and currency type. Regardless of the currency type used in a transaction, it is broken down by denomination, count and value to provide detailed records. All transactions are recorded with a system assigned reference number.

Markers form: EMS has the capability to issue markers from the cage in addition to the pit. Cage markers reflect the ID of the Issuing window as opposed to a pit marker reflecting a table ID. The form also includes a buyback option and historical information on the patron's marker activity.

Repository Status form: A repository is any casino location that receives disburses, and transfers money or other currency types (chips, etc.). This form provides the ability to select a repository location, view the status and if necessary, close or open it.

Return Checks form: Used to write-off, redeposit, collect and make payment on checks returned by the patron's financial institution.

TTO Credit form: The TTO Credit form allows the user to enter a temporary increase to a patron's casino credit line for markers or check cashing. (TTO=This Trip Only. This is tied to Property Management and hotel check-in and check-out signals).

Reports form: Provides the necessary accounting reports for check, marker and FOD activity, as well as providing a history of all credit accounts.

F. The Financial Integration Module

The finance or financial integration module 1506D of the EMS 100 maintains information relative to the casino's Finance Operation. The data recorded on these forms is used throughout the EMS 100 for such critical functions as currency exchange, banking information, and leasing associations. The following forms are available under the finance module 1506D: currency setup form, the financial institution form, the exchange form, the lessor form, the participant form, and the report form.

Figure 40:
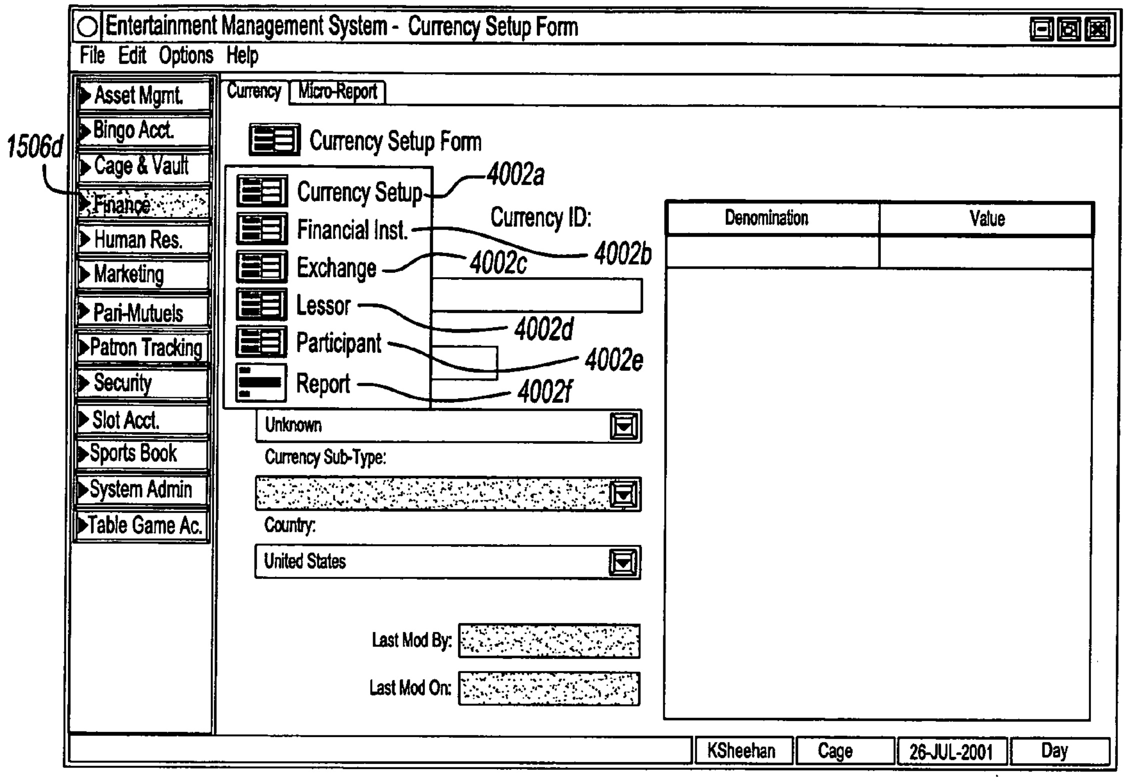

With reference to FIG. 40, each module is accessible through a corresponding icon 4002A,4002B,4002C,4002D, 4002E,4002F.

1. The Currency Setup Form

Figure 41:
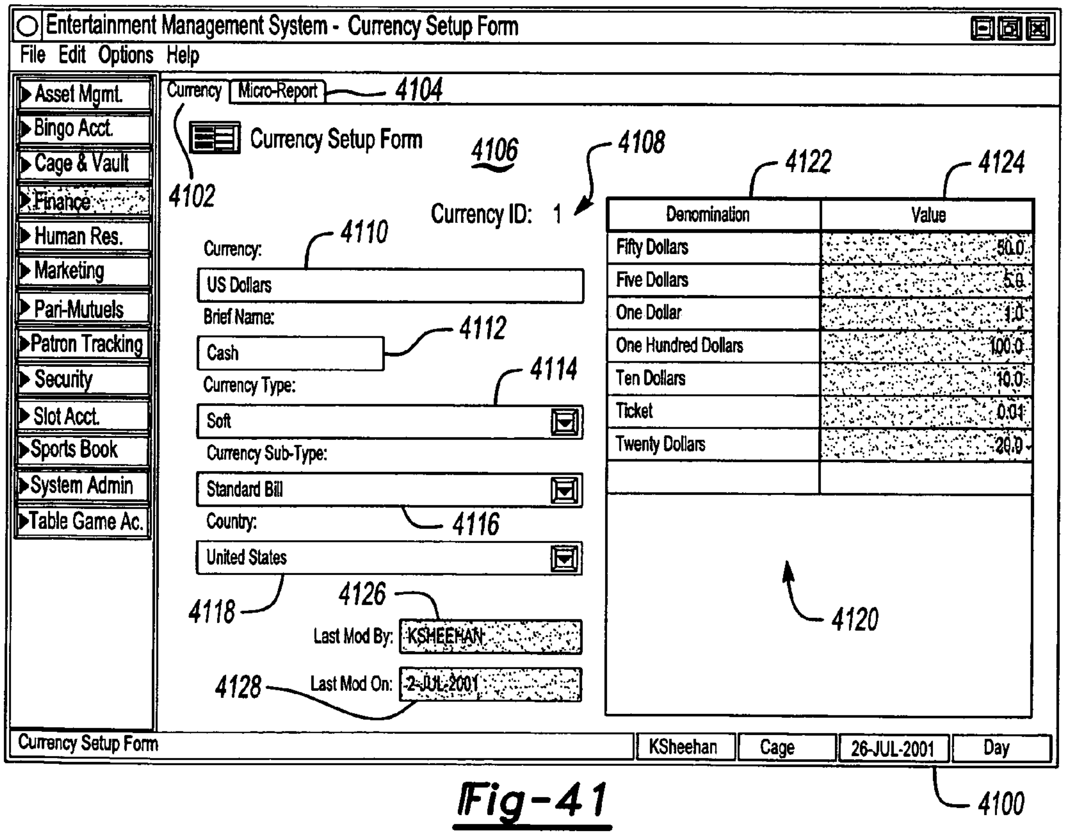

With reference to FIG. 41, with selection of the currency setup icon 4002A, a currency setup form 4100 is displayed. The currency setup form 4100 includes a tab system having a currency tab 4102 and a micro-report tab 4104.

Upon selection of the currency tab 4102, a currency setup window 4106 is displayed in the currency setup form 4100. The currency setup window 4106 includes a currency ID field 4108, a currency entry box 4110, a brief name entry box 4112, a currency type drop down list 4114, a currency sub-type drop down list 4116, a country drop down list 4118, a list of available currencies 4120, a denomination column 4122, a value column 4124, a last modified by field 4126, and a last mod on field 4128.

Figure 42:
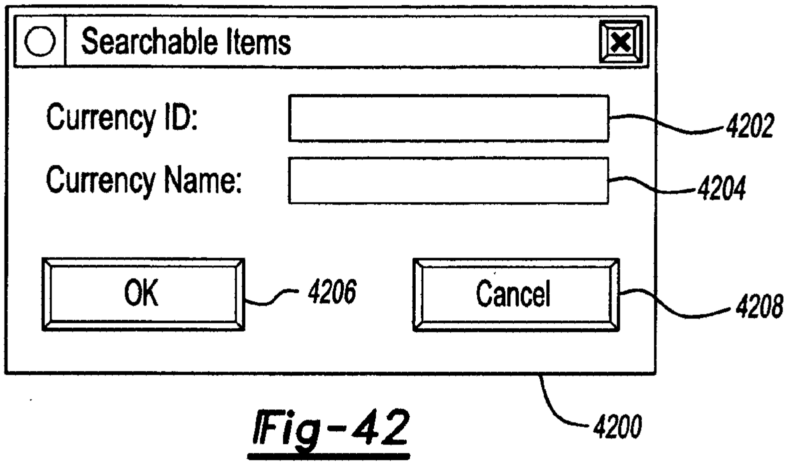

With reference to FIG. 42, upon selection of the find item under the file menu or usage of the CTRL+F shortcut, a search window 4200 is displayed. The search window 4200 includes a currency ID entry box 4202, a currency name entry box 4204, an ok button 4206, and a cancel button 4208. Either an ID or currency name may be entered in the corresponding entry box 4202,4204. A search is performed after the ok button 4206 is selected. To find all currency types, the entry boxes 4202,4204 may be left blank.

Figure 43:
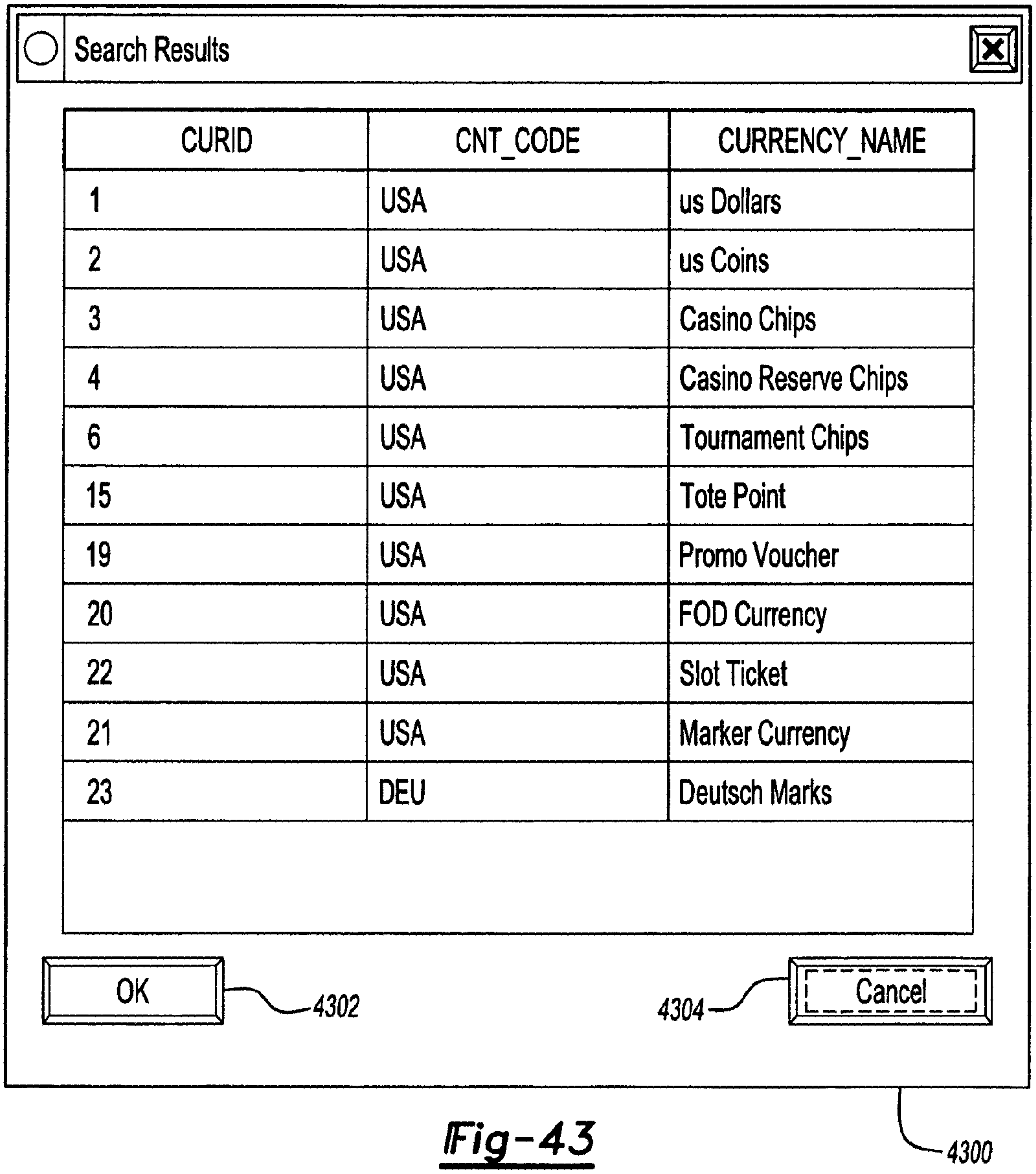

The results are displayed in a currency list 4300, as shown in FIG. 43. The currency list 4300 includes an ok button 4302 and a cancel button 4304.

To modify en existing currency, the user may highlight the currency on the currency list 4300 and select the ok button 4302.

Returning to FIG. 42, the form 4200 must first be cleared. Then the currency name, brief name and a currency type may be entered/selected. The currency type may then be saved (the save option under the file menu or CTRL+S). Additional currency types may then be added.

Denominations are added using the list 4120. The list 4120 represents the breakdown of denominations belonging to a specific 'Currency Sub-Type'. The value column is for entering the single dollar value of each. To key in cash, an entry must be made for each dollar denomination used by the property, i.e. $1, $5, $10 and so on. For chip entry it would be the standard chips (1, 5, 25 and so on). Entry for promotional chips, junket chips, etc. would fall under those sub-type headings, not 'standard'. A denomination value must be the value of a single unit as the value is also the multiplier and will adjust the end totals accordingly.

The CTRL+S shortcut or update option under the edit menu may be used to save the new entry. Selection of the micro-report tab 4104 displays a micro-report window (not shown). The micro-report window is used to provide quick information about the current currency.

2. Financial Institution Form

Figure 44:
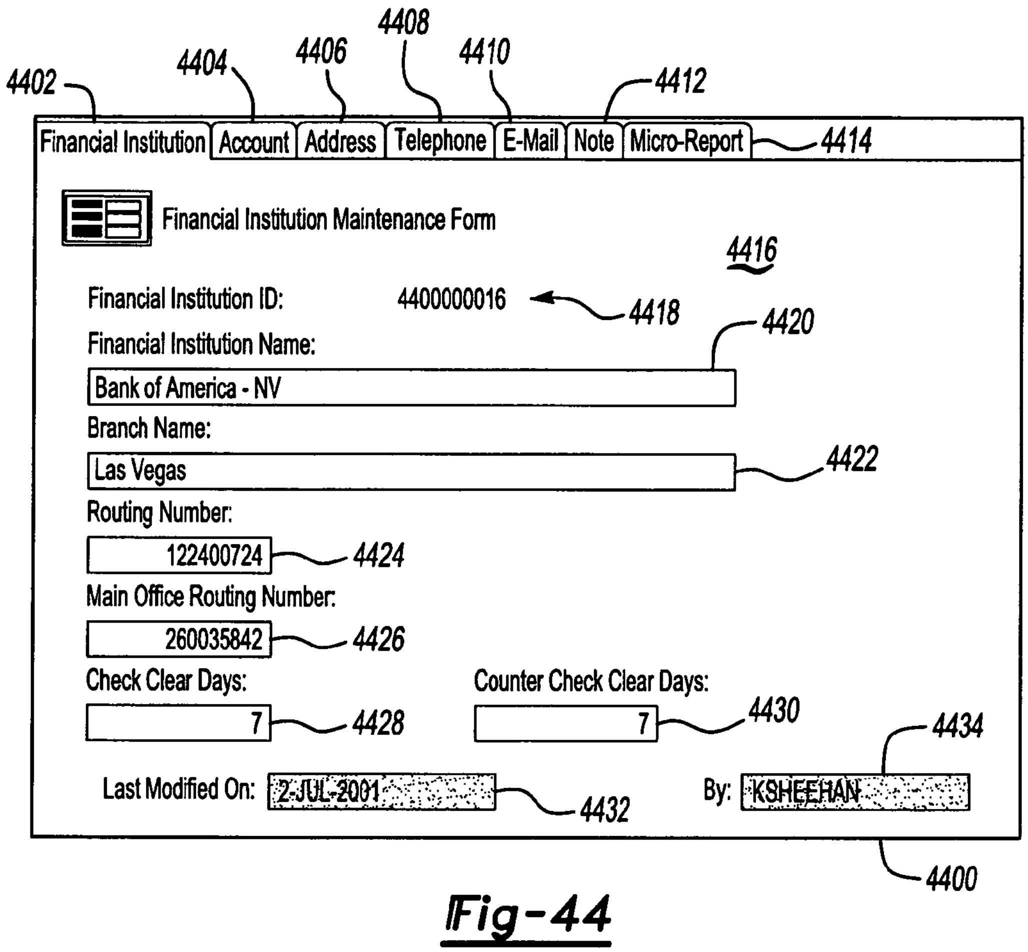

With reference to FIG. 44, upon selection of the financial institution icon 4002B, a financial institution form 4400 is displayed. The financial institution form is used to record the names, branches, and routing numbers of the banking establishments with which a location does business. The financial institution form 4400 includes a tab system having a financial institution tab 4402, an account tab 4404, an address tab 4406, a telephone tab 4408, an E-mail tab 4410, a note tab 4412, and a micro-report tab 4414.

Upon selection of the financial institution tab 4402, a financial institution window 4416 is displayed in the financial institution form 4400. The financial institution window 4416 includes a financial institution ID field 4418, a financial institution name entry box 4420, a branch name entry box 4422, a routing number entry box 4424, a main office routing number entry box 4426, a check clear days entry box 4428, counter check clear days 4430, a last modified on field 4432, and a by field 4434.

An ID number for a financial institution is assigned and displayed in the field 4418 by the EMS 100 when a new record is saved. To add a new financial institution, the financial institution name, branch name, routing number, and main office routing number must be entered in the appropriate entry box 4420,4422,4424,4426. The check clear days entry box is a configurable field for the number of days the check is held against a patron's credit limit. When they expire, and the check is presumed to have cleared (if not recorded as returned either by data entry by a user or automated electronic transmission from a financial institution), the dollar amount of the check is added back to the available limit. The counter check clear days field is used for the same purpose as the field above.

Bank information not entered in the financial institution form 4400 here, will not be available in the drop down list of bank names on the patron credit form when adding banks to an account (see below)

Figure 45:
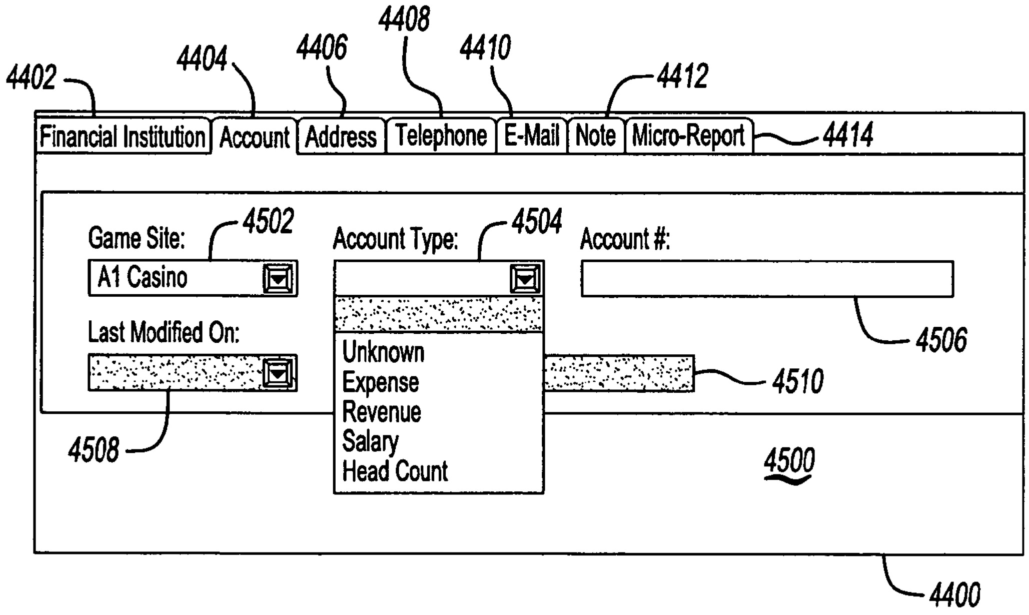

With reference to FIG. 45, with selection of the account tab 4404, an account window 4500 is displayed in the financial institution form 4400. The account window 4500 includes a game site drop down list 4502, an account type drop down list 4504, an account # entry box 4506, a last modified on field 4508, and a by field 4510.

The System Administrator sets up account types for Financial Institutions. Account types represent what the account is used for, i.e. payroll, hotel expenses, special events, etc. The Last Modified On and By fields are read only and cannot be edited. Each time a record is saved, the EMS 100 records the date and time of the update as well as the user name making the change.

When the address tab 4406 is selected, an address window is displayed (see above). The EMS 100 permits multiple addresses for each financial institution.

When the telephone tab 4408 is selected, a telephone window is displayed (see above). As with addresses, the EMS 100 permits multiple telephone numbers for each financial institution.

When the email tab 4410 is selected, an email address window is displayed (see above). Multiple e-mail addresses may be entered to accommodate for different contacts at the financial institution.

Selection of the note tab 4412 displays a note window for entry/display of notes relative to the current financial institution (see above). Notes are permanent in nature and cannot be deleted.

Selection of the micro-report tab 4414 displays a micro-report window (not shown). The micro-report window is used to provide quick information about the current financial institution.

3. Exchange Form

Upon selection of the exchange icon 4002C, an exchange form (not shown) is displayed. The exchange form will not properly function if the currency setup form 4100 is not configured. All currency types used for transactions in the EMS 100 must be setup on the currency setup form 4100. The following are descriptions of the fields on the exchange form:

Base Currency—This is typically the casino standard currency. Additional currency types may be entered at properties using more than one base on the casino floor.

Converted Currency—The foreign currency type being exchanged from the patron.

Exchange Rate—The fair market exchange rate; typically received from your banking institution in the form of a rate sheet.

Active—A checkmark indicates this currency type will be available on the Forex (Foreign Exchange) form of the Cage module. Checkmark off makes it unavailable.

Modified On/By—Date/time stamp and user id of the user that last modified this entry.

4. Lessor Form

Upon selection of the lessor icon 4002D, a lessor form (not shown) is displayed. The lessor form is used to maintain information on companies with whom the casino leases equipment or with who the casino engages in participation arrangements. Each leased device is tied to the Lessor account, including the dates and payment terms of the lease.

The lessor form utilizes a tab control with a device tab, lessor tab, address tab, telephone tab, email tab, note tab, and a micro-report tab (not shown).

Selection of the device tab displays a device window (not shown) which enables the user to configure (to the device # level) the net win, drop and coin-in percent for the leased equipment. The start and end dates are configurable. In the event the terms of a lease change mid-stream or a contract expires, there is a way to audit the start/end dates for those terms. The device window maintains information on the devices associated with a Lessor. The following fields are on the device window:

Device Asset #—Select the Device Asset # from the drop down list.

Daily Flat Rate—If payment for the device is a daily fee, enter the fee in this field.

Percent Net Win—The Percent Net Win field is used to record the percentage provided to the Lessor as payment for the device.

Percent of Drop—If the Lessor receives a percent of the total drop for the device as payment, enter the percentage here.

Percent Coin In—If payment for the device is based on a percent of coin in, enter the percentage in this field.

The Lessor tab of the form is where the name of the leasing companies is input. The leasing companies are those companies the casino leases slot machines or any other gaming devices from. The EMS 100 will assign a system ID unique to each company. Before creating an entry, the 'Find' (CTRL+F) command should always be used to avoid duplicating a leasing company. The leasing company name is entered in a Lessor Name field and the 'Update' command is used to save the entry.

When the address tab is selected, an address window is displayed (see above). The EMS 100 permits multiple addresses for each lessor.

When the telephone tab is selected, a telephone window is displayed (see above). As with addresses, the EMS 100 permits multiple telephone numbers for each lessor.

When the email tab is selected, an email address window is displayed (see above). Multiple e-mail addresses may be entered to accommodate for different contacts at the lessor.

Selection of the note tab displays a note window for entry/display of notes relative to the current lessor (see above). Notes are permanent in nature and cannot be deleted.

Selection of the micro-report tab displays a micro-report window (not shown). The micro-report window is used to provide quick information about the current lessor.

5. Participant Form

Upon selection of the participant icon 4002E, a participant form (not shown) is displayed. A participant is an owner/operator of an establishment whose business (i.e., bar, convenience store, etc.) houses the slot machines and who "participates" in the net win in return for providing the location, space, atmosphere, and day to day customer service. The participant form or participant maintenance form utilizes a tab system with a participant tab, a rates tab, an address tab, a telephone tab, an e-mail tab, a note tab and a micro-report tab (not shown). Selection of a tab displays the corresponding windows in the participant form:

participant window: defines the participant information, rates windows: displays the level of rates for participant, address windows: displays the address information of the participant, telephone window: displays the telephone number of the participant, e-mail: displays the email information of the participant, note: maintains notes relative to the participant, and micro-report window: displays reports regarding the participant.

The participant window is used to enter/edit participant information. Before entering new participant names, a search for the participant should be performed (using the find command or CTRL+F) in order to avoid duplicating a participant account. The following are the participant parameters found on the participant window: Participant ID: a system generated number tied to each participant entered in the system and Participant Name.

When the address tab is selected, an address window is displayed (see above). The EMS 100 permits multiple addresses for each participant. When the telephone tab is selected, a telephone window is displayed (see above). As with addresses, the EMS 100 permits multiple telephone numbers for each participant. When the email tab is selected, an email address window is displayed (see above). Multiple e-mail addresses may be entered to accommodate for different contacts at the participant. Selection of the note tab displays a note window for entry/display of notes relative to the current participant (see above). Notes are permanent in nature and cannot be deleted. Selection of the micro-report tab displays a micro-report window (not shown). The micro-report window is used to provide quick information about the current participant.

G. Human Resources

The human resources module 1506E consists of the following forms: Change Password, Departments, Employees, and Micro-Report (not shown). Each of the forms is accessible through an icon viewable when the cursor is over the human resources group icon 1506E.

The Fields incorporated in the Employee form include: Employee full name, addresses, phone numbers and e-mail addresses. Additionally, there is also a 'status' field that can be changed to 'inactive' allowing the user to disable an employee account. This ensures the integrity of employee accounts not currently in use, and prevents the account of a former employee from being used.

The Change Password form enables each user to have a protected password unique to their user id. To avoid confusion with the users and increase system flexibility, the same user id/passwords per employee are used throughout the EMS 100. These two functions will only be as effective as the user who does not share their password and always logs out of their workstation. The EMS 100 creates a log for every action taken by a user id/login with a time and date stamp and the module/form of EMS used for that activity. Sharing passwords could be costly.

For security reasons, it is important that passwords are changed often. EMS uses password security to track system changes, protect its users and protect data integrity. Users should always log in with their own unique password and user id. At no time are passwords to be shared. This puts network security at risk and is likely to be a breach of internal policies and procedures for any property operating with an automated system. The Change Password form enables users to change their password provided they know their current password. Not sharing your password prevents anyone else from changing it with the exception of the System Administrator. Users may or may not have access to the Change Password function; it depends solely on internal policies and procedures. Users should be especially careful when retyping a new password for system verification. It must be the same as the first 'new password' entry. The System Administrator attaches each user to a role name. The role name has access to a list of forms/functions enabling the user to accomplish tasks required by their job description. Using the login and password of another employee may prevent the user from properly doing all that is required of their position and additionally result in errors that can affect the appearance of the casino performance, patron accounts, etc. More importantly, these errors will be posted to the wrong user id/login. If a user forgets a password, they must see the System Administrator. This form is of no use without a current password. Only someone with rights to Password. Maintenance in System Administration can override an existing password without knowing it. No user can change a password belonging to anyone other than themselves. Users are notified when their password is about to expire and have approximately ten days to create a new one. On the tenth day the user account will be locked if the old password has not been changed. If you suspect your password has been compromised, and do not have access to this form, see your System Administrator immediately.

The Department form allows an existing or newly created department name to be added as a system default. These defaults enable Human Resources to identify within the employee account what department or work area they are assigned to. The employee tab of Human Resources contains a field for 'Departments'.

The employees form allows a user to create, edit or inactivate an employee account. Below are descriptions of the fields required for completion:

Department: Displays department titles for the property. This field can be edited if an employee transfers to another department.

Language: Defaults to the country set up for your system. The selection of a language determines the language that the user sees in the forms/reports of the system. This allows for smooth multi-lingual operation of the system.

Status: Active, inactive, unknown. Describes current account and/or employment status.

Type: Describes the employees actual job title/position.

SSN/EIN: Social Security Number for employee.

Salutation: Salutation helps to properly address employee mail.

Last/First/Middle Name: Employee's proper legal name.

Generation: Legal names often include Jr., Sr., 3rd, etc. Helpful in correctly referencing and locating accounts.

Login Name: Login name the new user will enter to gain system access.

Modified On & By: Displays date/time of the last change made to the form as well as the user id of the individual who made the change.

Department: a drop down list of available departments.

The advantage in using 'inactive' is if an employee is not using the system, no one can use this id/password. While these should remain confidential, they are often compromised. 'Inactive' is an extra step in protecting the integrity of the system/user.

The employee's data is saved through the EDIT/UPDATE (or CTRL+S) menu item. This updates/saves the new entry.

Updating a new employee record prompts a Password Entry window. This window allows the creation of a new password for the new employee. If an employee's job description requires they have an employee card to be used for machine functions or card swiping, then a card can be created for them using the Card tab of the Employee form.

The license window is used to enter the gaming licensing information for employees. The following are the parameters on the license window: license type and license number. As with other tabs, multiple license types and numbers may be entered. The license data may be saved using EDIT/UPDATE menu option or use the keyboard shortcut CTRL+S.

The system keeps a permanent record each time data is edited or 'modified'. The display will include the date and time of the change as well as the user id.

When the address tab is selected, an address window is displayed (see above). The EMS 100 permits multiple addresses for each employee. When the telephone tab is selected, a telephone window is displayed (see above). As with addresses, the EMS 100 permits multiple telephone numbers for each employee. When the email tab is selected, an email address window is displayed (see above). Multiple e-mail addresses may be entered to accommodate for different contacts. Selection of the note tab displays a note window for entry/display of notes relative to the current employee (see above). Notes are permanent in nature and cannot be deleted.

The Last Modified On and By fields are read only and cannot be edited. The EMS 100 tracks all changes by recording the date and time of the last change as well as the user name making the change.

The card window is used to assign ID cards to employees. Many employers assign different types of ID cards to employees for a variety of reasons such as processing system transactions, machine functions, etc. The card window contains the fields for the employee information attached to each card. The card id and PIN number are unique to the individual employee and may not be duplicated.

Card ID: ID # assigned to this card that is attached in the system to the employee PIN.

PIN: Employee PIN used when processing transactions.

Card Type: Clicking the down arrow displays the available types for selection.

Card Status: Denotes active, lost, etc.

Issue Date: This is usually the hire date as the employee account and card are created simultaneously. In could also be the date a card was reissued.

Retire Date: Date the card is retired.

Modified On/By: Displays the date, time and user id of last change to the form.

A pin number may be created by clicking on the Pin Number field to enter a four-digit number the employee will use to process transactions.

The date window employees is used to track an employee hire date, anniversary, birthday, etc. Keeping in mind that each screen in Human Resources allows multiple entry of a similar data type, the user can make an entry for each of the above-mentioned examples. Tracking these occasions as a way to acknowledge your staff goes a long way in establishing a good rapport.

The image window protects both the employer and employee by including so much detail on an employee account. Images recorded here, can be printed out and distributed for identity verification. As with many of the EMS screens, multiple forms of identification can be entered. The more types of identification that are available for entry, the more secure the system will be.

The image type is denoted using a drop down list. The image types are defined in the system administration module. Examples include photograph, signature, fingerprint, or other biometric form of identification. A camera may used to take live photos. This option will be available based upon the network setup and configuration. Pictures can be printed and used for id badges, copies to personnel files, etc. A photograph is one example of how to identify an employee which requires a net cam. Other options seen in the drop-down list may require the use of a scanner or other equipment.

Notes entered on an employee account can be helpful as a future reference. In the event of an emergency, contact information, health information such as allergies, etc. can be readily available through use of the 'Note' tab. In the field for 'Note Type' comments may be entered under a category such as Personal, Security, etc. These categories are established as default 'types' in the System Administration module on the 'Employee Setup' form. Default lists may be edited at any time by the System Administrator. Caution should be used regarding the content and accuracy of your note entry. Notes are permanent records that cannot be deleted and may be viewed by any number of people with access to the system 100.

The Default tab allows the System Administrator to default a user account to the form they use most often. For example, the employee that spends most of their day using the Patrons form of Patron Tracking will automatically default to that form at login. They continue to have access to any forms/module they have security rights to but this takes them directly where they need to be. Another example would be a slot floor person who uses the Jackpot and Fill form 99% of the time. At login, they default to the Jackpot and Fill form.

The following are examples of micro-reports which are available in the micro-reports window:

- Card History—The intent of this report is to show what other cards have been issued in the past and why they were inactivated.
- Employee Roles Membership—Displays the role name and description the employee is currently attached to. Whether an employee is attached to one role or various roles, everything will be displayed in the report .

H. Marketing

The Marketing Switchboard Group 1506F contains the forms, reports, and processes that deal specifically with marketing related activities. Included are functions necessary to improve patron attendance, increase wagering, and in general, improve the relationship with current and potential patrons . This group includes:

- The Attendance Form—Keeps track of which patrons attend your events to fine-tune your target marketing efforts.

Bulk E-Mail Form—Provides the capability to send e-mail messages to patrons for special events at your site. Select from sending messages to all patrons, patrons in a certain group, or patrons that were invited to a selected event.

Comp Maintenance Form—Setup promotional items and assign values to them in order for patrons to redeem earned points.

Comp Point Management Form—Allows the user to modify a patron's comp points.

Events Form—Create marketing events that attract patrons to your establishment. This form is used in conjunction with the patrons interests to correctly market events.

Group Point Management Form—Allows the user to add points to, or subtract points from a group of patrons.

Group Setup Form—An easy way to create groups so that mailing lists and invitations are much easier to create.

Creating Groups Form—Allows the user to create groups in a more board based criteria.

Incentives Form—Generate additional revenue by encouraging patrons to visit more often and play longer by creating incentives which include double and triple points promotions, etc.

Invitations Form—Create targeted invitations to ensure that the patrons invited to an event are the ones most likely to attend.

Mailing Lists Form—Generate mailing lists that target specific patron groups.

Point Caps Form—Allows the user to give a certain amount of points during certain periods of the year.

Point Management Form—Allows the user to add points to, or subtract points from, a patron's account.

Random Draw Form—Allows the user to view patrons who are currently playing, patrons that have played this month, and patrons that have an active account.

Tour Operator Form—Allows the user to view specific information on tours that have or will be visiting your site(s).

Tours Form—Create upcoming tours visiting your site(s).

Voucher Status Form—Allows the user to check the status voucher or mark a voucher that has been redeemed or lost.

1. The Attendance Form

Marketing attendance by patrons at an event is the final stage of the marketing event process. Once an event has been planned and invitations sent, the user will want to know which patrons attended. If the event tracking method selected was input, the Attendance form is where patron attendance is recorded. As your patrons come to an event, their patron card can be swiped in a card reader or the card ID number entered to denote attendance at the event.

2. Bulk E-Mail Form

The Bulk E-Mail form is used to send e-mails to selected patrons. The form allows the user to send e-mails to all patrons at a site, to patrons in a selected group or to patrons that have been invited to a selected event.

Bulk email may be sent for upcoming events, promotions, etc to a selected group of patrons. Those who are to receive the email can be all patrons, patrons in a selected group or patrons invited to an event.

3. Comp Maintenance Form

The Comp Maintenance form is used to set up those items for which a patron can redeem earned points. Comps can be merchandise or service related. In order to provide costing reports, the cost of the item to a site is maintained, as well as the actual or retail value of the item. The Comp ID is generated by EMS each time a new comp is added. A new comp is created by entering a meaningful name for the comp, selecting a comp type from a drop down list, and marking the new comp as active. The comp name will be used on reports and will be printed on the comp slip/voucher slip. The comp maintenance form has the following fields:

The Comp Issue and Patron Redemption fields are used to enter the number of points required to purchase an item. This point total is deducted from the point balance accrued by the patron. These points are used for items configured as redemption items.

The Comp Points Required field defines the number of points required to purchase the item. These points are used at the discretion of the casino and the patron has no knowledge of their existence.

The cost field is the actual cost to the casino.

The value field is the actual retail value of the item.

The days valid field defines the number of days the comp will be valid. This field is useful when a comp is time sensitive, such as a Super Bowl comp or a Holiday comp.

Save the record by using the EDIT/UPDATE function or by using CTRL+S. The footer of the form will display the broadcast message Record Updated when the save is complete.

Entering points in the 'Points Required' field of an 'active' comp allows that comp to appear in the list of comps in the Patron Redemption form. This means the points are redeemed from the patrons accrued point total. A comp name that only has a total for 'Points Required' will be a redemption item. These items are usually casino memorabilia, t-shirts, coffee shop, dinners, etc.

Entering points in the 'Comp Points Required' field for an active comp allows the comp to appear in the list of comps in the 'Comp Issue' form. These points are points 'unknowingly' earned by the patron or attached to the patron account at the casino's discretion. They are unknowingly earned because the patron is never made aware of their existence and does not see them included in their earned slot points, table points, etc.

Comp points are for the sole purpose of enabling the casino to go the extra mile for a patron without a deduction to their earned slot points. It appears to the customer that they are getting something for nothing. Comps based on these points are issued also at the casino's discretion.

If points are entered in both fields, the comp/voucher will be available for redemption in the Patron Redemption form and available as a casino comp in the Comp Issue form.

4. Comp Point Maintenance Form

The Comp Point Management form is used to adjust a patron's comp points. To adjust a patron's comp points, locate the patron account to be adjusted by using Edit/Update or CTRL+F. The 'Comp Point Management' form is displayed. After locating the account, the upper section of the form displays the Patron Name, ID, Card ID, and Current Comp Points. The mid-section of the form contains the fields to add or subtract points. A reason for the adjustment must be entered or the form cannot be saved.

To adjust a patron's comp points stored on card ID the following steps are performed:

Prompt a patron account by using the keyboard shortcut CTRL+F, swipe the patron card, or use the top menu option Edit/Find and manually enter the patrons card ID number and pressing the Enter key locates the account.

to add points: enter a point amount in the 'Number of Points to Add' field.

to subtract points: enter a point amount in the 'Number of Points to Subtract' field.

Enter a reason for the adjustment (mandatory).

All adjustments appear on marketing reports reflecting the time, date, and reason and user id for each account receiving a point adjustment.

5. Events Form

The events form of the marketing module provides the opportunity to target specific patrons when sponsoring special events. An event can be any type of function sponsored by and/or held at a site, i.e. a concert, sporting event, slot tournament, etc. Rather than sending invitations to all patrons, the EMS target markets the patrons most likely to attend special events and determine which gamesite(s) the event will be held at The Events form contains two tabs to assist in setting up marketing events:

Events tab: Used to establish the event itself, as well as the tracking method and event type.

Game Site: Determines which site(s) will participate in the event.

The Events tab is used to establish marketing events. Once an event is on this form, invitations can be created and attendance can be tracked. The more information that is gained regarding the patrons, the more effective the target marketing. The Events tab below should be completed for every event you want to track.

A new event is established by the following method:

enter an event name, select a type and sub-type (optional), enter or select from the calendar the start date of the event, or select from the calendar the end date of the event.

Patrons are marked as attending an event if using their player card at the site.

The Game Site tab is used to select which site(s) will be hosting an event. In a multi-site environment, an event can be setup to run at one or more sites. This is a mandatory tab. If an event is created without selecting a game site and the user attempts to select the event name on the Invitation form, it will not appear in the drop-down list.

6. Group Point Management Form

The group point management form allows the user to add (or subtract) points on a specific patron account in a group or add points to the entire group at one time. Displayed in the group point management form are the following: Group Name, Patron ID and name, the number of points to add, the number of points to subtract, and a reason for the point adjustment.

To adjust points the following method is used:

Select and highlight the desired group by clicking on the group name in a drop down list.

After selecting a group name, the patron ID/name list will be displayed. A point adjustment can be done for every patron in the group or for an individual.

to add points—enter a point amount in the Number of Points to Add field.

to subtract points—enter a point amount in the Number of Points to Subtract field.

enter a reason in the adjustment reason field (mandatory).

7. Group Setup Form

The Group Setup form allows the user to create groups and add specific patron names to them. This form should not be confused with the Groups form which creates groups but adds patrons based on selected criteria as opposed to selected names. By attaching patrons to a group name, invitations and mailing lists are much easier to create for future use as opposed to doing individual mailers and invitations. Below is a sample of the Group Setup form with some groups already created.

To create a group the following process is followed:

Click on the Name field and enter a new group name,

Click the Description field and enter a short description of the group.

To add patrons to a group,

As patrons are added to a group, their name will appear in the list at the footer of the form, highlight a group name in the list to designate it as the group the patron will be added to, Click the ADD button to prompt the Search window, Search for a patron account by entering data in any of the fields.

The patron ID number and name will appear in the list of patrons attached to the highlighted group.

To add names to another group, highlight the name of that group and select the ADD button, Proceed with the search function as described above to attach additional names.

Patrons can be deleted from a group at any time. To delete a patron from a group, the following method is followed:

Highlight the group name, and select DELETE.

Patrons can be undeleted from a group. To Undelete a patron from a group, the following method is performed:

click on the patrons name and highlight it in green,

Click on UNDELETE to add the patron name back to the group.

To delete a Group, the following method is performed:

Highlight the group name,

From the top menu, select EDIT and DELETE or use the keyboard shortcut CTRL+E.

8. Creating Group Form

In contrast to the group setup form, group creation form allows a user to form groups using a more broad based criteria based on demographics. In Group Setup, you specifically locate the patron's you wish to add to a group on a one-to-one basis, manually attaching them to a group name. Groups names created in the group creation form appear in the group list on the group setup form and on any other EMS form with a group tab. For example, the membership app in patron tracking has a default group drop-down list. This allows you to add a patron to a group when they sign up. Patrons may be added or removed from a group at any time by using this form.

As with most forms, this form utilizes a tab control. The form includes the following tabs:

group tab: selection of the group tab displays a group window in the group creation form which is used to enter the name and description of the group.

geography tab: selection of the geography tab displays a geography window on the group creation form which is used to select criteria based on geographical locations.

patron tab: selection of the patron tab displays a patron window on the group creation form which is used to select demographic information on patrons.

interests tab: selection of the interests tab displays an interests window on the group creation form which is used to enter the specific interests of the patrons in this group.

groups tab: selection of the groups tab displays a groups window on the groups creation form which is used to display the names of existing groups that can be attached to the new group. Rather than combine two groups patron by patron, it's a time saver to attach them.

dates tab: selection of the dates tab displays a dates window on the group creation form which provides a means of targeting those patrons whose special dates (birthday, anniversary, sign-up date) fall within the time frame of an event.

The group window uses specific criteria selected from the tabs at the top of the form, i.e. geographical location, specific age groups, a specific interest, card type, etc. When a 'Calculate Patron's' button is activated, the system is queried based on this criteria, as opposed to locating specific patron accounts.

The group window is configured and functions very much like the Invitations form. To create a group the following method is followed:

Enter a group name using appropriate capitalization, etc. as this name will appear on reports.

Enter a brief description of what the group is for, made up of, etc. NOTE: The omission of selected criteria from any tab at the top of the form allows the system to include all criteria/field types of each tab in the query for the new group. For example, by not making zip code selections on the geography tab, based on other tab criteria, every patron with a zip code may be included in the calculation for this group.

After the criteria have been selected, return to the Group tab to calculate your list.

To calculate the group list (using the above four buttons):

Select 'Calculate Patrons' on the group window to determine the number of patrons in the group.

Select 'Add Patrons' if this is satisfactory.

If there are too many or not enough patrons, change the criteria using the different tabs. To decrease the number, select 'Remove Patrons'. Anyone who falls within the criteria changes will be removed from the group. For example, if you changed the age determination to anyone=to 65 and selected Remove Patrons, the system would subtract those accounts from the group list. To increase the number, select 'Calculate Patrons' again. The system will locate additional accounts falling within the new criteria selections.

If the new calculated number is okay, select 'Add Patron' and the accounts will be attached to the new group.

To change all of the criteria and start over, select 'Remove All Patrons'. Everyone on the list will be removed. Select all new criteria and start again.

The geography window is used to select criteria based on the geographical location, i.e., Country, State, City, or Postal Code. The geography window may be left blank, so that there are no geographical restrictions.

Geographical restrictions are placed in the following manner:

Country: Select the Country from a drop-down list.

State: Select a state from the drop-down list. To include postal codes for an entire state in your criteria, leave the City and Postal Code fields blank. To further break down the criteria, continue to the City field.

City: Select a City to include in the selection criteria from the drop-down list. Include all postal codes for the city by leaving the Postal Code field blank.

Postal Code: To select a specific postal code, highlight it in the drop-down list.

To adding geographical selections to the list:

Select the arrow buttons in the middle of the window to add postal codes to the list on the right-hand side of the screen.

Click Add to List to include the postal codes in your group selection criteria.

To remove geographical selections from the list:

Remove a postal code by highlighting it in the list on the right-hand side of the window and click the Remove from List button.

Remove All—To remove all postal codes from the selection criteria, click the Remove All button. All previously selected postal codes will be removed from the criteria.

The patron window provides demographic choices to aid in limiting or expanding the demographics included in a group. For example, it may be desirable to include only female patrons in the group, or only female patrons 50 years old and above.

To choose selection criteria, the following method is used:

Income Range: To limit the selection criteria by income range, select the appropriate range from the drop-down list. Otherwise, leave the Income Range field blank.

Occupation: Include patrons belonging to a specific occupation so they all have something in common. Select an appropriate occupation from the drop-down list. If you do not want to base your criteria on occupation, leave this field blank.

Education—You can include patrons based on education level by selecting the desired education from the drop-down list.

Gender: To base selection criteria on gender, select the appropriate gender from the drop-down list. This field may be left blank.

Patron Type: Select a patron type from the drop-down list to base the selection criteria on this field.

Age: When using age in the selection criteria, first choose a comparison symbol from the drop-down list and fill in the appropriate age. This list includes greater than, less than, or equal to symbols. To invite all patrons over the age of 50, select the greater than symbol (>) from the drop down-list, and enter 50 in the text field to the right.

Marital Status: select a marital type from the drop-down list.

Card Type: to include patron's having a particular card type, select the appropriate type from the drop-down list.

The interests windows on the groups creation form is used to select patrons based on their interests. The left-hand side of the window shows available interests. These available options in the Interests column are pre-set by the System Administrator. The right-hand side of the window displays interests already selected for the invitation criteria.

The EMS 100 accumulates data on patrons' special interests. This data can be used to streamline group invitations, special events, etc., to better target the patron. For example, if a site is hosting a country music concert, then it would probably be undesirable to invite patrons whose musical preference is jazz. However, it would be desirable to specifically target patrons who enjoy country music.

In the example shown above, the criteria type is Music and the sub-types are Julyfest and Concerts. Only those patrons with this interest noted on their patron account will be included in the new group.

To add an interest to the group criteria, the following method is performed:

Select the interest sub-category name from the available interests box on the left side of the form, click the move selected item button.

The interest name will be displayed in the selected interests column in the right side of the form.

Continue the above steps until all necessary Interests have been added.

To remove an interest from the group criteria:

Select the interest sub-category name in the selected interests box on the right-hand side of the window.

Click the remove selected item button. The Interest sub-category will return to the available interests box on the left-hand side of the window.

Continue the above steps until all necessary interests have been removed.

The dates window is used to select those patrons who have a significant date falling within the same time frame as an event. This window may be left blank. The left column of the window displays available anniversary types. The right side displays any anniversary types already selected for the group criteria.

The middle of the form contains arrow buttons to move anniversary types from left to right. The following actions may be performed:

Move All Items—Moves all names under Available Anniversary Types to Selected Anniversary Types.

Move Selected Item—Moves a selected name from Available Anniversary Types to Selected Anniversary Types.

Remove Selected Item—Removes a selected name from Selected Anniversary Types and returns it to Available Anniversary Types.

Remove All Selected Items—Removes all names in the Selected Anniversary Types box and returns them to Available Anniversary Types.

To add an anniversary type to a group, the following method is performed:

Highlight the name of the anniversary type in the Available Anniversary Types box, and Click the Move Selected Item button.

To remove an anniversary type from a group, the following method is performed:

Highlight the name of the anniversary type in the Selected Anniversary Types box, and Click the Remove Selected Item button.

9. Incentives Form

Incentives are an excellent way to encourage your patrons to visit more often, play longer, and increase wagering overall. Incentives can be applied to all patrons or specific patrons, all wagering devices or any number of devices. In a multi-site environment, an incentive can be active at all locations or individual locations.

The incentive form includes a tab system. Each tab further clarifies the rules for eligibility for the incentive. An incentive does not have to include information from all tabs. Some Incentives may use only one or two of these tabs, while others may incorporate information from all areas. The incentive form includes the following tabs:

incentives tab: selection of the incentives tab displays an incentives window in the incentive form. This is the beginning point for creating an incentive. It includes the incentive name, description, and active dates.

game site tab: selection of the game site tab displays a game site window in the incentives form. The game site tab is used to indicate which site(s) the incentive will be active.

geography tab: selection of the geography tab displays a geography window in the incentives form. The geography windows allows patrons from specific geographical locations to be included or limited from the incentive.

devices tab: selection of the devices tab displays a devices window in the incentives form. The devices window determines the devices for which the incentive will be active.

day time tab: selection of the day time tab displays a day/time window which allows an incentive to be limited to certain days of the week or times of the day.

patron tab: selection of the patron tab displays a patron window which allows the incentive to be limited to patrons of certain demographic information or wagering.

dates tab: selection of the dates tab displays a dates window which allows an incentive to be active on special dates, e.g., a patron's birthday or sign-up date.

groups tab: selection of the groups tab displays a group window which enables a user to create an incentive awarding points to a specific group.

events tab: selection of the events tab displays an events window which allows a user to creative an incentive for a special event. Anyone on the invitation list using their players card will receive the extra points. This is a great tool to increase event attendance.

micro-report tab: selection of the micro-report tab displays a micro-report window which provides quick reports on incentives.

Creating an incentive starts with the incentives windows. The EMS 100 automatically assigns an incentive ID when a new incentive is saved. To avoid confusion, each incentive should have a name significant to its purpose. The description field should include important information about the incentive.

To create an incentive the following method is performed:

The incentive ID is assigned by EMS when an incentive is saved.

Enter a name for the incentive that is descriptive enough to identify its purpose.

Enter a more detailed description of the incentive; an explanation of where the incentive is being offered, or the requirements/criteria to be met.

To activate an incentive, click the 'Active' checkbox. If not checked, the incentive is not available to patrons.

Enter the date the incentive starts and ends by typing the date in dd/mm/yyyy format or by using the Calendar Control.

To determine if an incentive is active or inactive, use Edit/Find or CTRL+F to prompt a search window. To display the incentive list, select 'OK'. An entry of 1 in the Active column indicates the incentive is active. An entry of 0 indicates the incentive is inactive. Sort active incentives from inactive incentives by clicking on the Active column.

There are three options for providing point incentives to your patrons. A single option may be selected or any combination of the three may be used together.

The Point Multiplier is the typical way to provide an incentive. For example, if you created an incentive that provided double points for playing any Double Bonus Poker machine, the point multiplier entered would be 2.0. The Point Multiplier cannot be greater than 999.9, EMS will not allow a multiplier above 999.9. Incentive points are accumulated as the patron plays the machine throughout the duration of the incentive.

The Comp Point Multiplier provides Comp points as part of an incentive. Comp points, by their nature, are provided to compensate a patron in ways such as discounted or free hotel rooms, dinners, etc. These points are separate from the regular points a patron earns and redeems. Patrons are not informed of the number of comp points that have been accumulated. However, the information can be invaluable to your site. The EMS system 100 provides a means of tracking a patron's comp points, rather than using guesswork to determine which patrons should be compensated. The Comp Point Multiplier cannot be greater than 999.9, EMS will not allow a multiplier above 999.9.

Bonus points are used to provide a one-time bonus as an incentive rather than using a point multiplier for play. For example, bonus points may be used to encourage patrons to come to your site on Super Bowl Sunday. The first time a patron puts their card in a machine or plays a table using their card on that day, the bonus will be applied. Bonus Points cannot be greater than 9.9, EMS will not allow you to save any number above 9.9.

The game site window is used when an incentive is to be restricted by location. In a multi-site environment, an incentive is active at all locations unless the game site tab lists participating sites. Available locations are listed on the left of the game site window. Sites participating in the incentive are on the right. If no participating sites are listed, the incentive would be active at ALL sites.

The middle of the window contains the following arrow buttons which move game site names left to right:

Move All Items: Moves all names under Available Game Sites to the Selected Game Sites box.

Move Selected Item: Moves the selected name under Available Game Sites to the Selected Game Sites box.

Remove Selected Item: Removes the selected name from the Selected Game Sites box and returns it to the Available Game Sites box.

Remove All Selected Items: Removes all names in the Selected Game Sites box and returns them to the Available Game Sites box.

To restrict an incentive by game site, the following method is followed:

Highlight the game site name (under Available Game Sites) that will be participating in the incentive.

Click Move Selected Item to add the game site to the list of Selected Game Sites.

Repeat the above steps to add additional sites.

To remove a game site from an incentive, the following method is followed:

Highlight the game site name (under Selected Game Sites) that will NOT be participating in the incentive, Click Remove Selected Item to remove the game site from the list of Selected Game Sites.

Repeat the above steps to remove any additional sites.

Be sure to save all changes to the form using the CTRL+S hotkeys or the EDIT/UPDATE option located in the top menu.

The geography window on the incentives form provides the ability to restrict an incentive to patrons from specific countries, states, cities, or postal codes. Use this tab ONLY if you want to add geographical constraints to the incentive. If there are no postal codes listed under Postal Codes for this incentive, the incentive would have no geographical restrictions.

The following buttons are used to add/remove postal codes from an incentive:

Move Selected Item: Moves a selected item to the Selected Postal Codes column.

Remove Selected Item: removes a selected item from the Selected Postal Codes column.

Remove All Selected Items: removes all items from the Selected Postal Codes column.

To limit an incentive by country, the following method is performed:

Select the country to include in the incentive from the drop-down list.

Click the Move Selected Item button.

To limit an incentive by state, the following method is performed:

Select the country to include in the incentive from the drop-down list.

Select the State from the drop-down list.

Click the Move Selected Item button.

To limit an incentive by city, the following method is followed:

Select the Country to include in the incentive from the drop-down list.

Select the State from the drop-down list.

Select the City from the drop-down list.

Click the Move Selected Item button.

To limit an incentive by postal code, the following method is performed:

Select the country to include in the incentive from the drop-down list.

Select the State from the drop-down list.

Select the City from the drop-down list.

Select the Postal Code from the drop-down list.

Click the Move Selected Item button.

NOTE: Multiple postal codes may be added to an incentive as can cities, states and countries. After selecting down to the state and city level, select a postal code and move it to the right. Click on the postal code field again and make another selection. Continue selecting the required postal codes.

The devices window enables the user to provide incentives down to the game level on a machine or table. The devices tab can also be used to create incentives to increase play based on location of the devices or on a particular game.

There are three different ways to create an incentive based on devices:

Build an incentive based on the manufacturer of a device.

Create an incentive based on the Game Site location.

Create an incentive based on a game.

The left side of the devices window is used to select the method for the incentive. The right side displays the devices selected for the incentive.

Manufacturer based incentives let you create incentives on all machines by a particular manufacturer, any model made by a manufacturer, a particular game on a model, or an individual device.

To create a manufacturer based incentive the following method is performed:

From a drop-down list, select the manufacturer on which to base the incentive. If you want to include all devices by the manufacturer, click the Add Item button.

To create an incentive on a specific model by a manufacturer, select the model from the drop-down list. If you want to include all devices of this model, click the Add Item button .

To create an incentive on a specific device by a manufacturer, select the device from the drop-down list. If you want to include all devices by the manufacturer, click the Add Item button.

Game Site based incentives let you create incentives on all machines at a particular site, within a Game Zone, a Game Bank, or on an individual device. To create an incentive based on game site, the following method is performed:

Select the Game Site on which to base the incentive. To include all devices at the Game Site, click the Add Item button to the right.

Most casino floors are divided into zones. To create an incentive on a specific zone within a site, select the game zone from the drop-down list. To include all devices within the zone, click the Add Item button.

Zones are typically further divided into banks of machines. To create an incentive by bank, select the game bank from the drop-down list. To include all devices in the game bank, click the Add Item button.

To select an individual device within a game bank, select the device from the drop-down list. To add the device, click the Add Item button.

Incentives can be created on all machines playing a particular game, or a specific device playing a particular game. To create an incentive based on a game, the following method is performed:

Select a game to base the incentive on. To include all devices playing the selected game, click the Add Item button to the right.

To select a specific device playing the selected game, choose the device from the drop-down list. To add the device, click the Add Item button.

If a device has been added to an incentive in error, you can remove the device by following the steps below:

Highlight the device in the Selected Devices box on the right-hand side of the window, and Click the Remove One Button.

WHEN THE SLOT DEPARTMENT AND ACCOUNTING DO A MACHINE CONVERSION, MARKETING MUST RECEIVE A LIST OF MACHINES THAT HAVE BEEN MADE INACTIVE AND A LIST OF THE NEW MACHINE NUMBERS PLACED ON THE FLOOR. THE OLD MACHINE NUMBERS SHOULD BE REMOVED FROM EXISTING INCENTIVES AND THE NEW NUMBERS NEED TO BE ADDED. IF NEW MACHINE NUMBERS ARE NOT ADDED TO INCENTIVES, THEY WILL NOT BE INCLUDED IN ANY POINT BONUSING OTHER THAN WHAT HAS BEEN SETUP IN SLOT MAINTENANCE.

To remove all devices from an incentive, click the Remove All button.

The Day/Time window of the incentives form enables the user to limit incentives to specific days of the week and times during the day. This can be a useful tool to encourage patrons to visit a site during non-peak times and less active days. As with all tabs under incentives, this may be left blank.

To limit an incentive by day and time, the following method is performed:

Select the day the incentive will be active from the drop-down list.

Start Time (HH:MM)—Time is entered in a 24-hour format. Use the drop-down lists at the right of the hour and minute fields to change the time. If a start time is first thing in the morning, the hour is 0 (military for 12 a.m.) and the minutes are 0.

End Time (HH:MM)—Time is entered in 24-hour format. Use the drop-down list to the right of the hour and minute fields to change the time. If the incentive ends at midnight, the end hour is 23 (military for 11 p.m.) and the minutes are 45. The 45 minutes flag tells the system the incentive runs for the completion of the hour because the increment is 45-60.

To add additional days or times, repeat the above steps.

The Modified On and Modified By fields are read-only and cannot be changed. EMS records the date and time a record is saved. EMS also records the user ID responsible for the change.

The patron window of the incentives form provides the ability to create an incentive based on patron demographic and/or wagering information. Some possible uses for the patron tab might be as follows:

Encourage your senior patrons to visit by creating an incentive based on age.

Plan a "Ladies Day" by creating an incentive based on gender.

Encourage patrons whose total wager is less than a certain dollar amount to increase their play.

Creating an Incentive Based on Patron Information

Multiple criteria can be selected from the information below. This window may be left blank. To make selections per field, click on the down arrow to the right of each field to activate its drop-down list.

Patrons can be selected on the following criteria:

Income Range: Select an income range from the drop-down list to limit the incentive to those patrons falling within a specific income range.

Occupation: Select an occupation from the drop-down list to limit the incentive to patrons of a certain occupation.

Education: To limit an incentive to a particular education level, make a selection from the drop-down list.

Gender: To create an incentive based on gender, make a selection from the drop-down list.

Patron Type: Select a patron type from the drop-down list.

Age: Create an incentive based on a patron's age, such as a Senior Citizen's Night. Two fields must be completed when using age as the criteria. First, choose less than (<), greater than (>), or equal to (=) from the drop-down list. Then enter the age in the field to the right.

Marital Status: Basing an incentive on marital status is accomplished by selecting a marital status from the drop-down list. (Marital status could apply when having a 'singles' night).

Card Type: To limit the incentive to the type of patron card, select the card type from the drop-down list.

Avg. Wager: If you wish to encourage patrons whose overall average wager is less than or greater than a specific amount, use the Avg. Wager field. Select the comparison operator (less than or greater than) from the drop-down list and enter the average wager amount from which the comparison should be made.

Total Wager to Date: This field can be used to encourage patrons whose total wagered dollars is less than or greater than a certain amount. Select the comparison operator (less than or greater than) from the drop-down list and enter the total wager to date amount from which the comparison should be made.

Lifetime Points: You can use the Lifetime Points information to encourage players based on the number of points they have earned to date. Select the comparison operator (less than or greater than) from the drop-down list. Next enter the point amount from which to compare.

Current Points: Current points represent the total number of points each patron has in their account at the time the incentive is created. To base an incentive on current points, select the comparison operator (less than or greater than) from the drop-down list. Then enter the point amount on which to compare.

Select the Edit/Update option from top menu option or use CTRL+S to save your selections. If none of the criteria in the above fields applies to how you are configuring this incentive, do not use this form.

The dates window on the incentive form gives the ability to design an incentive that will reward patrons on special dates such as their birthday or sign-up date. The left side of the dates windows shows all available anniversary types. The right side displays any anniversary types that have been selected for the incentive.

The middle of the form contains the following arrow buttons used to move anniversary types left to right:

Move All Items: Moves all names under Available Anniversary Types to the Selected Anniversary Types box.

Move Selected Item: Moves a selected name from Available Anniversary Types to the Selected Anniversary Types column.

Remove Selected Item: Removes a selected name from Selected Anniversary Types and returns it to the Available Anniversary Types column.

Remove All Selected Items: Removes all names in the Selected Anniversary Types column and returns them to the Available Anniversary Types column.

To add an anniversary type to an incentive, the following method is performed:

highlight the name of the anniversary type in the Available Anniversary Types box, and Click the Move Selected Item button.

To removing an anniversary type from an incentive, the following method is performed:

Highlight the name of the anniversary type in the Selected Anniversary Types box, and Click the Remove Selected Item button.

The groups window of the incentives form allows a user to create an incentive for just a specific group to include a specific group as part of the criteria of an existing incentive. Multiple groups may be selected per incentive. (Create groups using Groups or Group Setup in Marketing).To select a group name, highlight it in the list and use the arrow buttons as described below:

Move All Items: Moves all names from the Available Groups column to the Selected Groups column.

Move Selected Item: Moves a selected name from Available Groups column to the Selected Groups column.

Remove Selected Item: Removes a selected name from the Selected Groups column and returns it to the Available Groups column.

Remove All Selected Items—Removes all names in the Selected Groups column and returns them to the Available Groups column.

The events window in the incentives form allows a user to select an event name to include in the criteria for a point incentive. Multiple options enable the user to determine what group of patrons attached to a selected event is actually awarded the points (described below). Multiple events may be added to the incentive.

Event Name—Select an event name from the drop-down list.

Patron Invited—Do you wish to award incentive points to patrons who are included on a mailing list produced by using the Invitations form in Marketing? If so, click on the checkbox.

Patron Attended—To award points on an attendance basis only, click on the checkbox. When invited patrons use their players card during an event and their name is attached to the event through the list created from the Invitation form, the system automatically marks them as having attended. One or both of the options must be selected The user has the ability to include one or more event names in an incentive. If marketing is running a special event for two or more groups simultaneously and they want to award bonus points to the everyone on the invitation lists of those events, this will accomplish that.

ADD: Clicking the ADD button prompts a second blank event field from which to choose an additional event name (as seen below).

REMOVE: Clicking the Remove button will remove a selected event name from the list.

NOTE: Depending upon the event and the marketing plan, you do not have to select the same patron options (Patron Invited/Attended) for the second event name as you did the first. Each event selection on the above form is unique to it's own parameters. Be sure to save changes by using the Edit/Update command or CTRL+F hotkeys.

10. Invitations Form

Figure 46:
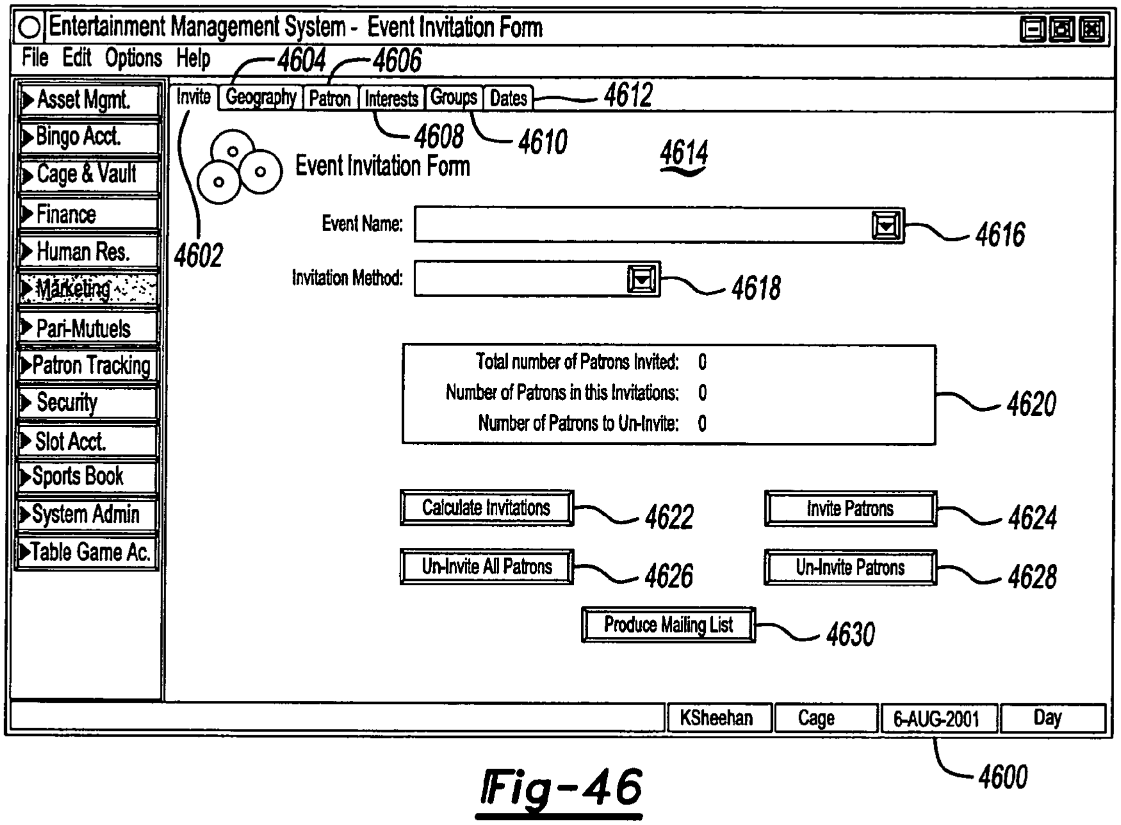

With reference to FIGS. 22 and 46, when the invitations form icon under the marketing group icon 1506F of the switchboard is selected, an invitations form 4600 is displayed. The invitations form 4600 in the marketing module is used to generate a patron list to be used in mailers in the form of letters, invitations, labels, etc. The invitations form 4600 has a tab format with an invite tab 4602, a geography tab 4604, a patron tab 4606, an interests tab 4608, a groups tab 4610, and a dates tab 4612.

Selection of the invite tab 4602 displays an invite window 4614 on the invitations form 4600. The invite window 4614 is used to select the event for which the invitations are created, calculate and invite patrons and produce the file to be used with a word processing program.

The invite window 4614 is used to calculate and create invitation lists for events at your site. The invite window 4614 includes an event name drop down list 4616, an invitation method drop down list 4618, an information box 4620, a calculate invitations button 4622, an invite patrons button 4624, an uninvite all patrons button 4626, an uninvite patrons button 4628, and a produce mailing list button 4630.

The event name drop down list 4616 is used to select the event for which an invitation is being created. Event names used for the invitation list must already have been set up using the events form of the marketing module. The invitation method drop down list 4618 is used to select the method for sending the invitations. In one embodiment, there are three methods from which to choose—Direct Mail, Email or Phone.

The direct mail option creates a file which to use with a word processing program, such as Microsoft Word, to generate invitation letters, mailing labels, etc. The direct Email option generates a file containing the e-mail addresses. This is especially useful when the event is in the very near future and direct mail would be too slow. The phone call option creates a file containing the patron's telephone numbers which can be used to make personal invitations via phone.

NOTE: The above information is available only if the 'Preferred' field is selected on the mail, email and phone tabs of the patron form. If not, EMS will not recognize this information as valid for marketing purposes.

The event invitation form 4600 is used to select the patrons as well as the invitation method. The calculation buttons above calculate and recalculate an invitation list. To set up the demographics for the invitation lists the geography window is used. To invite patrons based on patron demographic information, the patron window is used. To select invitees based on their interests, the interests window is used. To invite groups of patrons, the groups window is used. The dates window is used to invite patrons whose important dates, such as birth date or sign update, fall within the time frame of the event.

Once all the desired criteria are set (see below), the buttons 4622,4624, 4626,4628 are used to calculate and create the invitation lists. Using the selected criteria, the system 100 will check patron records and determine how many people will be included in the invitation and display the results in the information box 4620. Based on the calculations, the list may be further limited or expanded and calculated again.

The invite patrons button 4624 is used to finalize the calculation. When the final head count satisfies the projected attendance needs for your event, activating this button 4624 marks the patron account as invited. The uninvite all patrons button 4626 is used to bring the 'Total Number Invited Patrons' field back to zero. This is especially useful if you decide to completely modify the selection criteria.

The uninvite patrons button 4628 removes patrons invited during the last calculation.

The produce mailing list button 4630 generates a comma delimited file to use with word processing software (i.e. MS Word) with mail merge capabilities. Always save this as a text (.txt) file. When the direct mail option is selected as the invitation method, the following fields will be output to the mailing list file: Event Name, Salutation, Last Name, First Name, Generation, Patron ID, Address1, Address2, City, State, Country Code, Postal Code. When the phone call option is selected, the following fields will be output to the mailing list file: Event Name, Salutation, Last Name, First Name, Generation, Phone Number, Extension, Patron ID. When the direct e-mail is selected, the following fields are output to the mailing list file: Event Name, Salutation, Last Name, First Name, Generation, Patron ID, e-mail Address.

Figure 47:
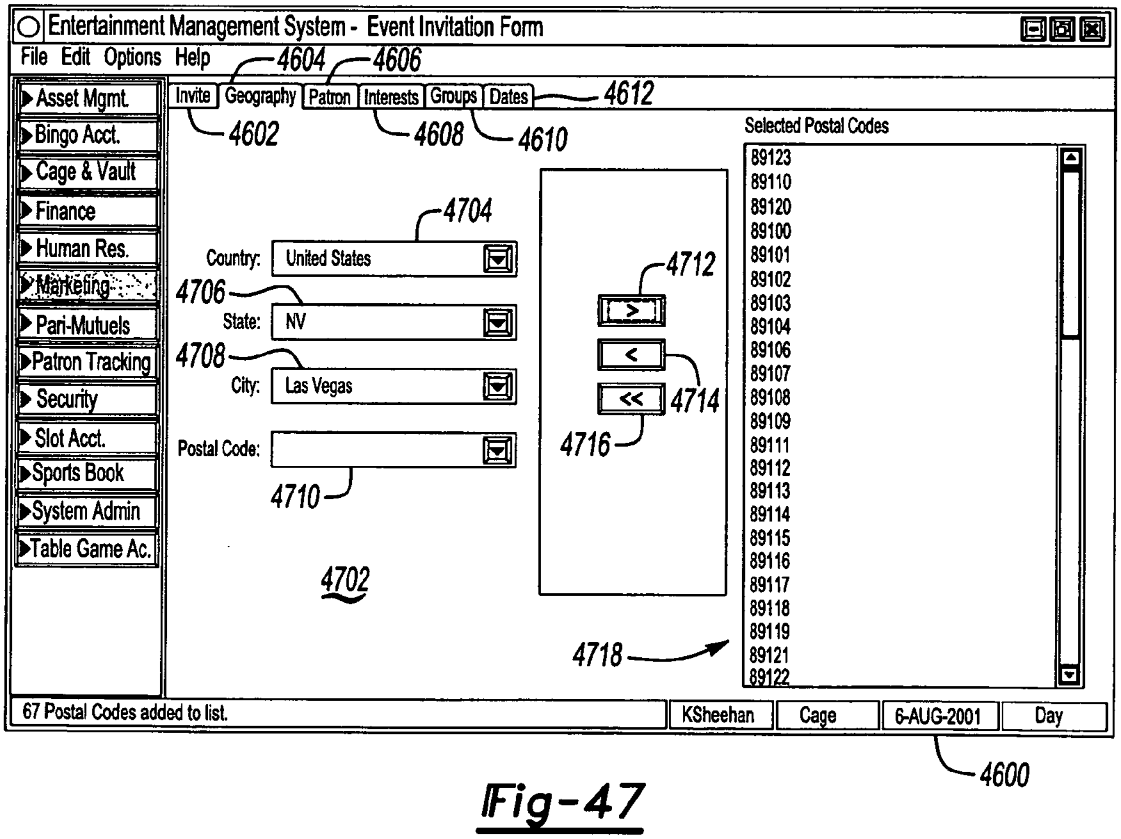

With reference to FIG. 47, with the geography tab 4604 selected, a geography window 4702 is displayed in the event invitations form 4600. The geography window 4702 enables the user to select patrons based on the geographical criteria.

The geography window 4702 includes a country drop down list 4704, a state drop down list 4706, a city drop down list 4708. and a postal code drop down list 4710. The geography window 4702 also includes a right arrow button 4712, a left arrow button 4714, a remove all button 4716, and a selected postal codes list 4718.

The geographic criteria is limited by the drop down lists 4704,4706,4708,4710. Once these have been selected, the corresponding postal codes can be added to the selected postal codes lists 4718 by selection of the right arrow button 4712. Selected postal codes can be removed from the list 4718 by clicking on the left arrow button 4714. All postal codes in the list 4718 can be removed by clicking on the remove all button 4716.

To include zip codes for an entire state in your criteria, leave the City and Postal Code fields blank.

Figure 48:
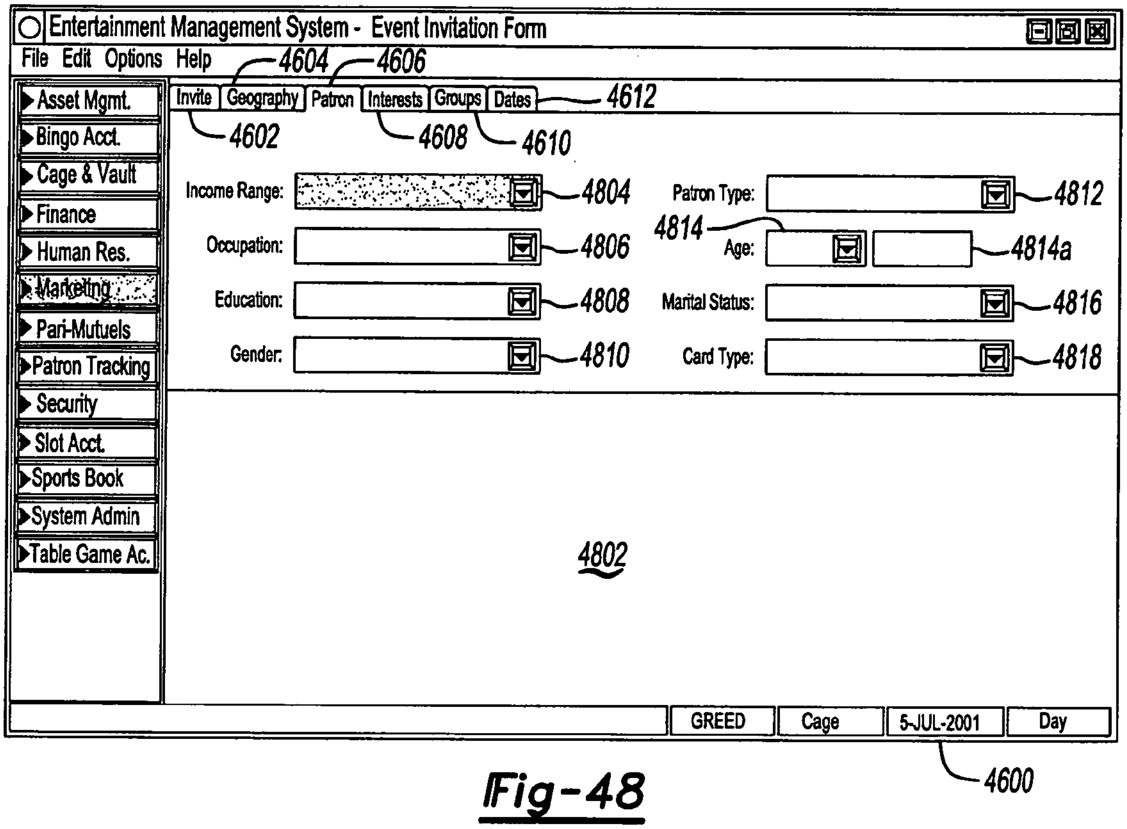

With reference to FIG. 48, with the patron tab 4606 selected, a patron window 4802 is displayed in the event invitations form 4600. The patron window 4802 enables the user to select patrons based on the demographic information. The patron window 4802 includes an income range drop down list 4804, an occupation drop down list 4806, an education drop down list 4808, a gender drop down list 4810, a patron type drop down list 4812, an age drop down list 4814, a marital status drop down list 4816, and a card type drop down list 4818. The drop down lists 4804, 4806, 4808, 4810, 4812, 4814, 4816, 4818 are used to define the demographics of the patrons to be included on the invitation. A relationship drop down list 4814A is provided with the following options: greater than, less than, or equal to symbols. The relationship drop down list 4814A is used with the age drop down list 4814.

Figure 49:
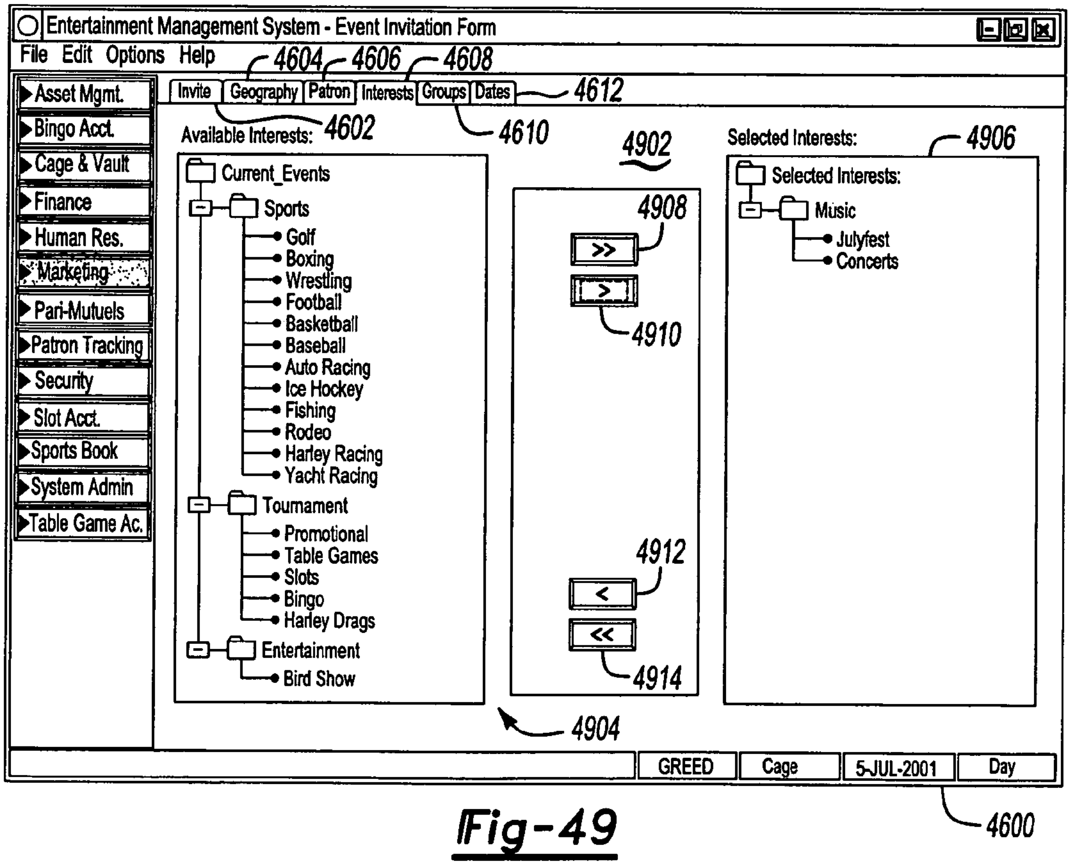

With reference to FIG. 49, with the interests tab 4608 selected, an interests window 4902 is displayed in the event invitations form 4600. The EMS 100 has the ability to accumulate data on patron accounts related to their personal interests. The interests window 4902 can be used to streamline the invitation process for better target marketing using the patron interests data. For example, if a site is hosting a country music concert, patrons whose musical preference falls within the jazz category should not be invited. However, it would be desirable to specifically target patrons who enjoy country music.

The interests window 4902 includes an available interests list 4904, a selected interests list 4906, a move all interests button 4908, a move selected interests button 4910, a remove selected interests button 4912, and a remove all interests button 4914.

The interests window 4902 is used to select patrons based on their interests. The interests available in the available interests list 4904 are set up by the System Administrator. To move selected interests in the available interests list 4904, the move selected interests button 4910 is used. To move all available interests in the list 4904 to the selected interests list 4906, the move all available interests button 4908 button is used. Interests selected (highlighted) in the selected interests list 4906 may be removed by the remove selected interests button 4912. All items in the selected interests list 4906 may be removed by the remove all interests button 4914.

Figure 50:
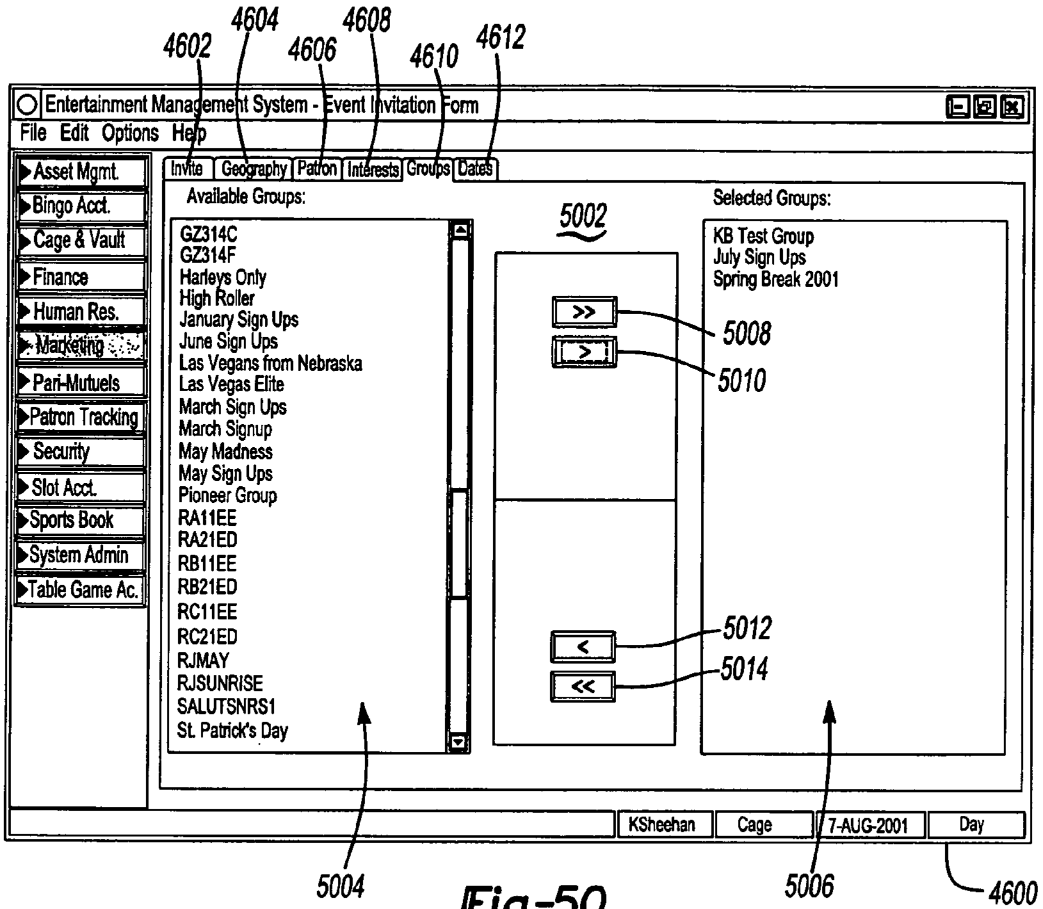

With reference to FIG. 50, with the groups tab 4610 selected, a groups window 5002 is displayed in the event invitations form 4600. The groups window 5002 enables the user to select groups of patrons for inclusion on the invitations.

The groups window 5002 includes an available groups list 5004, a selected groups list 5006, a move all groups button 5008, a move selected groups button 5010, a remove groups interests button 5012, and a remove all groups button 5014.

The groups window 5002 is used to select groups of patrons based on their interests. The groups available in the available groups list 5004 are set up in the marketing module, group setup form. To move selected groups in the available interests list 5004, the move selected groups button 5010 is used. To move all available groups in the list 5004 to the selected groups list 5006, the move all available groups button 5008 button is used. Groups selected (highlighted) in the selected groups list 5006 may be removed by the remove selected groups button 5012. All items in the selected groups list 5006 may be removed by the remove all groups button 5014.

Figure 51:
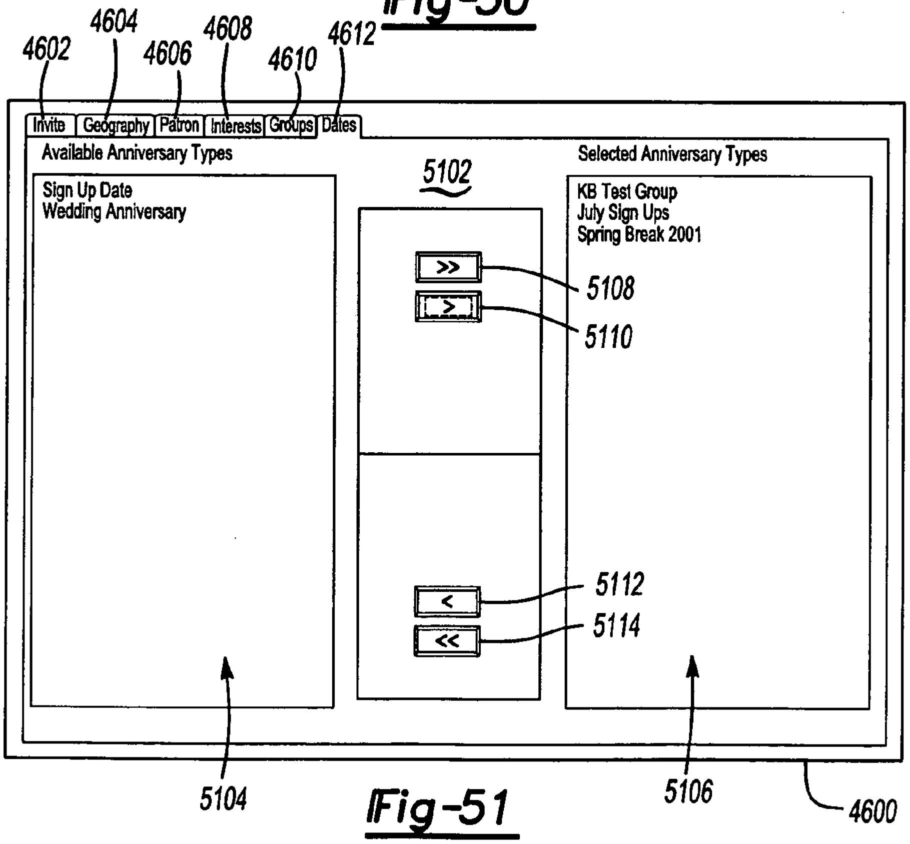

With reference to FIG. 51, with the dates tab 4612 selected, a dates window 5102 is displayed in the event invitations form 4600. The dates window 5102 provides a means of targeting those patrons whose special dates (birthday, anniversary, sign-up date) fall within the time frame of an event.

The dates window 5102 includes an available anniversary types list 5104, a selected anniversary types list 5106, a move all anniversary types button 5108, a move selected anniversary types button 5110, a remove anniversary types button 5112, and a remove all anniversary types button 5114.

To move selected anniversary types in the available anniversary types list 5104, the move selected anniversary types button 5110 is used. To move all available anniversary types in the list 5104 to.the selected anniversary types list 5106, the move all available anniversary types button 5108 button is used. Anniversary types selected (highlighted) in the selected anniversary types list 5106 may be removed by the remove selected anniversary types button 5112. All items in the selected anniversary types list 5106 may be removed by the remove all anniversary types button 5114.

11. Mailing Lists Form

Figure 52:
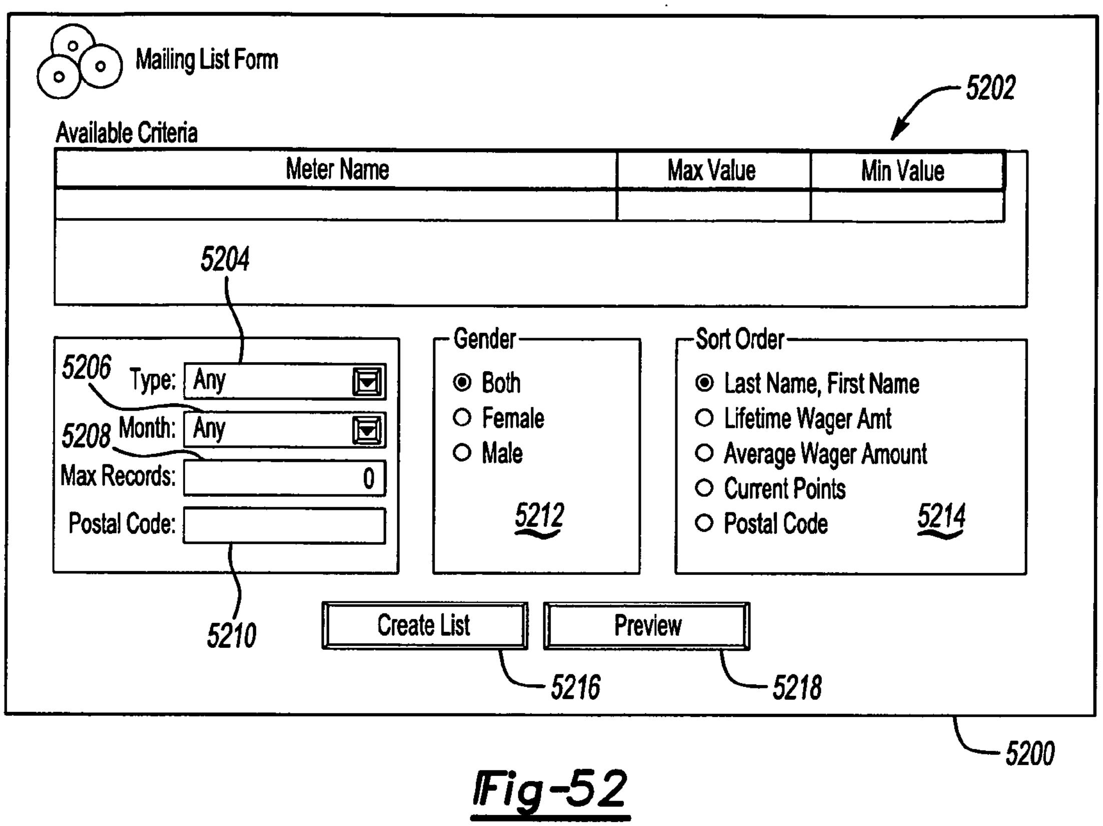

With reference to FIGS. 22 and 52, when the mailing list form is selected under marketing switchboard group 1506F, a mailing list form 5200 is displayed. The mailing list form 5200 is provided for the Marketing Department to generate mailing lists for birthdays, anniversaries, or the patron sign-up date. The process creates a comma delimited file which can be used with Microsoft Word or other word processing packages. This file becomes the data source for a mail merge document to create letters, mailing labels, etc.

The mailing list form 5200 includes an available criteria list 5202, a type drop down list 5204, a month drop down list 5206, a max records entry box 5208, a postal code entry box 5210, a gender selection box 5212, a sort order selection box 5214, a create list button 5216, and a preview button 5218.

The mailing list form 5200 provides methods of selecting groups of patrons. The drop down lists 5204, 5206 and the entry boxes 5208, 5210 can be used to create meters with input maximum and minimum amounts. The gender selection area 5212 allows the user to select a specific gender. The sort order selection box 5214 allows the user to select a sort order. Any combination of these selections can also be used to generate the file.

A preview of the mailing list can be viewed by selecting the preview button 5218. A File Save dialog (not shown) is displayed to save the mailing list when the create list button 5216 is selected.

NOTE: Files created for birthday, anniversary and sign-up dates should always be dated by year and should not be reused. From the time the Sept 2001 file was created and the next time you do a mailer of this type, you'll need a new file. Your patron database will have many new patrons as well as inactive patrons.

The fields are output to the above file and the list below represents their order. Any number of fields can be used in any order in a mail merge document.

| | |
|---|---|
| Patron ID | Address Type |
| Last Name | Suburb |
| First Name | District |
| Address 1 | Province |
| Address 2 | County |
| City | Other Postal Code |
| State | Plain Wrapper |
| Country | Point Balance |
| Postal Code | Average Wager |

If the criteria you have chosen has more patrons included than you would like, your criteria can be changed before you create the labels. The preview will list the patron last and first name, id number, postal code, current points, and the patrons average wager. You can also print this list by clicking on the print option while in this preview. If at any time a preview list does not provide the data you were looking for, start again with a different criteria. Saved the new .txt file(s) with a different name for comparison to the original file. This can be done until you have a list that suits your needs. Delete the files you will not be using in order to save space and more importantly so they are not used in error.

12. Point Caps Form—from Fax

13. Point Management Form

Figure 53:
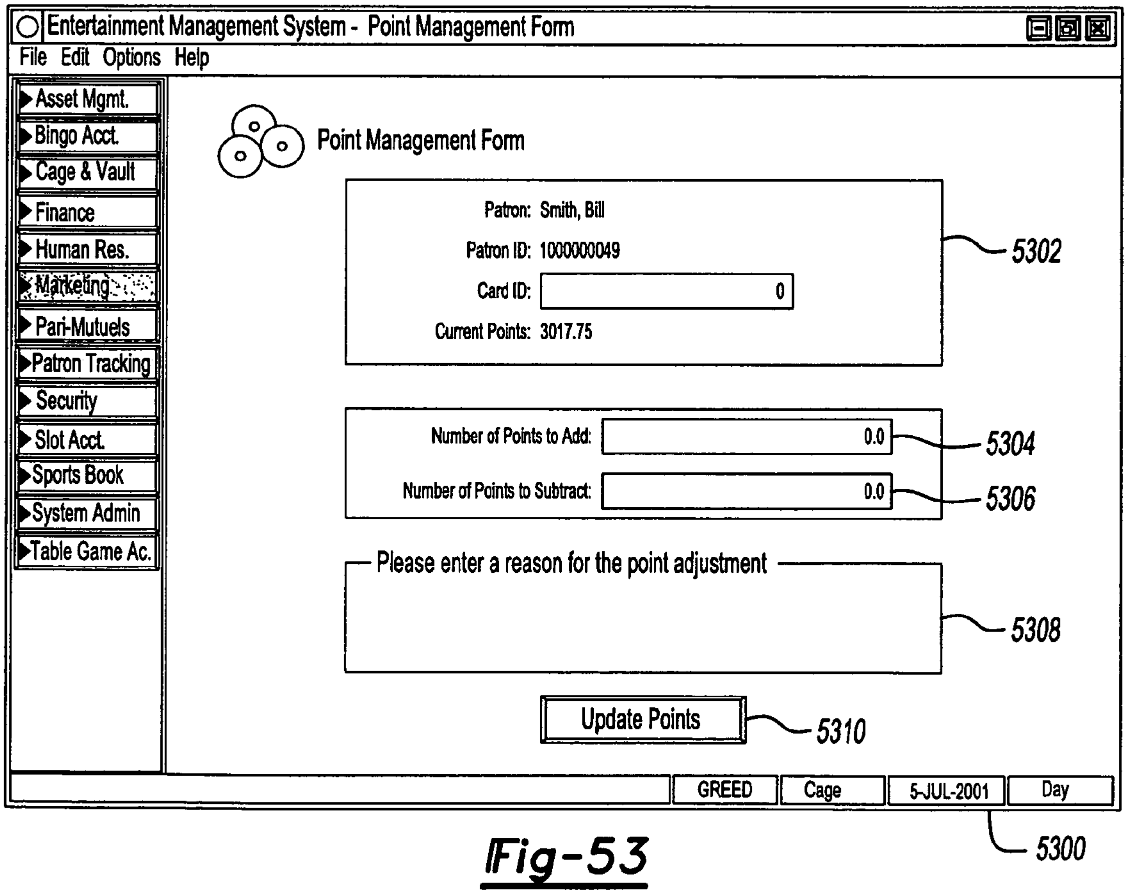

With reference to FIG. 53, the point management form 5300 is used when a patron's earned slot points need to be modified either by adding or subtracting points from a patron's account. The patron account to be modified must be located using the Edit/Find function from the top menu or the keyboard shortcut CTRL+F (see above). Additional ways to locate the account could be a card swipe (patron card) or by entering the card id #.

The point management form 5300 includes a patron identification section 5302, a number of points to add entry box 5304, a number of points to subtract entry box 5306, a reason for adjustment entry box 5308, and an update points button 5310. After the patron account has been located or input, the patron identification section 5302 displays the patron's name, ID, Card ID, and current slot points.

To add points, the amount must be entered in the number of points to add entry box 5304. To subtract points, the amount must be entered in the number of points to subtract entry box 5306. A reason for the adjustment must be entered in the reason for adjustment entry box 5308. This is mandatory. The update points button 5310 is used to save the adjustment.

All adjustments appear in the Point Adjustment reports and display the user name, time and date of the adjustment.

14. Random Draw Form

The random draw form is used to select a patron account based on the criteria below. A random draw is usually performed as a means of awarding a patron slot points, comps, free slot play, etc. as a reward. When using the Perform Draw button, the names appear in no specific order and are based only on the options available on the form.

Definitions

Draw from All Active Patrons—This displays all patrons with an active account.

Draw From Patrons Who Have an Open Rating (playing)—This draw displays all patrons who are playing on the floor at this time.

Draw From Patrons Who Have Played This Month—This selection displays patrons who have played at a particular site this month.

To perform a random draw, the following method is performed:

Choose one of the above options

After selecting an option, click the Perform Draw button.

After the perform draw button has been selected, a patron's account is displayed. The next patron may be viewed by clicking on the Perform Draw button again. This can be continued until you have viewed all of the chosen patrons.

If no patron names are produced after selecting the Perform Draw button, an EMS broadcast message appears at the footer of the form. Select another option and Perform Draw again.

The micro-reports window provides micro-reports on incentives. Micro-reports are available for viewing only when viewing a specific incentive record. If you select Marketing, then the Incentive form and select the Micro-report tab without first locating a particular incentive, the report will be blank. Micro-reports provide a quick means of getting information about a particular incentive. Micro-reports can be viewed on screen or printed by clicking on the 'Print' button in the upper right of the form. The current Incentive micro-reports include:

Incentive Cost History (30 Days, 90 Days, and Lifetime): This report provides a cost history (by points) by day for the incentive currently being viewed. You may select from one of the three report options seen below. These reports provide a listing of each day the incentive has been active and the number of points, bonus points, and comp points that were given to patrons per the incentive.

If the multiplier on an incentive was for points only, this is the only column that will appear on the report. For each multiplier applied to an incentive, a column will appear on the micro-report. Below is a sample micro-report reflecting slot points, the dates and total to date.

Use the drop-down arrow to select which report you wish to view. Note that the form reflects the report name, incentive ID and name. All of these items appear on the printed copy as well.

Keep in mind these reports are quick reports generated in real-time; the data changes as play attached to this incentive progresses. You cannot pull a micro-report of this nature, go back to review it and expect to find the same results.

15. Tour Operator Form

Figure 55:
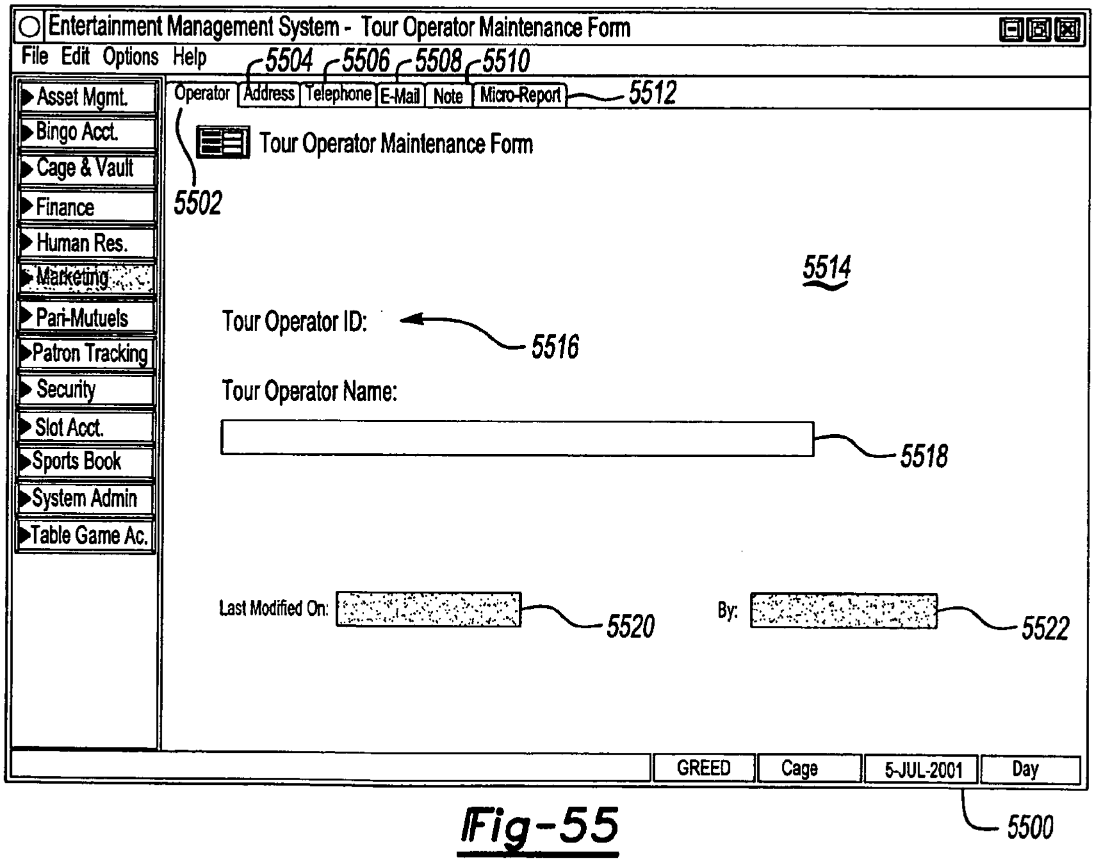

With reference to FIG. 55, the tour operator form 5500 is used to generate upcoming tours for a site(s). The tour operator form 5500 utilizes a tab control similar to the other EMS forms. The form 5500 includes the following tabs:

- Operator: selection of the operator tab displays an operator window on the form 5500. The operator window is used to enter the name of the tour that is visiting your site(s).
- Address: selection of the address tab displays an address window on the form 5500. The address window permits multiple addresses for the different tours.
- Telephone: selection of the telephone tab displays a telephone window on the form 5500. The telephone window allows the user to enter the telephone number of the tour operator.
- E-Mail: selection of the E-Mail tab displays an email window on the form 5500 for entering the e-mail address of the tour operator.
- Note: selection of the note tab displays a note window on the form 5500. The note window allows the user to keep important notes about the tour.
- Micro-Report: selection of the micro-report tab displays a micro-report window on the form 5500 which provides quick reports on a tour.

The operator window 5514 includes a tour ID field 5516, a tour operator name entry box 5518, a last modified on field 5520 and a by field 5522. The operator window collects the information about the tour that will be visiting a site. The tour operator name entry box is used to enter the name of a tour that will be visiting the site. The entered name will appear on marketing reports After entering a tour operator name, save it using the keyboard shortcut CTRL+S or the Edit/Update function from the top menu.

When the address tab 5504 is selected, an address window is displayed (see above). The EMS 100 permits multiple addresses for each tour operator.

When the telephone tab 5506 is selected, a telephone window is displayed (see above). As with addresses, the EMS 100 permits multiple telephone numbers.

When the email tab 5508 is selected, an email address window is displayed (see above). Multiple e-mail addresses may be entered to accommodate for different contacts of the tour operator.

Selection of the note tab 5510 displays a note window (not shown) for entry/display of notes relative to the current tour operator (see above). Notes are permanent in nature and cannot be deleted.

Selection of the micro-report tab 5512 displays a micro-report window (not shown) for quick reports for tours.

The Last Modified On and By fields 5520, 5522 are read only and cannot be edited. The EMS 100 tracks all changes by recording the date and time of the last change as well as the user name making the change.

16. Tours Form

The tours form is used to set up tours visiting a site(s). The tours form allows a user to select the tour operator, and enter a tour name, start and end date, and number of cards needed for the tour. There is no limit as to how many tours may be setup per operator. As a tour operator may visit your property multiple times with different groups, each visit can be setup with a new name under the name of the operator. To set up a tour the following process is followed:

- click on a drop-down list on the right side of the form to choose the tour operator,
- Enter the tour name that will be visiting the site(s).
- Enter the start date by typing in the date in dd/mm/yyyy format or by using the calendar control,
- Enter the end date by typing in the date in dd/mmm/yyyy format or by using the calendar control,
- Enter the number of cards that will be needed for this tour. NOTE—Cards generated from this form are to be treated as temporary. Temporary cards are only good until midnight of the day they were created. Each card will have the tour name and a corresponding account in the system. After the patron has earned points using the card, locate the temporary account by using the card ID number. If the patron wishes to keep the card and its activity, and become a club member edit the account name from the tour name to the patron name.

When all the fields have been completed, choose the Create Tour button to print the temporary patron cards.

17. Voucher Status Form

Figure 54:
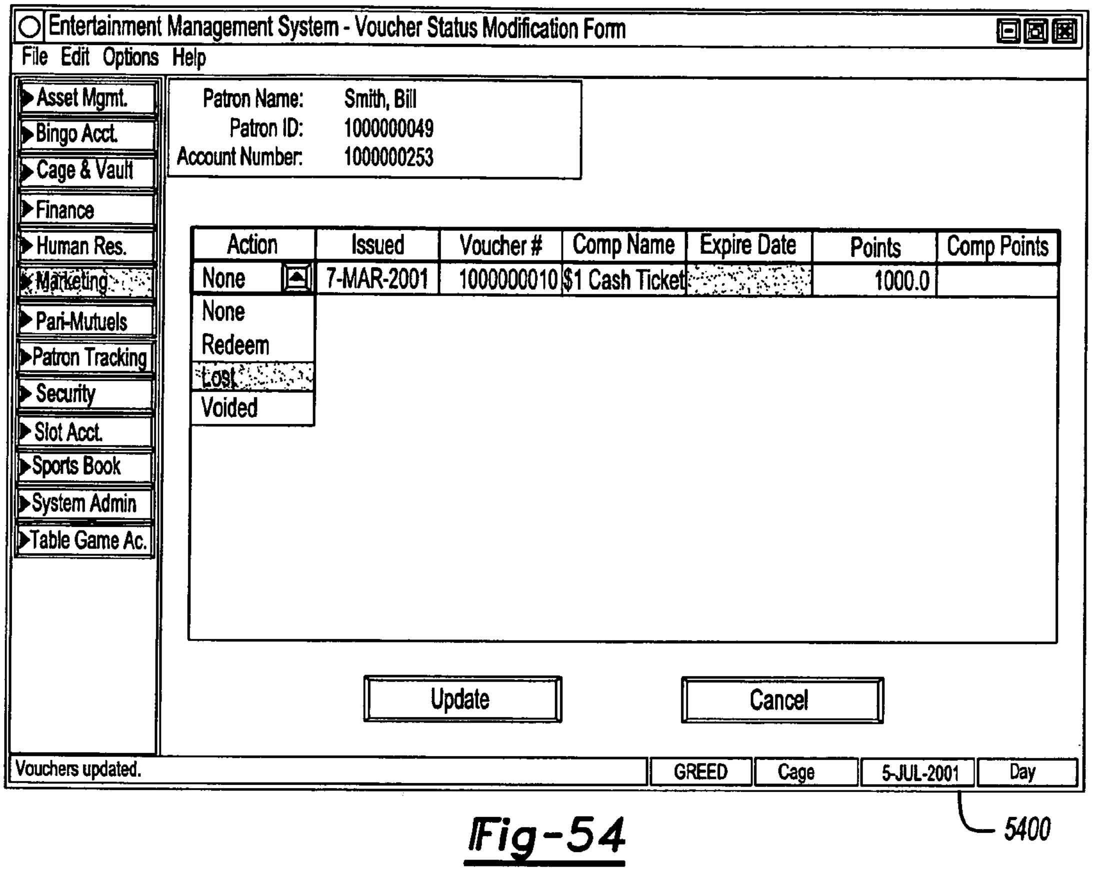

With reference to FIG. 54, the voucher status form 5400 is used to check the status of existing vouchers or to update a status by marking a voucher as having been redeemed, lost, or voided. To look up the status of a patron's vouchers, the patron account must first be located using the Edit/Find function from the top menu, or the keyboard shortcut CTRL+F. An account can also be located by swiping the patrons card. The Voucher Status form displays open vouchers for the selected patron.

In the example shown in FIG. 54, one open voucher is shown. As a patron redeems a voucher or claims a voucher as lost, the voucher status form 5400 is used to denote the action taken for a specific voucher. For example, Voucher #1000000010 has been lost and is being marked as such by selecting the appropriate choice from the Action drop-down list.

To mark a voucher as redeemed, lost, or voided, the following method is used:

Use Find (from the Edit top menu CTRL+F, or by swiping the patron card) to locate the patron.

Locate the Voucher Number in the list shown.

Select the appropriate action from the drop-down list.

Click the Update button located at the bottom of the window. Once updated, the voucher will no longer be displayed in the list. Lost and Voided vouchers points are returned to the patron account. Expired vouchers will be displayed in RED in the Expire Date field.

If the wrong voucher is accidentally marked, click the Cancel button before selecting Update. This will return the Action to None.

18. Marketing Reports

Each EMS module has the capability of providing either Macro Reports or Micro Reports. The report type utilized depends on the form and current module and the type of data desired. Below are descriptions of both.

Following that is an explanation of how the Marketing Macro Reports function and the information they provide.

Macro Reports generate transaction and summary data specific to the EMS module currently in use. These reports are used when more than one item needs to be shown in detail. 'Reports' is a separate icon included in each module and can be used for internal and/or external auditing purposes. Macro reports display data in a summary or detail format based on user preference. They also offer the option to preview reports before printing.

Micro Reports generate transaction and summary data specific to an individual item such as a slot machine manufacturer, or a patron account. These reports have minimal information and are for quick reference. 'Micro-Report' is not an icon, but a tab located on a form. This type of report is not as broad based in detail as macro-reports, nor is it meant to be.

Report Definitions

Attendance Listing: Queried by=, <, >, <=, >=, <>, and between a specific number of visits. Lists by patron I.D., the patrons that have visited your site more than, less than, or equal to 10 visits, 20 visits, etc.

Attendance Trends: Queried by weekends or weekdays and with a date range. This allows the user to compare the numbers for weekend patrons to weekday patrons. The date range can be done using Friday through Sunday for every weekend of the month to see where you have the highest numbers. If incentives or specials are run on the weekend with the highest number, this may be an indicator to run the same specials on every weekend.

Benefit Summary: A list of comp/voucher names, the average redemption per day in $, total redemption per redemption in $, and the total $ value. The date range is queried using a start and finish date. To query a specific date, the start/finish date would be the same.

Ethnicity Analysis: Displays the percentage of patrons falling into an ethnic background. The ethnic names are in alphabetical order. This is useful in determining if you have a large enough Asian patron base to market a special event for the Chinese New Your Year or enough of a Hispanic patron base to market Cinco de Mayo, etc.

Event Attendance Report: Per event, this displays the patron ID, patron name, game site, invitation, date invited, and the date attended of the event the patron attended.

Event Attendance per Group Chart

Event Attendance per Tour Chart

Event Attendance per Group Report

Event Attendance per Tour Report

Event Attendance reports allow the user to view the attendance of groups and/or bus tours. Tour reports include the operator name and the tour name. Group reports use the group name. Both include the gamesite at which the event is held, the patron name and account ID #. The charts display the date in a graphical format as opposed to standard report format.

Event Invitations: This report is queried by an event name and the invitation method. Report displays the patron id, patron name and the date the patron was invited to the event. This report is used to see what patrons were invited to a specific event.

Gender Analysis: This breaks down the patron base by female percentage and male percentage.

Geographic Locations: Breaks down the patron base by head count and percentage, starting with the state and country with the highest numbers. This helps marketing know which states/countries they need to send more mailers and invitations to.

Group Patron Point: Can be queried by the name of the group. This report displays the patron name and id #, Average and LTD Wager, and Current and LTD Points.

Income Summary: Displays by income range, the head count and percentage of the patron base falling within each category.

Patron Point Report: This displays the patron name/id number, MTD, LTD, and current slot point totals. The report can be queried using a card type, MTD, LTD, current points, or a specific date range.

Patron Source: Can be queried by the enrollment type, i.e. walk-in, direct mail, etc, and a date range. The report displays the card type; enrollment date and type, patron name/id number, host name and current point total.

Patron Top Players: Queried by wager amount (=, <, >, >=, <=), net win and date range. Displays the patron name/id number, wager amount, won amount and the net win amount.

Patrons Activity: Displays the patron ID #, last and first name, and the first and last activity. Activity is queried with a specific date or date range. This report helps to determine if players that enrolled for a promotion with bonus points at sign-up (and have already redeemed their points) have played since that time. If the sign-up date were February 14th, the date range would be the same for a start and finish date. If everyone with a first activity on that date also has the same last activity date, they haven't played since then, meaning they signed up for the bonus points and incentives only. Another use for this report is to market people in a group or tour that haven't played since the sign-up date. It may be time for mailers and invitations for that group/tour.

Patrons without Active Cards: This displays the patron ID #, last name and first name of the patron that doesn't have an active card. Cards can be created for these patrons and mailed to them with the promise of bonus points if they visit your property.

Patrons without Preferred Addresses: This report displays the patron I.D. #, and the first and last name of the patron. This is handy to keep at the players club for review. If a patron is listed here, the club rep will know to update the account on their next visit. If a patron wants to receive mailers and invitations, they'll volunteer the information.

Patrons without Preferred E-Mail Addresses: This report displays the patron I.D. #, and the first and last name of the patron. This may be used in the same manner as the above reports. For patrons that want to be included in spur of the moment incentives and tournaments, but don't want mail or to be contacted by phone, an email address is ideal.

Patrons without Preferred Phone Numbers: This report displays the patron I.D. #, and the first and last name of the patron. For patrons that want to be included in spur of the moment incentives and tournaments, a current phone number is useful.

Prize Cost Analysis: This is queried by a specific date range, and comp name. This report displays the following information: Date, comp name, patron name/ id #, the quantity issued, actual $ value, retail $ value, and the points redeemed.

Redemption Detail: This report is queried by a specific gaming day and sort order. This includes the patron name, the account id #, location, the employee name issuing the voucher, comp/voucher name, comp/voucher number, point and comp point cost and the total dollar cost of the item.

Redemption Summary: The summary report displays only the voucher type, voucher name, points required, comp points required, points spent, comp points spent, quantity redeemed, the cost, and the total $ cost. This is a quick reference for totals by voucher type without patron information and sub-totals.

Redemptions at PRT: This report is queried by a gaming day and sort order.

Tour Detail—Queried by tour name, and date range. This report displays the temporary card numbers, coin-in, time played, points earned, casino theoretical win, casino net win, and tour grand totals for the tour activity. Participation is displayed as a percentage.

Voucher Status: This report can be queried by a voucher status of all, unredeemed, redeemed, lost and void. The date range is a specific expiration date or an actual range. You can query this report by a specific voucher #. This report can also be queried using the Patron ID #. It displays the location, status, voucher number, comp/voucher name, expiration date, patron name, who issued the voucher, the date issued, who modified the voucher and the date the voucher was modified. The footer of the report contains sub-totals by voucher status.

Select one or both of the options below before setting parameters for your query.

Print Preview: Selecting this option allows the user to view report data before printing. You must also select 'Run' in order to generate data to preview.

Run Report: Selecting 'Run' by itself will print the report but does not give the user the ability to preview it before printing. NOTE: To remove a selection, click on the checkboxes to remove the checkmarks.

Even if you only wish to preview a report, 'Run' must be selected in order for the system to gather the data for a preview.

I. The Patron Tracking Module

The Patron Tracking module encompasses those activities revolving around the patrons. Functions in this module include entering new patrons or modifying existing patron information, generating patron cards, as well as patron point redemptions. The information maintained on each patron can be of significant value to the Marketing Department in developing ways to increase patron attendance. The more information collected about a patron, the more value it provides to your site. While you may not want to spend the time gathering the information at one time, you will find that the information can be acquired over time, thus enhancing the ways that patrons can be targeted for special promotions, incentives, invitations, etc. Other items under the Patron Tracking Switchboard include Player History, Table Ratings, and Redemptions.

The Patron Module includes the following forms:

card maintenance form: composite form giving access to the most frequently used patron features. The card maintenance provides summary information on patron wagering and points earned. This form can also be used to retire or issue a patron card, adjust points, or process redemptions.

comp issue form: The comp issue form allows you to select a variety of comps and view the available point balance for the selected account.

manual rating form: The manual rating form is used to manually enter table ratings if the rating was not done using the table rating form. Once the patron is found, all information pertinent to the rating can be entered and updated. The player account will be updated in real-time.

Membership Application form: The Membership Application form expedites the entry process for new patron accounts requiring only a last/first name. Patron cards are also created here.

Patron Credit form: Patron Credit is established using this form. Information necessary to extend casino credit to your patrons is entered here.

Patron Rating form: The Patron Rating icon provides a wager history per patron which includes table play, slot play, etc., for the current month, quarter, and year.

Patron Signup form: The Patron Signup form allows you to enter a patron last/first name as well as a pin number (if required by your property) and issue a patron card for slot and table play.

Patron Vehicle form: The Patron Vehicle icon provides a means of recording patron's vehicle information, including make, model, and license number.

Patrons: The Patron form provides the most detailed information about each of your patrons. This form is used not only to input basic patron information such as name, address, and phone numbers, but also includes demographics, pictures and images, and important notes regarding the patron. The Patron form also includes a micro-reports section to provide quick information on a patron's card, comp, and incentive history.

Player History: The Player History form is used to query the database on all patrons for a specific date range, or a specific patron. Current open ratings can also be viewed. Information provided includes the patron's name, card number, the table on which they played, the average wager, any points accumulated, the amount of time at the table, total buy-in, and the patron's win/loss record.

Quick Entry: The Quick Entry form contains the basic information that needs to be collected when signing up a new patron. From this form you can quickly enter the required information as well as generate a patron card.

Redemptions: The Redemptions form is used when a patron wishes to redeem earned points for items designated by your site.

Table Rating: The Table Rating form is used to rate patrons at their table, as well as to record drops at the table. This graphical view of a table allows pit personnel to record patron buy-ins, while automatically having the start and end times registered when a rating is opened and closed. Because of the graphical interface, dealers using a touch screen and scanner can easily keep track of the players, even when the player changes positions at the table. Because information is instantly provided to the dealer when the patron card is swiped, patrons can be provided more personalized service by addressing them by name and even ordering a drink for them.

Report: The Report icon gives access to several reports pertaining to patrons. These reports can be used as marketing tools.

Figure 56:
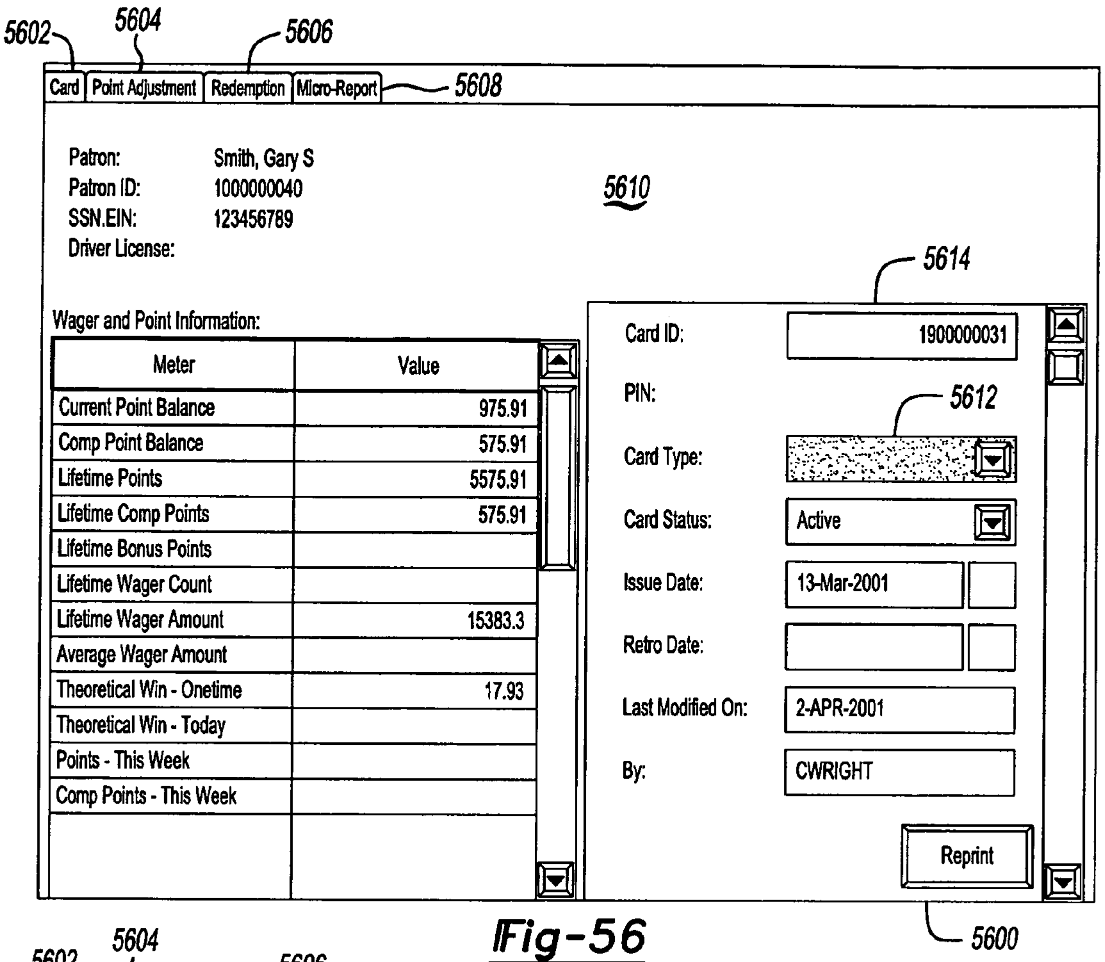

With reference to FIG. 56, the card maintenance form 5600 is a composite form containing commonly used activities concerning patrons. From this selection, cards can be issued and/or retired, points can be manually adjusted, and patron points can be redeemed for vouchers. The card maintenance form 5600, like other EMS forms uses a tab control to access the different options. The card maintenance form 5600 includes a card tab 5602, a point adjustment tab 5604, a redemption tab 5606, and a micro-report tab 5608.

With the card tab 5602 selection, a card window 5610 is displayed. The card window is divided into two sections. The left side of the window 5610 form provides real-time wager and point information for the current patron. The right side of the window 5610 is used for issuing new cards or changing the status of an existing card.

To issue a card or view wagering information, first the patron account must be located using Edit/Find from the top menu, or the keyboard shortcut CTRL+F. If a Patron's status has changed to Security Alert or there is a Must Read Note in the system, a warning box appears when doing a Find in Card Maintenance. This enables the user to read existing notes before continuing with any transactions.

To issue a new patron card, the following process is followed:

The Card ID field is active if the site uses preprinted patron cards. In this case, enter the preprinted card number in this field. If the site prints cards, the EMS will assign the card number when the record is saved. This field cannot be edited.

If the site requires the use of PIN numbers, enter the PIN number.

If the site provides different cards to patrons based on their level of play, select a card type from a card type drop-down list 5612. The player card section 5614 has the capability of reprinting a card using the original card number or to create a new card. If an existing account is being issued a new card, the status of the original card status must be changed to something other than 'Active'. The system does not allow for an account to have 2 active cards with different card id #'s simultaneously.

When issuing a new card, the status is usually 'Active'. Other selections include 'Lost', 'Stolen', or 'Retired'. Select the appropriate status from the drop-down list.

Issue Date—The current system date is the default date; however, if you need to change to a different date, use the calendar control. (See below)

Retire Date—The Retire Date field should be left blank when issuing a new patron card. In the event you need to make the card inactive later, you would enter the date the card is no longer valid.

Save and Print the Card—When you have completed the card information, save the record by using the top menu option Edit/Update or by using the keyboard shortcut CTRL+S. If your site prints cards, saving the record will generate a print of the new card.

Figure 57:
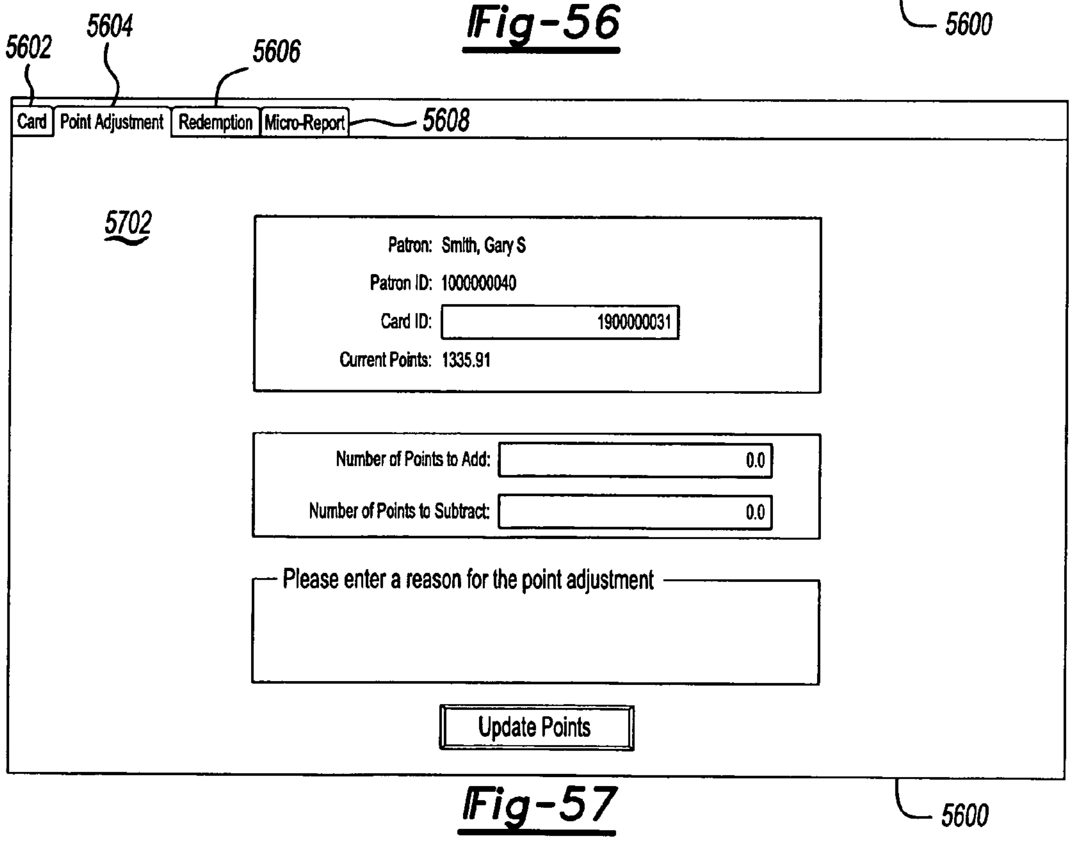

With reference to FIG. 57, with the point adjustment tab 5604 selected, a point adjustment window 5702 is displayed in the card maintenance form 5600. The point adjustment window 5702 works in the same manner as the point management form 5300 of FIG. 53 and is therefore not further discussed.

Figure 58:
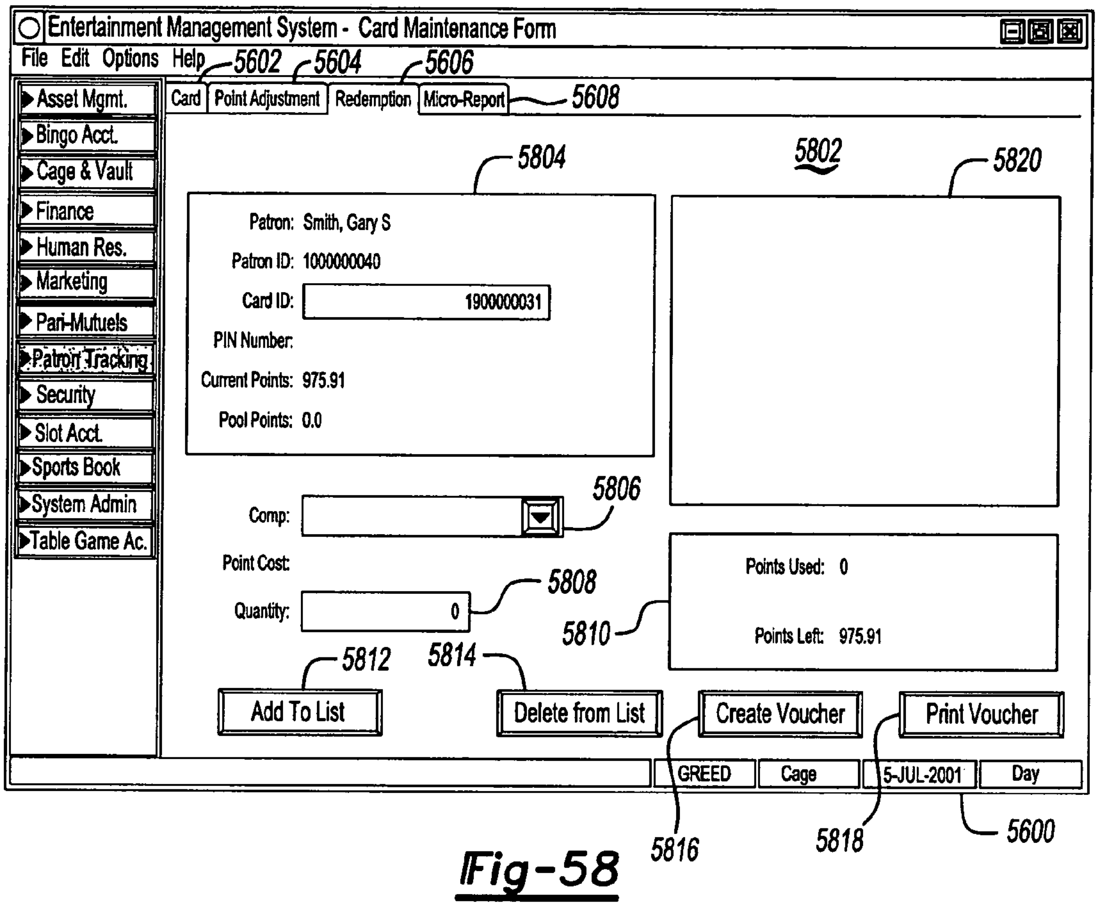

With reference to FIG. 58, with the redemption tab 5606 selected, a redemption window 5802 is displayed in the card maintenance form 5600. The redemption window 5802 includes a patron identification section 5804, a comp drop down list 5806, a quantity drop down list 5808, a points info section 5810, an add to list button 5812, a delete from list button 5814, a create voucher button 5816, and a print voucher button 5818.

The redemption window 5802 is used when a patron wants to redeem earned points for a gift or souvenir as offered by the slot club. The form is sectioned into five panels as described below. Redemption can also be processed using the Redemption form of the Patron Tracking module which operates in the same manner as the form below.

The patent identification section 5804 displays the Patron Name & ID, Card ID, Current Points, and Pool Points. The PIN Number field is used if your site requires PIN numbers for redemptions.

A voucher panel 5820 displays each item/voucher type selected during the redemption process.

The comp drop down list 5806 is used to select the item the patron wishes to purchase with points.

The points info section 5810 displays points used and points left on the account. As each item is selected from the 'Comp' field, the points used and points left update accordingly.

The add to list button 5812 adds the selected comp to the list in the voucher panel 5820. The delete from list button 5814 deletes the selected comp from the list. The create voucher button 5816 creates the voucher (and a database record) for each comp. The print voucher button 5818 prints all vouchers for the patron.

Figure 59:
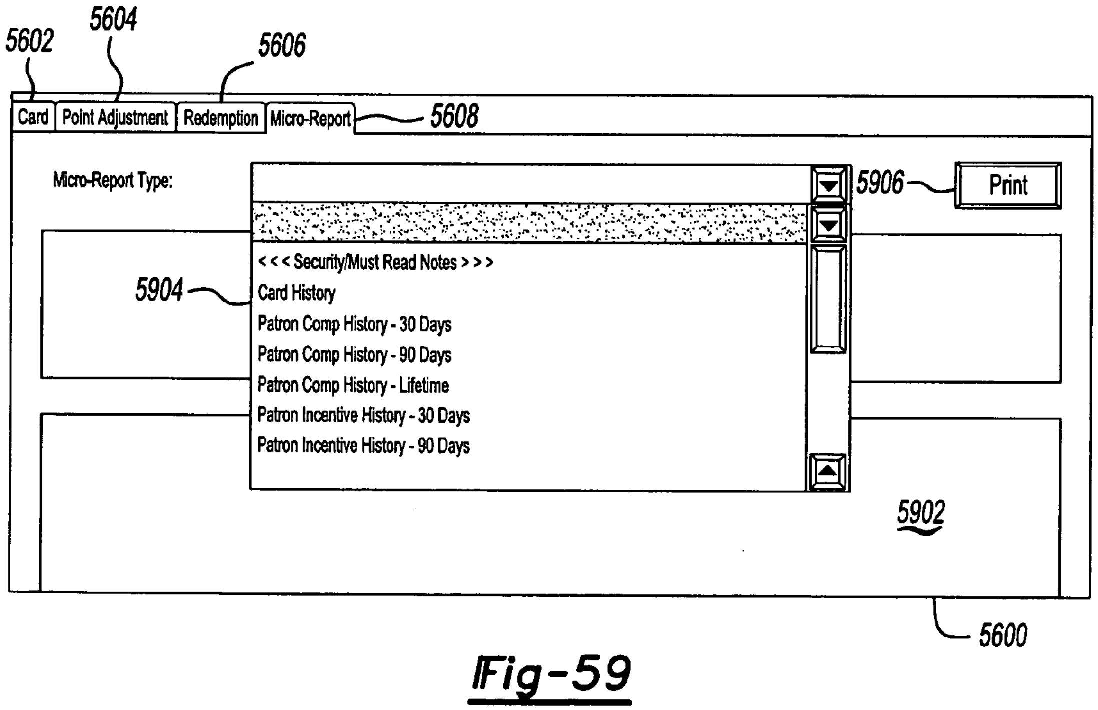

With reference to FIG. 59, with the micro-report tab 5608 selected, a micro-record window 5902 is displayed in the card maintenance form 5600. The micro-record window 5902 includes a micro-report type drop down list 5904 and a print button 5906.

Micro-reports gather data in real-time and are continually updated as play progresses. In a multi-site environment, the information displayed will be for a particular location. Micro-report data is specific to the patron account located on the above Card tab.

The following list of reports is available by scrolling down the list of micro-reports. Select the report you want to run, click on the report type, which will be highlighted in blue, and the report will fill the screen. The report may either be viewed or printed.

Figure 60:
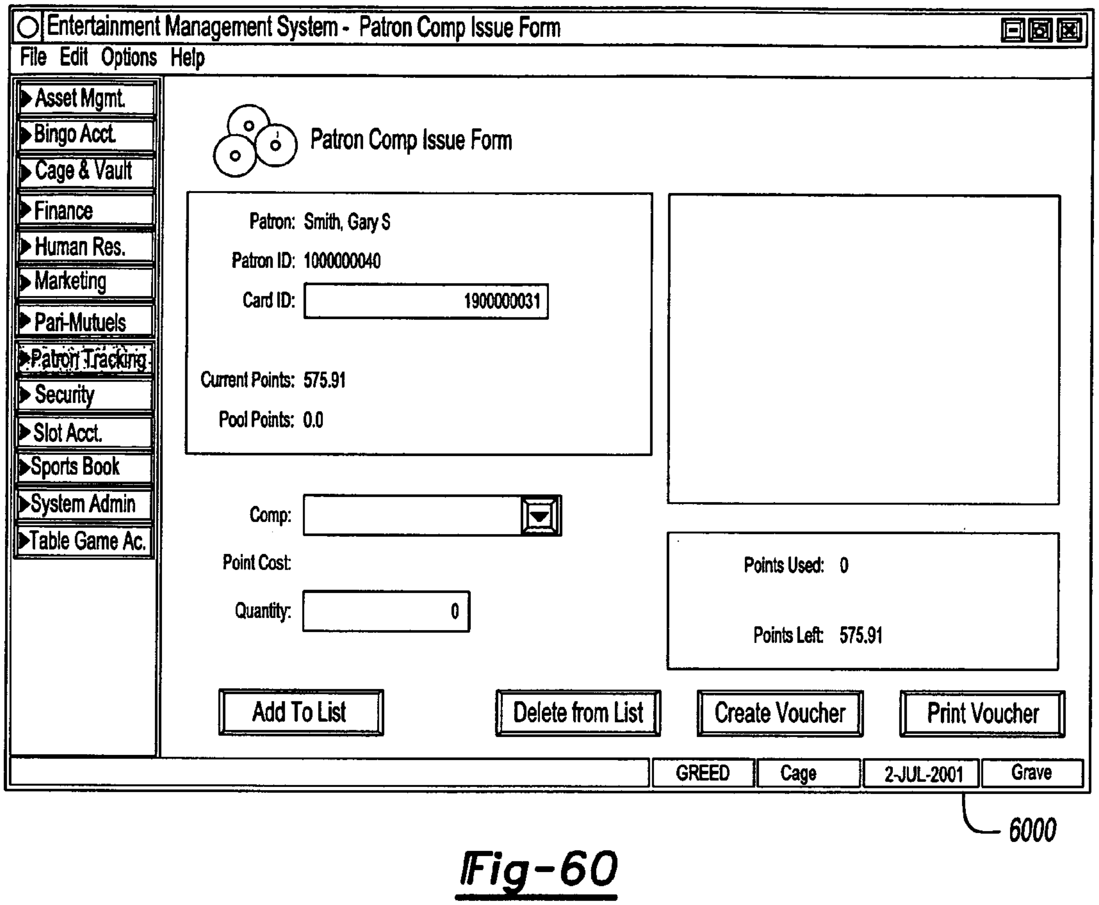

With reference to FIG. 60, the comp issue form 6000 is illustrated. The comp issue form 6000 is used to issue a comp to a patron that feels they've earned a complimentary item or meal and do not wish to use their earned slot/table points for a redemption voucher. Comp points are earned in the background meaning they are not included in the point totals displayed at the machine and the patron is not aware of the comp point balance attached to their account.

Using the comp point multipliers in EMS 100 is at the discretion of the establishment. Comp points are configured using the 'Comp Point Multiplier' field on the Incentive tab of the Incentive form or using the 'Comp Point Ratio' field on the Game tab of the Slot Maintenance form. These points as well as slot, table and bonus points are calculated based on patron activity and the multipliers. When a patron asks for a comp, the comp point balance on their account is reviewed. They'll at least get what they are entitled to but cannot claim to be a player if they aren't. This helps limit comp abuse.

In order for an item to appear in the 'Comps' drop-down list, it must already be set up with a name, type, and a comp point multiplier. To review the list of system comps go to Comp Maintenance in Marketing.

Comp names not appearing in the list on this form may have been set up as a redemption only (to be used with earned points and not comp points). Go to the redemptions form to review the drop-down list of comps.

The comp issue form 6000 works in a similar manner as the redemption window 5802 of FIG. 58 (with comp points, instead of earned points), so its operation is not further described.

Figure 61:
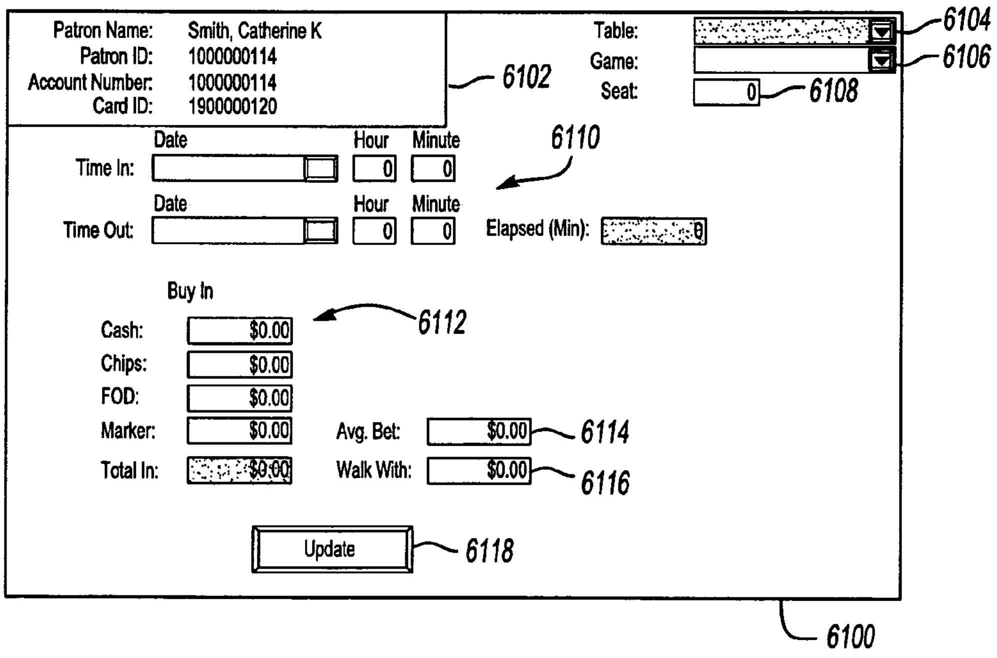

With reference to FIG. 61, the manual rating form 6100 can be used to enter a table rating when the Table Rating form was not used. The fields below are the standard information required to create averages and player history:

Patron Name 6102: Use the Edit/Find option or CTRL+F to locate the patron account.

Table 6104: From the drop-down list select the table ID to which the rating will be posted.

Game 6106: Select a game for the rating from the drop-down list of the Game field.

Seat (Optional) 6108: Enter the table seat number the patron was occupying.

Time In/Time Out 6110: Enter dates in a dd-mmm-yyyy format (15Jul. 2001) or use the Calendar Control (see below). Enter the time in military time. Example: The patron played from 11:00 am and stopped at 2:45 pm. The start time is 11:00 am and the end time is 14:45.

Buy In 6112: For each category; enter the amounts using numbers only (no dollar sign/decimal points). The system will calculate the Total In.

Average Bet 6114: Enter the average bet using numbers only (no dollar/decimal points).

Total Out 6116: Enter the amount the patron 'walked with' using numbers only (no dollar/decimal points). This amount needs entered to calculate the win/loss ratio.

Update 6118: Select 'Update' when all information has been entered. The data is recorded and calculated and now available in the Patron Rating and Player History forms.

Figure 62:
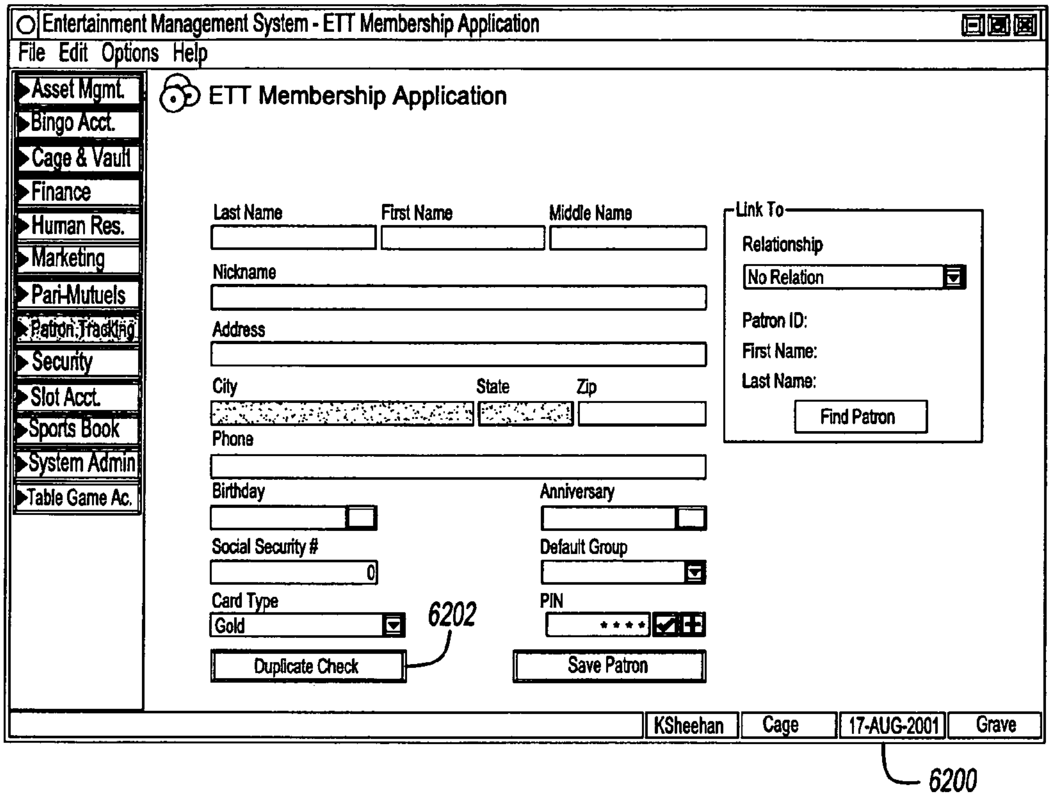

With reference to FIG. 62, the membership application form 6200 expedites the entry process for new patron accounts by eliminating a patron search (at origination) and requiring only a last/first name. Although a CTRL+F search isn't required, if a user prefers, they can still do one. As some names are more common than others, it is highly recommended to enter a DOB or SS#. Player cards are also created using the membership application form 6200.

Once the form 6200 is filled out, select the 'Duplicate Check' button 6202, to search for possible duplicate accounts. If there are no duplicates, select 'Save' to create the new account. NOTES: If there are duplicates, a further patron search should be done. The above instructions are for a minimal amount of information. Whenever complete information is available it should be entered. When entering a complete address, key in the street information and tab or click on the zip code field. Upon entering a zip code and tabbing out of the field, the city and state information will automatically update. If not, the zip code is not in the zip code database. Create the account without the address information. The System Administrator needs to add the zip code in System Admin/Zip Code Maintenance.

After reviewing the checklist, select 'Close' to return to the members app. If you are sure this is a new account, select 'Save Patron'. If this patron account may already exist, go to Patrons. Based on what was checked off at the right, searching by a SS#, phone number, etc., may be the easiest way to locate the duplicate account. If you don't find a duplicate, go back to the 'Membership Application' and create the account.

After saving the account, you will be prompted to either select the card swipe or the card embosser to create the player card. If the card is not created at the time of the account entry, it can be created later by going to the Patron form and using the 'Account' tab or from Card Maintenance form by using the 'Card' tab.

Because a patron name search is not required to create new accounts, the duplicate check button should always be activated. This is entirely at the discretion of the user. Not utilizing the 'Duplicate Check' function will result in duplicate accounts. This function activates a cross check forcing the system to check for duplicate accounts.

A new account can be saved if an account exists with similar patron data, however, it cannot be saved without running the 'Duplicate Check'. Below is the list of data used for the cross check. If one or more of the items is checked off, this patron may already have an existing account and it should be researched.

Figure 63:
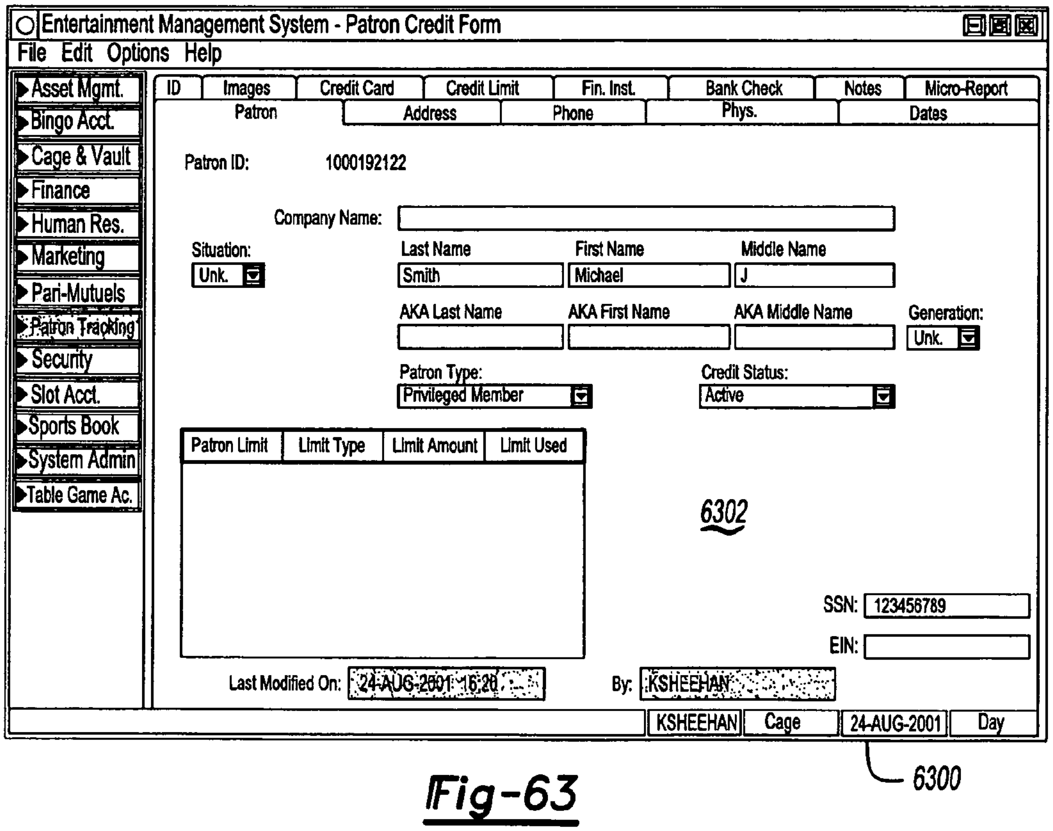
Figure 64:
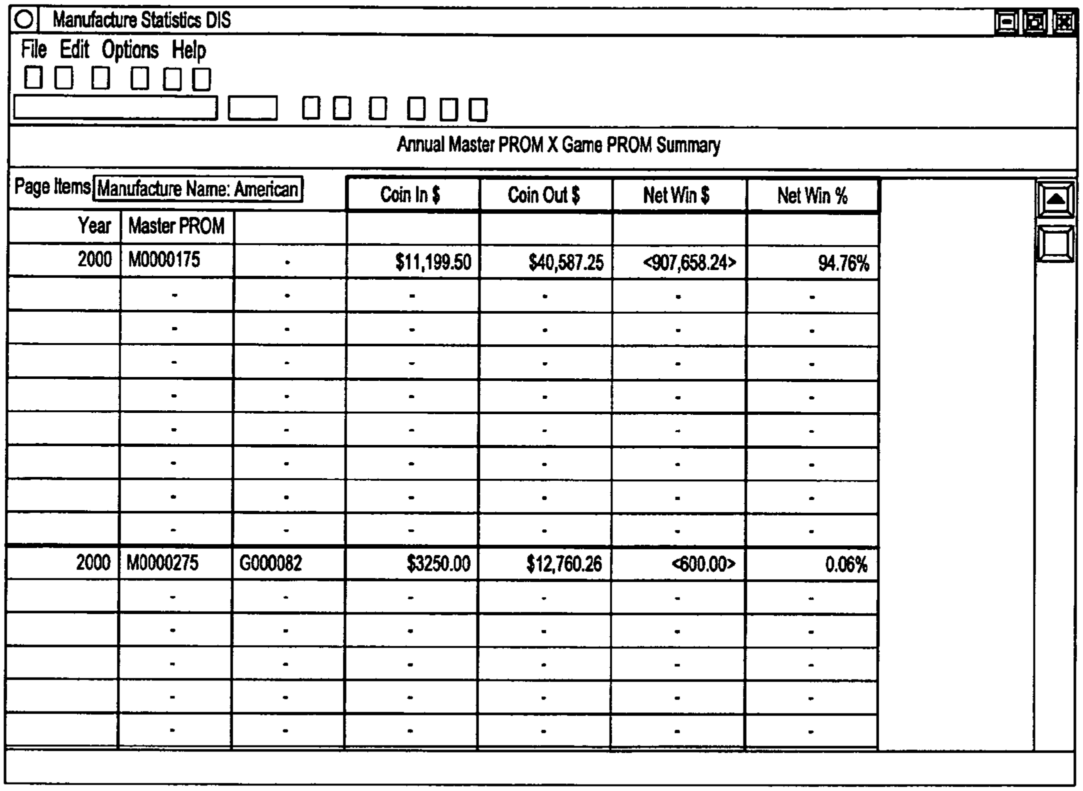
Figure 65:
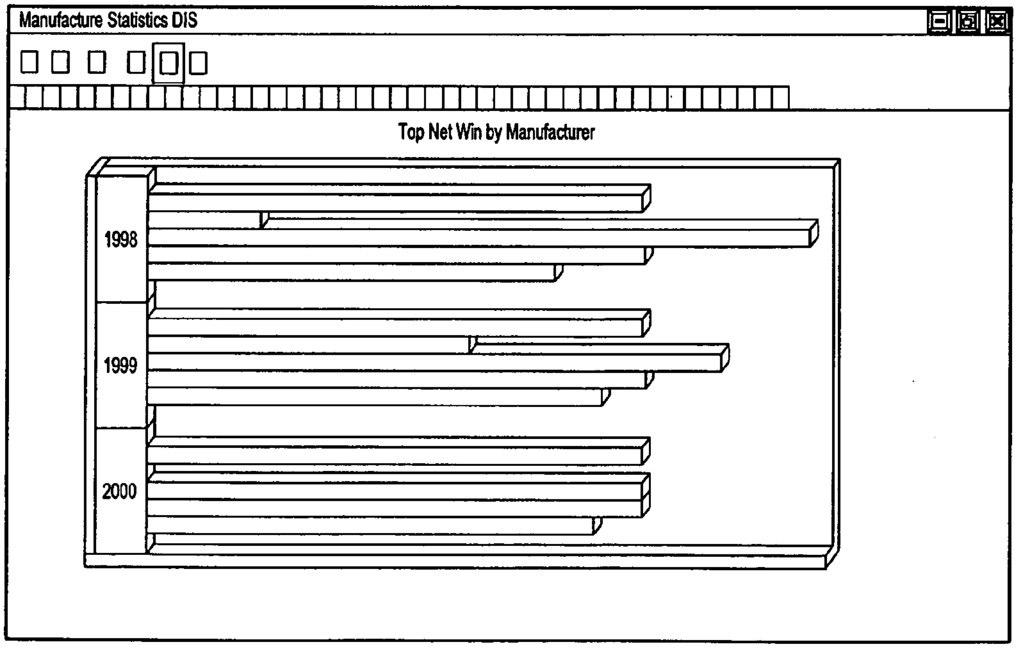

With reference to FIG. 63, the patron credit form 6300 is used to record the information required in order to establish credit limits for check cashing and taking markers. If a patron account has been setup in EMS for the Slot Club, some of the information required for this form is already available. By doing a 'Find' on the account name you will see that much of the existing information will map over to Patron Credit. However, this form can be used to establish credit for a new patron.

Establishing credit information allows patrons to cash checks, purchase CPV's, take casino markers, etc. Below is an example of the Patron tab of the credit form. Note at the top of the form the tabs for additional information. The information found on the patron window 6302 includes the following:

Company Name: If your property requires a patrons employment info enter it here. This information is optional and not required by EMS to create and save an account.

Salutation: The Salutation drop-down list is used when sending mailings to the patron. Select the appropriate salutation.

Last Name: Type the last name of the patron.

First Name: Type the first name of the patron.

Middle Name: Type the middle name or initial if available.

Generation: If the patron's name includes a generation, such as Sr. or Jr., select it from the drop-down list.

AKA Last Name/First Name/Middle Name: If the patron uses an AKA, enter the name in these fields. When doing a name search, the AKA can be used and will locate the account in the same manner as the primary name.

Patron Type: All patron credit types must be Privileged Member Credit Status. All patron credit status must be Active SSN (if applicable)—Enter the patron's social security number without using dashes. In EMS the SSN field is optional, as many patrons will not disclose it at the time of application. It is up to the property to determine if this is required at application, but it should be obtained before activating the credit line.

EIN (if applicable): European Identification Number: This often replaces the SS# if the patron is foreign and does not have the standard SS#. The EIN field is optional and may or may not be required by your property.

J. Security

The EMS, together with Oracle8™, provides comprehensive, flexible and reliable security features to ensure proper user authentication and assignment of database privileges.

Database privileges authorize users to perform certain operations, such as insert, update, or delete, on selected database objects. These privileges allow you to precisely enforce security policies ensuring that users have only the privileges they require.

Using Roles significantly reduces the burden of security management. For example, rather than setting up privileges for each individual in your Marketing Department, you would establish a role for Marketing with all the associated privileges assigned to that role. You would then assign the Marketing Role to each employee needing those privileges. Employees can be moved in/out of a role at the click of a mouse without having to modify the rights of the role or the users attached to it.

The Surveillance Form displays alerts set up for specific transactions taking place within your operation. Alerts are sent to specific roles based on criteria in Alert Setup. Alerts are displayed in the top portion of the Surveillance form. They can be audible, playing a sound on receipt, or set up to print automatically upon receipt.

The reports form generates data reflecting any modifications made to a system role.

K. Slot Accounting Module

The Slot Accounting module is designed so that the various steps required to complete an audit are incorporated into their own icon. By doing so, users at different levels are granted access to the parts of an audit required by their position and nothing else. Before the numbers are finalized and the audit approved, everything must be escalated to a higher level. This protects the integrity of the audit to the highest degree by safeguarding the numbers and minimizing the margin for error.

Audit Back-Out: Allows accounting to make corrections after the audit has been finalized.

Daily Update: This is used to save any changes made to the Hard Count. Soft Count, and/or Jackpot/Fill verification forms. Using this function calculates all of the data for the audit that was just completed and gets the numbers in line for final reporting to management. Anytime a change has been made to a closed gaming day and a modification done using Audit Backout, the Daily Update process must be run again to recalculate numbers.

Excess Coin-In Adjustment: Adjustments made to this form are based on the results of the "Excess Coin-In" report generated by the Macro-Report function.

Floor Graphics: The user can categorically view the floor by machine, manufacturer, status (linked/not linked), carded/un-carded play, etc. A search by patron name or machine number can also be done. To differentiate between the categories, color-coding is available. At one time, the user can see which machines are IGT's, which are quarters and at the same time which are linked and not linked.

Hard Count: Used by the drop team to enter coin drop values by machine per gaming day. The form can also be used by accounting to make authorized corrections to the day's entries.

Hard Count Verify: The Hard Count Verification form is used to verify coin-drop totals that were either imported or manually entered from the Hard Count form. Totals for hard count are summarized by denomination and can be viewed by floor, zone (specific floor area), bank (group of machines within a bank) and individual machine.

J/F Verify: This is used to verify jackpot/fill totals imported into the files or manually entered throughout the gaming day. It also provides the forms required to enter manual jackpot/fill tickets that have not been entered for the day being audited. Jackpot/fill totals can be viewed by floor, zone (specific floor area), bank (group of machines within a bank) and individual machine. Totals are summarized by jackpots, cancelled credits and the different fill types, i.e., standard fills, emergency fills, etc.

JP/CC Buy: The JP/CC Buy form is used to create a record of tape buys that occur between a cashier and the main bank in a casino cage.

Jackpots/Fills: This form displays the slot transactions occurring at the machine level on the floor. From here the user processes the tickets and W2's involved in jackpot payouts and hand-pay transactions. The W2 process complies with IRS regulations and can be created for a patron with or without an existing system account Micro-Reports are also available which allow you to generate reports based on the action for the current day/shift.

Manual Meters: This form is for entering coin and bill meter totals for machines that are not connected to the on-line system, but are in operation.

Meter Compare: Allows the comparison of the GCB meter readings to the System meter readings. The user has the option to break out the results by a floor area (zone), banks (group of machines), by specific machine or see totals for the entire casino. Also seen here are specifics such as the variance amount and percentage. The system allows monitoring of any meters provided by SAS 4.0 protocol and supported by the manufacturer's specific implementation of that protocol.

NOTE: GCB meter readings is taken to mean the set of meters mandated by the gaming control authority as the ones to use when comparing the on-line system meter changes to machine-resident meters. Based upon Gaming's request, the "GCB Meters" may be defined as the hard meters on a machine, or defined as the machine soft meters.

Additionally, the gaming control authority may designate which specific meters are monitored. For example, they may only be interested in the coin-in meters, the bill meters, or they may want all meters monitored.

Meter Entry: Provides a place for the user to enter GCB meter readings taken from the machine.

Random Draw: This allows a user to perform a drawing by locating only machines with a player card inserted.

Recovered Fills: A Recovered Fill is the initial fill used when a machine becomes active on the casino floor. This form is used to create a more accurate audit by enabling a user to enter a machine number, the amount of the initial fill and the gaming day it came off the floor. Therefore the initial fill can be credited back to the casino cage.

Soft Count Verify: The Soft Count Verification form is used during the accounting process to verify soft count totals that have been imported into the files or entered from the Soft Count form. Totals for soft count are summarized by denomination and can be viewed by floor, zone (specific floor area), bank (group of machines within a bank) and by individual machine.

Soft Count: This form enables the soft count team to enter bill drop values for the gaming day. The form supports entry by bill denomination per machine dropped on that day. Additionally, accounting can use this to make authorized corrections to the day's entries.

Tape Buy: This is used by locations on a slot route as opposed to a casino. The purpose of the "Tape Buy" form is to create a record of "Tape Buys" that occur between the slot clerk and the route driver. As hand pays are made to customers (based on tickets for cancelled credits and/or jackpots) the bank is depleted. Eventually this requires the clerk to make a "buy". The tape/tickets are what will be exchanged for the cash buy.

W2G Reprint: A common request as tax time approaches is that a patron needs a copy of their W2. The reprint form allows a user to print multiple copies of an original W2G.

Macro-Reports: This icon provides access to typical revenue reports that the accounting department needs to run during the typical workday after finalizing an audit. It also provides access to slot analysis reports such as popularity and performance summaries.

L. Sports Book Accounting Module

The Sports Book Manual Tote Sales form is NOT for accounting purposes. Its sole purpose is to provide a method for a casino to award patron points based upon wagers at the Sports Book. The user swipes the patron card, and enters the dollar amount of the wager per wager type. Patrons receive points based on the total cash amount.

Sports Book points are determined by the point factor set up in Asset Management/Terminal Maintenance/Wagers tab/Point Ratio field. Points awarded for sports book activity appear on the micro-report named Patron Point Transaction History The point adjustment type will be "WAGER".

M. System Administration

The System Administration module determines, in part, how EMS will function at your property The defaults set up in this module are configurable based upon the changing needs of the property. Meeting with personnel from various departments such as Marketing, Human Resources and Operations is recommended to effectively set up these defaults.

Alert Setup: The Alert Setup form is used to establish messages to be broadcast to pre-determined workstations, individuals, etc. for specific actions occurring within your operation. For example, if you want Security to be alerted each time the drop door of a machine is opened you can set up an alert assigning the user role(s) to receive the message, the alert type to send, and the message to be displayed on the surveillance terminal. Alerts and approvals are accomplished via database triggers.

Approval Setup: Use this form to set up the items that need an approval from someone other than who may be logged into the machine. For example, a slot floor person may be able to pay up to a $1000 hand-pay. $1001 and above may require a card swipe from the floor/shift supervisor.

Book Type: The Book Type form is used to establish the types of sports book activities for which you wish to award points. Once established, these book types are used when setting up seasons and play within the Sports Book Module. As shown in the example below, a book type can be any type of sporting activity such as Men's Basketball or Auto Racing.

Device Setup: All device forms (i.e., Slot Maintenance, Table Maintenance, etc.) allow the user to enter comments and information on the Note tab. This form is used for entering the default note types that are available throughout EMS.

Education: The Education form is used to categorize your patrons within an educational level. You may want to be very specific about the educational levels by breaking it down into small groups, such as the number of years of college. On the other hand, you may only want to know whether the patron is a college graduate.

Employee Setup: Defaults for the Employee Setup form determine the detail entered on the EMS Human Resources Employee form. These should be reviewed with a Human Resources employee to ensure adequate data is maintained on employees.

Ethnicity: The Ethnicity form is used to enter the different races that marketing wants to have available for selection on the Patrons Demographics tab.

Event Types: Events are part of providing incentives to patrons. Events/interests are used to streamline the process of inviting the patrons most likely to attend an event at your site. As patron data is accumulated, it can be used as a marketing tool. Event types are pre-set within EMS; but the System Administrator may add sub-types.

Financial Institution Setup: This form is used to input data on those financial institutions with which the property does business.

Floor Setup: Floor setup involves determining how best to break down your site into manageable groupings. EMS uses the terminology of "Zones" and "Banks". Zones and Banks must be set up before entering information on each of the devices (or games) within your site.

IOP Setup: IOP Setup should only be used by knowledgeable IT personnel. Its purpose is to set up workstations and printers with addresses so the system knows where they are and how they are being used.

Income Range: To categorize your patrons by income range, first determine the range levels. Income ranges should NEVER overlap. After income ranges are categorized and in use for patron accounts, they should not be changed. Editing ranges requires going to each patron record to update the income to the correct revised range. Income is optional information on a patron account. Therefore, you should always maintain a range of 0-0 for use when a patron does not disclose this information.

Lessor: The information entered here is data on those companies from which your site leases equipment.

Marital Status: Marital status is maintained on patrons for marketing purposes, as it is an option for criteria when configuring parameters for a special event or promotion on the Invitations form. The types set up here are available options on the Demographic tab of the Patrons form.

Manufacturer Setup: Data on equipment manufacturers is important to many departments in your operation. This form enables the System Administrator to determine the types of addresses, e-mail addresses, and phone numbers, you want to maintain on these manufacturers. This data is often useful to the accounting office, technical support, or the service department. The information you set up here will be used when entering data on the Manufacturer form located in the Asset Management module.

Occupations: Patron occupations are maintained for demographic purposes. Marketing may use this information to target certain groups for promotions (i.e., if they know a convention relative to an occupation is coming to town). The types set up here will be options available on the Demographic tab of the Patrons form.

Participant Setup: A participant is an owner/operator of an establishment whose business (e.g., bar, convenience store, etc.) houses the slot machines and "participates" in the net win in return for providing the location, space, atmosphere, and day to day customer service.

Password Maintenance: The Password Maintenance form is used by the System Administrator to change passwords. An end user with the access rights may also perform this function. In the event a user forgets a password, the System Administrator needs to assign a new one utilizing this form. This should be a highly restricted form. For security purposes, even the System Administrator is required to type in his/her password which will be verified by EMS before allowing modification to any user's password.

Patron De-Dup: The Patron De-Duplication form is provided to consolidate duplicate patron accounts. If a patron has multiple accounts, this process creates a point transaction to move patron points from the duplicated account to the account that you want to keep. All historical information about both accounts remains intact. The account that will not be used will be flagged by EMS as "Duplicate".

Patron Setup: Options appearing in drop down lists for fields and tabs located on the Patrons (Patron Tracking) are configured here. Some of those are card types, attendance preference, etc.

Point Reset: Patron Point Reset function is provided should your facility decide to expire outstanding points. Use of this function requires System Administrator authority and should be used with great caution. Point Reset creates a point adjustment back to a zero point total for every patron (with a point balance).

Postal Codes: EMS has defaults loaded for known postal codes within the United States. This form enables the System Administrator to manually enter new postal codes. If a postal code is in the database, a user only needs to enter the street and postal code when creating or updating an account. The postal code will prompt the city and state. It's important that there are no typo's, as this information appears on the mattes sent out by marketing.

Point Setup: The Point Setup Icon is used to determine how patron points are earned. Each wagering area (slots, bingo, tables, etc.) can be configured with a different calculation method. If your site does not wish to award points in any areas, the "Do not award points" option can be selected.

Religion: This table is used to record the list of religious backgrounds that a person could come from. The information can be used by marketing personnel to invite certain groups to events or provide incentives to visit your establishment. The types set up here will be the available options on the Demographic tab of the Patrons form.

Repository Setup: A repository is a location that moves currency within the casino; it could be a vault, chip bank, cage, pit, etc. This form allows the user to add/remove repositories, configure what areas of the casino they will work with and the type(s) of currency they handle.

Send Message: This function enables a user to create and distribute a system wide message to any workstation logged in to EMS.

Shift Change: This form is used to manually close the current shift and open a new gaming shift. If your site has one gaming shift, this process will change the shift to the next gaming day. If your site has multiple shifts, this will close the current shift and open the next shift within the same gaming day. Shift Change can be automatically done through Site Maintenance in System Administration.

Site Defaults: The Site Defaults form contains default information needed to determine how EMS will operate at your location. In a multi-site environment, the Site Default information is specific to the site location. For example, if you are the System Administrator for an establishment which has two locations, Site A and Site B, the information you are viewing on the form will be dependent upon whether you are physically at Site A or Site B. This allows the different locations to establish unique defaults. Defaults for the following are established using this form:

Game Site—Establishes the site's default currency, chip currency, language, etc.

Patron—Determines if patrons will use PIN numbers, if cards are pre-printed, etc.

Devices—Establishes general defaults for tables, fills and credits.

Foreign Exchange—Establishes if patrons will incur a foreign currency exchange fee, and if so, what those fees will be.

Checks—Establishes a check hold period, number of days for checks to clear, etc.

Safekeeping & CPV—Defaults as to whether transactions are detailed, and if CPV's are used for this site.

Markers—Marker defaults such as hold days, signature guidelines for credit limit increases, etc.

Site Maintenance: The tabs on this form are used to enter default information on the game site, addresses, telephone numbers, e-mail addresses, shifts and local patrons used by a particular game site. General information about the relationship of this game site to other sites in a multi-property system is also stored on this form.

Site Setup: The System Administrator will need to determine what types of addresses, phone numbers, and e-mail addresses you want to maintain for each of your sites. For example, in a multi-site environment, you might want to have information for the accounting office, the security office, and the general business office. The types you set up in Site Setup allow you to maintain as much detail as your establishment needs.

Tour Setup: The Tour Setup form contains information needed to determine what types of addresses, phone numbers, e-mail addresses, and notes you want to maintain for each of your sites regarding tours. For example, in a multi-site environment, you might want to have information for the billing business office, and the shipping business office.

Reports: Below are brief descriptions of the reports for this module. Reports in each module offer the option of being viewed and printed or just viewed.

Alert Setup: This report is queried by the employee role type. It displays the transaction name, role, floor and ceiling amount, if the alert was printed and if the alert has audio or not.

Approval Setup: Report is queried by the employee role type. This displays each transaction, the approving role and the floor and ceiling amounts for the approval. It also shows whether multiple roles must approve the transaction.

Approvals: Queried by a date range and the transaction type. This report displays the transaction date, time, number, the type of transaction, amount, machine number and the authorizer of the transaction.

Employee Card Status: Queried by a date range, the employee and card status. It displays the employee name and status, card number, employee id number, card status, the date and the user that modified the employee card information.

Failed Login Attempts: This report lists each user who has been denied access to EMS, the terminal used when the login failed and the date and time the login failed. The report is queried by a gaming month and year.

Last Password Change: Report is queried by a gaming month and year. This report lists when passwords were changed in a given month, and the user name of the person who made the changes.

List of Employees' Permissions: Run this report to receive a listing of all employees and the permissions assigned to the EMS. This report displays the employee's name, id, the role to which they belong, the EMS forms, reports, and processes they have permissions to view, insert, update, delete, or execute.

List of Employees' Roles: This report displays a listing of the roles assigned to your employees by employee name, id number, their EMS user name, department, and the role(s) to which they belong.

List of Roles' Permissions: This report displays a listing of the permissions associated with each security role. The report is sorted by the Role name, the menu name and lists each item the role has permission to access, and the type of access allowed.

Password Expiration: This report is queried by gaming month and year. This report lists the passwords expiring in a given month, account status, lock date (if applicable) and the expiration date. Depending upon a property's security procedures, users (or the System Administrator) are given advance notice of expiring passwords so they may update their account and avoid being locked out of EMS.

Patron De-Duplication Log: This report is queried by a gaming day. This report will list any accounts that were combined because they were duplicates. When the de-dupe process (System Admin. module) is run, any points are transferred to the remaining account. This report displays the date/time the de-dupe occurred, the two accounts involved, the transferred point/comp total, the user name and the reason for the de-duplication.

Patron Point Audit: Queried by a patron id number, a date range and the game site type. This report displays patron name and id number, card id number, location, and gaming day, type of transaction, current points and combined bonus points.

N. Table Game Accounting Module

The Table Game Accounting Module contains the forms necessary to conduct daily pit operations as well as a complete audit of pit activity. Below are descriptions of the forms located in this module:

Table Transactions: Used to open and close tables, request fills, credits and markers from the table.

Table Estimate: The estimate form is used to figure the estimated win/loss based on action during the shift.

Table Count: Provides a method of performing table counts and drop verifications.

Table Audit: Used for table auditing, allowing for adjustments to openers, closers, fills, credits, markers and the table drop.

Audit Back-Out: This form is used to open a gaming day and shift that has been finalized. This form allows accounting to make corrections to table game audits that have been finalized.

Marker Account: Provides a form to transfer markers to the repository by pit location or table.

Markers: Allows the issuance of a marker from a table as opposed to the form used to issue markers from the cage. This form reflects the table ID.

Macro-Reports: The report grid for table transactions includes a Drop Verifications Report, Fill/Credit Report, Master Gaming Report, Master Gaming Variance Report, Opener/Closer Report, Preliminary Drop Verification Report, Preliminary Master Gaming Report and a Summary Master Gaming Report.

O. Universal Regulatory Monitoring (URM) Module

The URM module provides the capability desired for regulatory agencies. The URM Module has been designed to bring the regulatory agency into the system with the operator as a business partner. Facilitating a streamlined exchange of data between the operator and the agency reduces the efforts and costs of both the agency and the operator.

The system 100 contains a full security and permissions module as part of the base system. The security of the system 100 is actually controlled by the security of the Oracle database, which meets Department of Defense security standards. This is completely definable by the agency, including the ability to select, insert, update and delete on a screen by screen manner. The system also extends this security definition to each standard report. The system also provides an electronic signature on all transactions so the agency knows what employees have done and when they did it.

The URM module has the following features:

- the URM file can be created from any Casino Management System.
- rapidly query a relational database, data warehouse or data mart.
- can be daily/shift batch or real-time.
- flexible in the type of data exchanged from summary meter information to detailed daily statistics.
- 24×7 support available.
- extensive site specific configuration.
- URM consolidates massive amounts of data into meaningful information that can be understood.
- decrease workload due to sophistication of gaming technology and volume.
- eliminate the issue of geographic dispersion.
- reduce manpower and time required during the audit process for the casino and regulatory agency.

The URM Module provides the following information: meter readings, denomination changes, master PROM and game PROM versions, net win, theoretical hold, actual hold, hold % adjustments, jackpots, and fills.

Obviously, many modifications and variations of the present invention are possible in light of the above teachings. The invention may be practiced otherwise than as specifically described within the scope of the appended claims.

What is claimed is:

1. An entertainment monitoring system, comprising:

any casino including at least one gaming area;

a plurality of electronic gaming machines disposed in the gaming area for play by a plurality of players;

a computer based module coupled to each of the electronic gaming machines for processing electronic gaming data relating to play of the electronic gaming machines by the players, financial transactions between the players and the electronic gaming machines, and identification of the players;

a plurality of gaming tables disposed in the gaming area for play by the plurality of players;

a plurality of computer workstations for processing table data relating to play at the gaming tables by the players, financial transactions between the players and the gaming tables, and identification of the players;

a computer network having a database computer coupled to the computer based modules and the computer workstations for receiving the electronic gaming data and the table data and storing the data in a database;

a player tracking module operable on said computer network for registering the players, issuing a player tracking instrument to each of the players to identify the players at the electronic gaming machines and the gaming tables, evaluating the electronic gaming data and the table data for each of the players, and awarding complimentary points to the players based on the evaluated data; and a redemption center in electronic communication with the player tracking module, the redemption center being remote from and physically located away from any casino, the players physically relocating from any casino to the redemption center where the players can redeem their awarded complimentary points for products or services and can earn points based on products or services purchased at the redemption center;

wherein the redemption center is implemented at a location selected from the group consisting of a point of sale system, a hotel property system, other point-based redemption systems, and combinations thereof.

2. An entertainment monitoring system as set forth in claim 1 including a progressive jackpot module operable on said computer network for selectively and individually including each of the plurality of electronic gaming machines in a progressive jackpot such that an operator can individually select which of the electronic gaming machines to include in the progressive jackpot and exclude from the progressive jackpot.

3. An entertainment monitoring system as set forth in claim 1 including a video camera situated near each of the plurality of gaming tables for viewing the play at the gaming table and a video screen operatively connected to the video camera for displaying the play at the gaming table such that a user at the computer workstation can observe the play at the gaming table by the players.

4. An entertainment monitoring system as set forth in claim 1 including computer software modules operable on said computer network and including at least one asset management module, accounting module, finance module, human resources module, marketing module, and patron tracking module to manipulate both the electronic gaming data and the table data.

5. A method of monitoring any casino including at least one gaming area having a plurality of electronic gaming machines and a plurality of gaming tables for play by a plurality of players, said method including the steps of:

registering the players in a player tracking module operable on a computer network and issuing a player tracking instrument to each of the registered players;

processing electronic gaming data relating to play of the electronic gaming machines by the registered players, financial transactions between the registered players and the electronic gaming machines, and identification of the registered players using the player tracking instruments;

processing table data relating to play at the gaming tables by the registered players, financial transactions between the registered players and the gaming tables, and identification of the registered players using the player tracking instruments;

storing the electronic gaming data and the table data in a database;

evaluating the electronic gaming data and the table data for the registered players and awarding complimentary points to the registered players based on the evaluated data;

the players physically relocating from any casino to a redemption center; and redeeming the awarded complimentary points for products or services and earning points based on products or services purchased at the redemption center by the registered players at the redemption center electronically linked to the computer network, the redemption center being remote from and physically located away from any casino;

wherein the redemption center is implemented at a location selected from the group consisting of a point of sale system, a hotel property system, other point-based redemption systems, and combinations thereof.

6. A method as set forth in claim 5 including the step of selectively and individually including each of the plurality of electronic gaming machines in a progressive jackpot such that an operator can individually select which of the electronic gaming machines to include in the progressive jackpot and exclude from the progressive jackpot.

7. A method as set forth in claim 5 including the step of sensing a biometric characteristic of the registered players at the electronic gaming machines and the gaming tables to further identify the registered players.

8. A method of tracking a player in any casino including at least one gaming area having a plurality of electronic gaming machines, said method including the steps of:

registering the player in a player tracking module operable on a computer network by creating a player account and issuing a player tracking instrument associated with the player account to the player;

adding funds to player account using the player tracking instrument and retaining the added funds as credits on the computer network;

identifying the registered player at a first electronic gaming machine using the player tracking instrument and transferring the credits from the player account to the first electronic gaming machine;

processing electronic gaming data relating to play of the first electronic gaming machine by the registered player, the credit transfer between the player account and the first electronic gaming machine, and the identification of the registered player using the player tracking instrument;

storing the electronic gaming data in a database on the computer network;

evaluating the stored electronic gaming data and awarding complimentary points to the registered player based on the evaluated electronic gaming data;

the registered player physically relocating from any casino to a redemption center; and redeeming the awarded complimentary points for products or services and earning points based on products or services purchased at the redemption center by the registered player at the redemption center electronically linked to the computer network, the redemption center being remote from and physically located away from any casino;

wherein the redemption center is implemented at a location selected from the group consisting of a point of sale system, a hotel property system, other point-based redemption systems, and combinations thereof.

9. A method as set forth in claim 8 wherein the step of identifying the registered player at the first electronic gaming machine includes the steps of sensing a biometric characteristic of the registered player at the first electronic gaming machine.

10. A method as set forth in claim 8 including the step of selectively and individually including the first electronic gaming machine in a progressive jackpot whereby an operator can individually select which of the electronic gaming machines to include in the progressive jackpot and exclude from the progressive jackpot.

11. An entertainment monitoring system, comprising:

any casino including at least one gaming area;

a plurality of electronic gaming machines disposed in the gaming area for play by a plurality of players;

a computer based module coupled to each of the electronic gaming machines for processing electronic gaming data relating to play of the electronic gaming machines by the players, financial transactions between the players and the electronic gaming machines, and identification of the players;

a computer network having a database computer coupled to the computer based modules for receiving the electronic gaming data and storing the electronic gaming data in a database;

a player tracking module operable on said computer network for registering the players, issuing a player tracking instrument to each of the players to identify the players at the electronic gaming machines, evaluating the electronic gaming data for each of the players, and awarding complimentary points to the players based on the evaluated electronic gaming data; and a redemption center in electronic communication with the player tracking module, the redemption center being remote from and physically located away from any casino, the players physically relocating from any casino to the redemption center where the players can redeem their awarded complimentary points for products or services and can earn points based on products or services purchased at the redemption center;

wherein the redemption center is implemented at a location selected from the group consisting of a point of sale system, a hotel property system, other point-based redemption systems, and combinations thereof.

12. An entertainment monitoring system as set forth in claim 11 including a progressive jackpot module operable on said computer network for selectively and individually including each of the plurality of electronic gaming machines in a progressive jackpot such that an operator can individually select which of the electronic gaming machines to include in the progressive jackpot and exclude from the progressive jackpot.

13. A method of monitoring any casino including at least one gaming area having a plurality of electronic gaming machines for play by a plurality of players, said method including the steps of:

registering the players in a player tracking module operable on a computer network and issuing a player tracking instrument to each of the registered players;

processing electronic gaming data relating to play of the electronic gaming machines by the registered players, financial transactions between the registered players and the electronic gaming machines, and identification of the registered players using the player tracking instruments;

storing the electronic gaming data in a database;

evaluating the electronic gaming data and the table data and awarding complimentary points to the registered players based on the evaluated data;

the registered players physically relocating from any casino to a redemption center; and redeeming the awarded complimentary points for products or services and earning points based on products or services purchased at the redemption center by the registered players at the redemption center electronically linked to the computer network, the redemption center being remote from and physically located away from any casino;

wherein the redemption center is implemented at a location selected from the group consisting of a point of sale system, a hotel property system, other point-based redemption systems, and combinations thereof.

14. A method as set forth in claim 13 including the step of selectively and individually including each of the plurality of electronic gaming machines in a progressive jackpot such that an operator can individually select which of the electronic gaming machines to include in the progressive jackpot and exclude from the progressive jackpot.

15. A method as set forth in claim 13 including the step of sensing a biometric characteristic of the registered players at the electronic gaming machines to further identify the registered players.

* * * * *